US011630431B2

(12) United States Patent
Nickerson et al.

(10) Patent No.: US 11,630,431 B2
(45) Date of Patent: *Apr. 18, 2023

(54) CODE REPLACEMENT FOR IRRIGATION CONTROLLERS

(71) Applicant: Rain Bird Corporation, Azusa, CA (US)

(72) Inventors: Harvey J. Nickerson, El Cajon, CA (US); Russel Dean Leatherman, Albion, IN (US); James R. Musselman, Camarillo, CA (US); Andrew M. Nguyen, San Diego, CA (US); Nicholas N. Lapshov, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,478

(22) Filed: Oct. 1, 2021

(65) Prior Publication Data
US 2022/0026869 A1 Jan. 27, 2022

Related U.S. Application Data

(63) Continuation of application No. 15/929,482, filed on May 5, 2020, now Pat. No. 11,163,284, which is a (Continued)

(51) Int. Cl.
G05B 19/042 (2006.01)
A01G 25/16 (2006.01)
G05D 7/06 (2006.01)

(52) U.S. Cl.
CPC ......... G05B 19/0426 (2013.01); A01G 25/16 (2013.01); G05D 7/0617 (2013.01);
(Continued)

(58) Field of Classification Search
CPC ...... G05B 19/0426; G05B 2219/23312; G05B 2219/23339; G05B 2219/25314;
(Continued)

(56) References Cited

U.S. PATENT DOCUMENTS 3,869,854 A 3/1975 Church
3,942,077 A 3/1976 Powers
(Continued)

FOREIGN PATENT DOCUMENTS

CA 1230393 A 12/1987
CA 2101793 A1 2/1994
(Continued)

OTHER PUBLICATIONS

U.S. Appl. No. 29/198,322, filed Jan. 27, 2004, Zwick.
(Continued)

*Primary Examiner* — Tejal Gami
(74) *Attorney, Agent, or Firm* — Fitch, Even, Tabin & Flannery LLP

(57) ABSTRACT

Some embodiments provide irrigation controllers comprising: a housing; a control unit including a first microcontroller configured to execute irrigation programs and a first set of code; and a removable plug-in device that removably mates with a portion of the irrigation controller and communicationally couples to the first microcontroller, wherein the plug-in device comprises a memory storing a second set of code to replace at least a portion of the first set of code, wherein the plug-in device is configured to re-flash at least a portion of the first set of code allowing a copy of the second set of code to overwrite at least the portion of the first set of code; wherein the first set of code comprises a bootloader that writes the copy of the second set of code over the first set of code with the exception of the bootloader that is not written over.

20 Claims, 66 Drawing Sheets

Related U.S. Application Data continuation of application No. 16/013,152, filed on Jun. 20, 2018, now Pat. No. 10,663,941, which is a continuation of application No. 15/376,197, filed on Dec. 12, 2016, now Pat. No. 10,025,284, which is a continuation of application No. 14/254,816, filed on Apr. 16, 2014, now Pat. No. 9,547,313, which is a continuation of application No. 13/794,489, filed on Mar. 11, 2013, now Pat. No. 8,738,188, which is a continuation of application No. 12/911,683, filed on Oct. 25, 2010, now Pat. No. 8,417,390, which is a continuation of application No. 11/767,390, filed on Jun. 22, 2007, now Pat. No. 7,844,367.

(52) U.S. Cl.
CPC .. *G05D 7/0676* (2013.01); *G05B 2219/23312* (2013.01); *G05B 2219/23339* (2013.01); *G05B 2219/25314* (2013.01); *G05B 2219/2625* (2013.01); *Y10T 137/86389* (2015.04)

(58) Field of Classification Search
CPC ............ G05B 2219/2625; A01G 25/16; G05D 7/0617; G05D 7/0676; Y10T 137/86389
See application file for complete search history.

(56) References Cited

U.S. PATENT DOCUMENTS

| | | |
|---|---|---|
| 4,007,458 A | 2/1977 | Hollabaugh |
| 4,016,407 A | 4/1977 | Mesecar |
| 4,090,764 A | 5/1978 | Malsby |
| 4,131,882 A | 12/1978 | Hollabaugh |
| 4,152,750 A | 5/1979 | Bremenour |
| 4,165,532 A | 8/1979 | Kendall |
| 4,176,395 A | 11/1979 | Evelyn-Veere |
| D253,843 S | 1/1980 | Fernandez |
| 4,204,201 A | 5/1980 | Williams |
| 4,242,721 A | 12/1980 | Krolak |
| 4,244,022 A | 1/1981 | Kendall |
| 4,250,563 A | 2/1981 | Struger |
| 4,276,611 A | 6/1981 | Jansen |
| 4,442,504 A | 4/1984 | Dummermuth |
| 4,569,020 A | 2/1986 | Snoddy |
| 4,593,376 A | 6/1986 | Volk |
| 4,672,510 A | 6/1987 | Castner |
| 4,725,977 A | 2/1988 | Izumi |
| 4,771,374 A | 9/1988 | Ropelato |
| 4,790,762 A | 12/1988 | Harms |
| 4,799,142 A | 1/1989 | Waltzer |
| 4,845,380 A | 7/1989 | Piegari |
| 4,852,051 A | 7/1989 | Mylne |
| 4,870,863 A | 10/1989 | Duncan |
| 4,882,702 A | 11/1989 | Struger |
| 4,920,453 A | 4/1990 | Onose |
| 4,922,407 A | 5/1990 | Birk |
| 4,937,732 A | 6/1990 | Brundisini |
| 4,937,746 A | 6/1990 | Brundisini |
| 5,000,692 A | 3/1991 | Taniguchi |
| 5,025,361 A | 6/1991 | Pitman |
| 5,097,861 A | 3/1992 | Hopkins |
| 5,124,942 A | 6/1992 | Nielsen |
| 5,173,855 A | 12/1992 | Nielsen |
| 5,193,570 A | 3/1993 | Mott |
| 5,251,153 A | 10/1993 | Nielsen |
| 5,262,936 A | 11/1993 | Faris |
| 5,265,005 A | 11/1993 | Schmidt |
| 5,278,749 A | 1/1994 | De Man |
| 5,287,888 A | 2/1994 | Geiger |
| 5,293,554 A | 3/1994 | Nicholson |
| 5,301,346 A | 4/1994 | Notarianni |
| 5,444,611 A | 8/1995 | Woytowitz |
| D362,659 S | 9/1995 | Hedding |
| 5,479,338 A | 12/1995 | Ericksen |
| 5,519,726 A | 5/1996 | DiCarlo |
| 5,553,220 A | 9/1996 | Keene |
| 5,590,363 A | 12/1996 | Lunsford |
| 5,600,576 A | 2/1997 | Broadwater |
| 5,600,671 A | 2/1997 | Maul |
| 5,602,728 A | 2/1997 | Madden |
| 5,748,466 A | 5/1998 | McGivern |
| 5,781,921 A | 7/1998 | Nichols |
| D398,900 S | 9/1998 | Roman |
| D398,901 S | 9/1998 | Roman |
| 5,812,879 A | 9/1998 | Moro |
| 5,839,658 A | 11/1998 | Sarver |
| 5,853,122 A | 12/1998 | Caprio |
| 5,853,302 A | 12/1998 | Roman |
| D409,566 S | 5/1999 | Roman |
| D409,584 S | 5/1999 | Fetherolf |
| 5,921,280 A | 7/1999 | Ericksen |
| 5,956,248 A | 9/1999 | Williams |
| D417,198 S | 11/1999 | Clifton |
| 5,983,303 A | 11/1999 | Sheafor |
| 6,088,621 A | 7/2000 | Woytowitz |
| 6,108,598 A | 8/2000 | Sumitani |
| 6,111,522 A | 8/2000 | Hiltz |
| 6,170,035 B1 | 1/2001 | Gianellini |
| 6,178,476 B1 | 1/2001 | Powell |
| 6,230,089 B1 | 5/2001 | Lonn |
| 6,240,336 B1 | 5/2001 | Brundisini |
| 6,314,340 B1 | 11/2001 | Mecham |
| 6,330,806 B1 | 12/2001 | Beaverson |
| D452,695 S | 1/2002 | Miller |
| D454,625 S | 3/2002 | Flanagan |
| D457,144 S | 5/2002 | Suen |
| 6,402,032 B1 | 6/2002 | Huang |
| 6,402,048 B1 | 6/2002 | Collins |
| 6,453,215 B1 | 9/2002 | Lavoie |
| 6,459,959 B1 | 10/2002 | Williams |
| D467,349 S | 12/2002 | Niedbala |
| D470,826 S | 2/2003 | Bergmann |
| 6,571,340 B1 | 5/2003 | Lee |
| 6,585,168 B1 | 7/2003 | Caprio |
| 6,600,971 B1 | 7/2003 | Smith |
| 6,647,319 B1 | 11/2003 | Goldberg |
| 6,685,104 B1 | 2/2004 | Float |
| 6,708,084 B2 | 3/2004 | Battistutto |
| 6,721,630 B1 | 4/2004 | Woytowitz |
| D492,264 S | 6/2004 | Sergio |
| 6,751,740 B1 | 6/2004 | Robertson |
| 6,763,287 B2 | 7/2004 | Brundisini |
| 6,766,221 B1 | 7/2004 | Christiansen |
| 6,772,050 B2 | 8/2004 | Williams |
| 6,834,662 B1 | 12/2004 | Olson |
| 6,842,667 B2 | 1/2005 | Beutler |
| 6,850,819 B1 | 2/2005 | Townsend |
| 6,898,467 B1 | 5/2005 | Smith |
| 6,967,565 B2 | 11/2005 | Lingemann |
| D512,966 S | 12/2005 | Cook |
| 6,996,457 B2 | 2/2006 | Williams |
| D517,020 S | 3/2006 | Cook |
| 7,050,887 B2 | 5/2006 | Alvarez |
| 7,058,478 B2 | 6/2006 | Alexanian |
| 7,058,479 B2 | 6/2006 | Miller |
| 7,069,115 B1 | 6/2006 | Woytowitz |
| 7,181,319 B1 | 2/2007 | Woytowtiz |
| 7,225,058 B1 | 5/2007 | Porter |
| 7,229,026 B2 | 6/2007 | Evelyn-Veere |
| D546,772 S | 7/2007 | Venegas |
| 7,245,991 B1 | 7/2007 | Woytowitz |
| 7,248,945 B2 | 7/2007 | Woytowitz |
| 7,249,265 B2 | 7/2007 | Von Carolsfeld |
| 7,257,465 B2 | 8/2007 | Perez |
| 7,269,829 B2 | 9/2007 | Smith |
| 7,289,886 B1 | 10/2007 | Woytowitz |
| 7,328,089 B2 | 2/2008 | Curren |
| D569,797 S | 5/2008 | Neitzel |
| 7,398,139 B1 | 7/2008 | Woytowitz |
| 7,444,207 B2 | 10/2008 | Nickerson |
| 7,522,975 B2 | 4/2009 | Perez |
| 7,574,285 B2 | 8/2009 | Kah |
| 7,584,023 B1 | 9/2009 | Palmer |

(56) References Cited

U.S. PATENT DOCUMENTS

| | | |
|---|---|---|
| 7,613,546 B2 | 11/2009 | Nelson |
| 7,613,547 B1 | 11/2009 | Woytowitz |
| 7,640,079 B2 | 12/2009 | Nickerson |
| 7,844,367 B2 | 11/2010 | Nickerson |
| 7,844,369 B2 | 11/2010 | Nickerson |
| 7,953,517 B1 | 5/2011 | Porter |
| 7,996,115 B2 | 8/2011 | Nickerson |
| 8,160,750 B2 | 4/2012 | Weiler |
| 8,244,404 B2 | 8/2012 | Nickerson |
| 8,265,797 B2 | 9/2012 | Nickerson |
| 8,271,144 B2 | 9/2012 | Kah |
| 8,417,390 B2 | 4/2013 | Nickerson |
| 8,706,307 B2 | 4/2014 | Weiler |
| 8,738,188 B2 | 5/2014 | Nickerson |
| 8,874,275 B2 | 10/2014 | Alexanian |
| 8,930,032 B2 | 1/2015 | Shupe |
| 9,348,338 B2 | 5/2016 | Nickerson |
| 9,538,713 B2 | 1/2017 | Pearson |
| 9,547,313 B2 | 1/2017 | Nickerson |
| 9,678,485 B2 | 6/2017 | Malaugh |
| 10,025,284 B2 | 7/2018 | Nickerson |
| 10,285,344 B2 | 5/2019 | Stange |
| 10,368,503 B2 | 8/2019 | Kah, Jr. |
| 10,582,673 B2 | 3/2020 | Nickerson |
| 10,663,941 B2 | 5/2020 | Nickerson |
| 10,687,352 B2 | 6/2020 | John Wilson |
| 11,071,263 B2 | 7/2021 | Nickerson |
| 11,096,341 B2 | 8/2021 | Nickerson |
| 11,163,284 B2 | 11/2021 | Nickerson |
| 2001/0031944 A1 | 10/2001 | Peterson |
| 2002/0019682 A1 | 2/2002 | Fujita |
| 2002/0024611 A1 | 2/2002 | Watanabe |
| 2002/0060631 A1 | 5/2002 | Runge |
| 2002/0091452 A1 | 7/2002 | Addink |
| 2002/0119683 A1 | 8/2002 | Paredes |
| 2002/0183898 A1 | 12/2002 | Williams |
| 2003/0002607 A1 | 1/2003 | Mooney |
| 2003/0026074 A1 | 2/2003 | Clements |
| 2003/0093159 A1 | 5/2003 | Sieminski |
| 2003/0097482 A1 | 5/2003 | Dehart |
| 2003/0105984 A1 | 6/2003 | Masuyama |
| 2003/0135286 A1 | 7/2003 | Brundisini |
| 2003/0135786 A1 | 7/2003 | Vollmar |
| 2003/0160107 A1 | 8/2003 | Harris |
| 2003/0167367 A1 | 9/2003 | Kaushik |
| 2003/0182022 A1 | 9/2003 | Addink |
| 2003/0182027 A1 | 9/2003 | Mocek |
| 2003/0225947 A1 | 12/2003 | Hanson |
| 2004/0086053 A1 | 5/2004 | Anderson |
| 2004/0095267 A1 | 5/2004 | Pruitt |
| 2004/0113662 A1 | 6/2004 | Grimsrud |
| 2004/0135001 A1 | 7/2004 | Collins |
| 2004/0225411 A1 | 11/2004 | Beutler |
| 2004/0236443 A1 | 11/2004 | Ware |
| 2004/0254685 A1 | 12/2004 | Williams |
| 2005/0004715 A1 | 1/2005 | Christiansen |
| 2005/0005149 A1 | 1/2005 | Hirota |
| 2005/0026486 A1 | 2/2005 | Thomas |
| 2005/0035206 A1 | 2/2005 | Attia |
| 2005/0039471 A1 | 2/2005 | Smith |
| 2005/0055106 A1 | 3/2005 | Beutler |
| 2005/0119797 A1 | 6/2005 | Marian |
| 2005/0143842 A1 | 6/2005 | Marian |
| 2006/0004715 A1 | 1/2006 | Lock |
| 2006/0030971 A1 | 2/2006 | Nelson |
| 2006/0080002 A1 | 4/2006 | Williams |
| 2006/0100747 A1 | 5/2006 | Runge |
| 2006/0217846 A1 | 9/2006 | Woytowitz |
| 2007/0061048 A1 | 3/2007 | Lorenz |
| 2007/0106426 A1 | 5/2007 | Ensworth |
| 2007/0208462 A1 | 9/2007 | Kah |
| 2008/0027586 A1 | 1/2008 | Hern |
| 2008/0058964 A1 | 3/2008 | Nickerson |
| 2008/0319585 A1 | 12/2008 | Nickerson |
| 2011/0093123 A1 | 4/2011 | Alexanian |
| 2011/0270449 A1 | 11/2011 | Nickerson |
| 2011/0301767 A1 | 12/2011 | Alexanian |
| 2012/0041607 A1 | 2/2012 | Woytowitz |
| 2013/0157924 A1 | 6/2013 | Dewhurst |
| 2013/0158724 A1 | 6/2013 | Nickerson |
| 2013/0253714 A1 | 9/2013 | Williams |
| 2014/0018965 A1 | 1/2014 | Pearson |
| 2014/0249684 A1 | 9/2014 | Nickerson |
| 2016/0135390 A1 | 5/2016 | Nickerson |
| 2016/0235020 A1 | 8/2016 | Nickerson |
| 2017/0118929 A1 | 5/2017 | Pearson |
| 2018/0310495 A1 | 11/2018 | Weiler |
| 2020/0264576 A1 | 8/2020 | Nickerson |

FOREIGN PATENT DOCUMENTS

| | | |
|---|---|---|
| CA | 2325357 C | 5/2001 |
| EP | 0497040 B1 | 8/1992 |
| EP | 0586715 A1 | 3/1994 |
| EP | 1099991 A1 | 5/2001 |
| EP | 1103178 | 5/2001 |
| EP | 1324166 A2 | 7/2003 |
| EP | 2195712 A2 | 6/2010 |
| WO | 02058254 A1 | 7/2002 |
| WO | 2004046872 A2 | 6/2004 |
| WO | 2005062961 A2 | 7/2005 |
| WO | 2005062961 A3 | 7/2005 |
| WO | 2009002757 A2 | 12/2008 |

OTHER PUBLICATIONS

U.S. Appl. No. 29/232,061, filed Jun. 14, 2005, Cook.

Canadian Intellectual Property Office, Application No. 2,551,103, First Office Action, dated Jul. 7, 2011.

Durda, 'Serial and URAT Tutorial', http://www.freebsd.org/doc/en.sub.--IS.ISO8859-1/articles/serial-uart/art-icle.sgml, Jan. 13, 1996, pp. 1-32, vol. 1.13, FreeBSD.

EPO; App. No. EP 04815537; Supplementary Partial European Search Report dated Oct. 11, 2011.

EPO; App. No. EP 08780823; Supplementary European Search Report; dated Oct. 11, 2011; 8 Pages.

Hunter Industries, 'About Hunter: A Corporate Chronology' http://www.hunterindustries.com/Corporate/About_Hunter/about_02.html, Dec. 1, 2004, pp. 1-2, Hunter Industries Incorporated, San Marcos, CA.

Hunter Industries, 'Hunter ICC Controllers', Sep. 1, 2002, pp. 1-2, Hunter Industries Incorporated, San Marcos, CA.

Hunter Industries, 'Hunter Pro-C Controllers,' Jun. 1, 2002, pp. 1-2, Hunter Industries Incorporated, San Marcos, CA.

Hunter Industries, 'ICC Commercial Irrigation Controllers, Owner's Manual and Installation Instructions for all 8 Station Base Models,' Apr. 1, 2002, pp. 1-34, Hunter Industries Incorporated, San Marcos, CA.

Hunter Industries, 'ICC Controllers, Institutional Series Controllers for Heavy Duty Residential and Commercial Applications,' Nov. 1, 2002, pp. 1-22, Hunter Industries Incorporated, San Marcos, CA.

Hunter Industries, 'Modular Controllers Mean You'll Always Have 'The Right Controller For Every Job'', http://www.hunterindustries.com/Resources/Library/Product/200210-hdln-modular.html, Dec. 1, 2004, pp. 1-3, Hunter Industries Incorporated, San Marcos, CA.

Hunter Industries, 'Pro-C Controller, A Complete Family of Full-Featured Residential and Light Commercial Controllers,' Mar. 1, 2002, pp. 1-32, Hunter Industries Incorporated, San Marcos, CA.

Hunter Industries, 'Pro-C Residential and Light Commercial Irrigation Controllers, Owner's Manual and Installation Instructions,' Nov. 1, 2000, pp. 1-34, Hunter Industries Incorporated, San Marcos, CA.

IP Australia; App. No. 2004308488; Notice of Acceptance dated Sep. 10, 2010.

IP Australia; App. No. 2010219332; Notice of Acceptance dated Jun. 21, 2011.

IP Australia; Examination Report issued in Australian Patent Application No. 2008268655; dated Nov. 12, 2012; 4 Pages.

(56) References Cited

OTHER PUBLICATIONS

Motorola Communications Sector, Irrinet I/O Module 4 Digital Inputs/16 Solid-State Outputs, 1992, 25 pp., Technical Writing Services, Motorola, Inc., Schaumburg, IL.
Motorola MIR 5000C System Installation Section, 1989, 23 pp., Technical Writing Services, Motorola Communications Israel Ltd., Tel Aviv, Israel.
Motorola, 'Irrigation Field Unit Owner's Manual', Jan. 1, 1992, pp. 87, T.O.C. & Sections 1-3, Technical Writing Services, Motorola, Inc., Schaumburg, IL.
Motorola, 'IRRInet Component Descriptions', Feb. 16, 1993, p. 6.
Motorola, 'MIR 5000F-Trunked Radio Satellite', Dec. 14, 1992, p. 2, Megeath.
Motorola, 'MIR5000C Quickstart and Reference Guide', Feb. 1, 1994, Technical Writing Services, Motorola, Inc., Schaumburg, IL.
Motorola, 'Motorola MIR-5000 Component Descriptions,' Feb. 16, 1993, p. 3.
Motorola, IRRInet—Trunked Radio Satellite, Bidding Specifications, Dec. 14, 1992, pp. 1, Megeath.
Motorola, Irrinet CPU Module-Service Manual, 1992, 22 pp., Technical Writing Services, Motorola, Inc., Schaumburg, IL.
Motorola, IRRInet General Description Service Manual, 1993, Technical Writing Services, Motorola, Inc., Schaumburg, IL.
Motorola, IRRInet Owner's Manual, published at least on or before Dec. 31, 1992, TOC and Secs. 1-3, Motorola Communications Israel Ltd., Tel Aviv, Israel.
Motorola, Line & Second Radio Board: Parts List and Connectors, 2 pp., Technical Writing Services, Motorola, Inc., Schaumburg, IL, 2005.
Motorola, MIR5000 System Features, Nov. 1, 1991, pp. 20, San Diego Turf & Irrigation, San Diego, CA.
Motorola, MIR5000 System Planner, Mar. 8, 1993, TOC and pp. 1-42, The Toro Company, Riverside, CA.
Motorola, MIR5000C Central System Operating Instructions, published at least on or before Dec. 30, 1991, pp. 12, Technical Writing Services, Motorola Communications Israel Ltd., Tel Aviv, Israel.
Motorola, New Members to the MIR5000 Family, Irrinet and Scorpio, published at least on or before Dec. 23, 2003, pp. 14, Toro, Riverside, CA.
Motorola, Scorpio AC-Installation Instructions, 1993, 23 pp., Technical Writing Services, Motorola, Inc., Schaumburg, IL.
Motorola, Scorpio, Bidding Specifications, Jan. 6, 1993, p. 3.
Motorola, Scorpion AC, TOC and Secs. 1-3, Sep. 1, 1994, Technical Writing Services, Motorola, Inc., Schaumburg, IL.
Motorola, Scorpion DC Operation, Sep. 1, 1994, pp. 17, Technical Writing Services, Motorola, Inc. Schaumburg, IL.
Motorola, Scorpion DC-Installation, Sep. 1, 1994, pp. 4, Technical Writing Services, Motorola, Inc., Schaumburg, IL.
PCT; App. No. PCT/US2004/043473; International Preliminary Report on Patentability dated Jun. 26, 2006.
PCT; App. No. PCT/US2004/43473; International Search Report dated Aug. 31, 2005.
PCT; App. No. PCT/US2004/43473; Written Opinion; dated Aug. 31, 2005.
PCT; App. No. PCT/US2008/067150; International Search Report dated Dec. 30, 2008.
PCT: App. No. PCT/US2008/067150; Written Opinion dated Dec. 30, 2008.
Rain Bird, Central Computer Control System, Maxicom, 'Landscape Irrigation Products, 1993-1994 Catalog', Cover page and pp. 98-99, US (3 pgs.).
Rain Bird, Central Control System, Maxicom—Guide to Operations, Feb. 1, 1993, TOC and pp. 5.4-1-2; 5.4-41-42; 7.2-1-2; Rain Bird Sales, Inc., Tucson, AZ.
Rain Bird, Central Control System, Maxicom, Jun. 1994, Cover page and pp. 2-8, Rain Bird Sales, Inc., US (8 pgs.).
Rain Bird, Components of the Maxicom System, Feb. 9, 1994, p. 3.2, Section 3, US. (1 pg.).
Rain Bird, Installation and Operation Guide, Controller Unit IM, Apr. 1, 2002, pp. 82-86, Rain Bird Corporation, Glendora, CA.
Rain Bird, Maxicom Guide to Operations, Oct. 1, 1994, Chapter 7, Rain Bird Corporation, Glendora, CA (54 pgs).
Rain Bird, Rain Bird—Landscape Irrigation: Producs: IM Series Controllers, www.rainbird.com, published at http://web.archive.org/web/20030203155244/www.rainbird.com/landscape/products/controllers/im.htm, Feb. 5, 2003, pp. 1-4, Rain Bird Corporation, Glendora, CA.
SIPO; App. No. CN 1914573; First Examiner's Report dated May 9, 2008; 12 pages.
SIPO; App. No. CN 1914573; Second Examiner's Report dated Apr. 3, 2009; 6 pages.
SIPO; App. No. CN1914573; Patent Certificate for Invention granted May 4, 2011, 2 pages.
The Strong Box, 'Stainless Steel Controller Enclosure', Jan. 1, 1991, p. 10, V.I.T. Products, Inc., San Diego, CA.
Toro & Motorola, 'General Description IRRInet', published at least on or before Dec. 23, 2003, pp. 24, The Toro Company, Riverside, CA.
Toro, Motorola MIR 5000 Radio-Based Irrigation Central Computer Control System, 1991, pp. 1-4, The Toro Company, Riverside, CA.
U.S. Appl. No. 15/376,197; Notice of Allowance dated Mar. 15, 2018.
U.S. Appl. No. 15/376,197; Office Action dated Sep. 25, 2017; (pp. 1-12).
U.S. Appl. No. 11/022,329; Examiner Interview Summary dated Apr. 8, 2009; 4 pages.
U.S. Appl. No. 11/022,329; Notice of Allowance dated Apr. 17, 2009; 7 pages.
U.S. Appl. No. 11/022,329; Notice of Allowance dated Aug. 7, 2009.
U.S. Appl. No. 11/022,329; Office Action dated Jan. 6, 2009; 10 pages.
U.S. Appl. No. 11/022,329; Office Action dated Aug. 19, 2008; 9 pages.
U.S. Appl. No. 11/022,329; Restriction Reguirement dated May 22, 2008.
U.S. Appl. No. 11/767,390; Examiner Interview Summary dated Jun. 16, 2010.
U.S. Appl. No. 11/767,390; Notice of Allowance dated Jul. 23, 2010.
U.S. Appl. No. 11/767,390; Office Action dated Oct. 28, 2009.
U.S. Appl. No. 11/767,390; Office Action dated Mar. 11, 2010.
U.S. Appl. No. 12/911,683; Examiner Interview Summary dated Sep. 15, 2011.
U.S. Appl. No. 12/911,683; Examiner Interview Summary dated Dec. 10, 2012.
U.S. Appl. No. 12/911,683; Notice of Allowance dated Dec. 10, 2012.
U.S. Appl. No. 12/911,683; Office Action dated Mar. 4, 2011.
U.S. Appl. No. 12/911,683; Office Action dated Mar. 13, 2012.
U.S. Appl. No. 12/911,683; Office Action dated Nov. 23, 2011.
U.S. Appl. No. 13/794,489; Notice of Allowance dated Jan. 16, 2014.
U.S. Appl. No. 14/254,816; Notice of Allowance dated Sep. 8, 2016.
U.S. Appl. No. 14/254,816; Office Action dated May 24, 2016.
U.S. Appl. No. 15/929,482; Notice of Allowance dated Jul. 1, 2021.
U.S. Appl. No. 15/929,482; Office Action dated Sep. 15, 2020.
U.S. Appl. No. 16/013,152; Notice of Allowance dated Jan. 21, 2020; (pp. 1-5).
U.S. Appl. No. 16/013,152; Office Action dated Sep. 25, 2019; (pp. 1-10).

Modular, Expandable Irrigation Controller 10 Block Diagram

FIG. 12

| RIBBON CABLE 49 INTERFACE PIN ASSIGNMENTS | | |
|---|---|---|
| NOT CONNECTED | ○ | ○ NOT CONNECTED |
| ENUM-FREQ | ○ | ○ SMB-DO |
| 12V-UNREG-RTN | ○ | ○ SMB-DI |
| 12V-UNREG-RTN | ○ | ○ REMOTE-DI |
| REMOTE-DO | ○ | ○ I-SENSE-OUT |
| MVn | ○ | ○ MV2n |
| BM-LEDn-OUT | ○ | ○ SENSOR-FTR |
| BM-STATUS | ○ | ○ SENSOR2-FTR |
| NOT CONNECTED | ○ | ○ NOT CONNECTED |
| AC-FUSE | ○ | ○ AC-FUSE |
| AC-FUSE-S | ○ | ○ NOT CONNECTED |
| AC-COM | ○ | ○ AC-COM |

BASE MODULE CONNECTOR PIN ASSIGNMENTS 69

| | |
|---|---|
| MVn | MV2n |
| BM-LEDn | SENSOR-FTR |
| BM-STATUS | SENSOR2-FTR |
| AC-FUSE | AC-FUSE-S |
| AC-COM | AC-COM |

*FIG. 20*

EXPANSION MODULE CONNECTOR PIN ASSIGNMENTS 78

| | |
|---|---|
| AC-COM | AC-FUSE (I-SENSE-OUT) |
| ENUM-FREQ | SMB-DO |
| AC-FUSE-S | AC-FUSE-S |
| SMB-DI | ENUM-RC |
| AC-FUSE | AC-COM |

*FIG. 21*

EXTERNAL HOUSING EXPANSION PORT 62
PIN ASSIGNMENTS

| ENUM-FREQ | SBM-DO | SBM-DI | I-SENSE-OUT | AC-FUSE | AC-FUSE | AC-FUSE-S | AC-FUSE-S | AC-COM | AC-COM |

*FIG. 22*

LCD 24
PIN ASSIGNMENTS

| Pin |
|---|
| V5 |
| V4 |
| V3 |
| V2 |
| V1 |
| C2- |
| C2+ |
| C1+ |
| C1- |
| C3+ |
| Vout |
| Vss |
| Vdd |
| D7 |
| D6 |
| D5 |
| D4 |
| D3 |
| D2 |
| D1 |
| D0 |
| RDn |
| WRn |
| A0 |
| RESn |
| Cs1n |

*FIG. 25*

SOCKET APPLICATION PROGRAMMING INTERFACE

```
Troubleshooting

1 - Confirm Programs
2 - Test All Valves 1       2
```

FIG. 36

Select "1"

---

```
Confirm Programming

1 - Review Program
2 - Program Run Time
3 - Valve Run Time 1       2       3       Back
```

FIG. 37

Select "1"

---

```
PGM A
Watering Start Times 1    1:00am    6    12:00pm
2    4:30am    7    3:45pm
3    5:30am    8    5:30pm
4    7:00am
5    9:00am Back    Next
```

FIG. 38A

Select "Next"

```
PGM A
Watering Start Times
No Start Times!

Back      Next
```

```
PGM A
Watering Day Cycle

CYCLICAL
   Days 14  Remaining  13

Back      Next
```

*FIG. 39A*

Select "Next"

Or:

```
PGM A
Watering Day Cycle

CUSTOM

Back      Next
```

```
PGM A
Watering Days

Mon    ON        Sat    ON
Tue    ON        Sun    OFF
Wed    ON
Thur   OFF
Fri    ON Back        Next
```

*FIG. 40*

Select "Next"

```
PGM A Run Times

Valve          HH : MM
  01            0 : 22
  02            0 : 27
  03            0 : 22
  04            0 : 25
  05            0 : 19

+      −       Back        Next
```

*FIG. 41*

Select "Next"

```
PGM A
Seasonal Adjust

115%

Back        Next
```

*FIG. 42*

Select "Next"

```
Rain Delay

2
Days Remaining

Back    Next
```

FIG. 43

Select "Next"

```
Calendar Day Off

Jan 1  On
      Day

+  −           Back    Next
```

FIG. 44

Select "Next"

```
PGM A Valve Delay

0 : 01 : 06
   Hrs  Min  Sec

Back    Next
```

FIG. 45

Select "Next"

| Cycle + Soak | Minutes | |
|---|---|---|
| Valve | Cycle | Soak |
| 01 | 10 | 15 |
| 02 | 15 | 10 |
| 03 | 5 | 5 |
| 04 | 10 | 7 |
| 05 | 14 | 7 |
| +    − | Back | Next |

*FIG. 46A*

Select "Next"

Press "+" or "−" will scroll through all valves if they are programmed, for example, press "+" once:

| Cycle + Soak | Minutes | |
|---|---|---|
| Valve | Cycle | Soak |
| 02 | 15 | 10 |
| 03 | 5 | 5 |
| 04 | 5 | 5 |
| 05 | 14 | 7 |
| 06 | 9 | 5 |
| +    − | Back | Next |

*FIG. 46B*

Press "+" again:

| Cycle + Soak | Minutes | |
|---|---|---|
| Valve | Cycle | Soak |
| 03 | 5 | 5 |
| 04 | 5 | 5 |
| 05 | 14 | 7 |
| 06 | 9 | 5 |
| 07 | 5 | 6 |
| +    − | Back | Next |

*FIG. 46C*

Keep on pressing "+", the display will scroll to the last entry:

```
Cycle + Soak        Minutes
Valve           Cycle    Soak
  08             18       12

+       -      Back        Next
```

*FIG. 46D*

```
Master Valve or Pump

1   Off
  Valve

+       -      Back        Next
```

*FIG. 47*

Select "Next"

Press "+" or "-" will scroll through all "Off" valves.

```
Sensor Override

1   On
  Valve

+       -      Back        Next
```

*FIG. 48*

Select "Next"

Press "+" or "-" will scroll through all valves settings
if they are programmed for "Sensor Override"

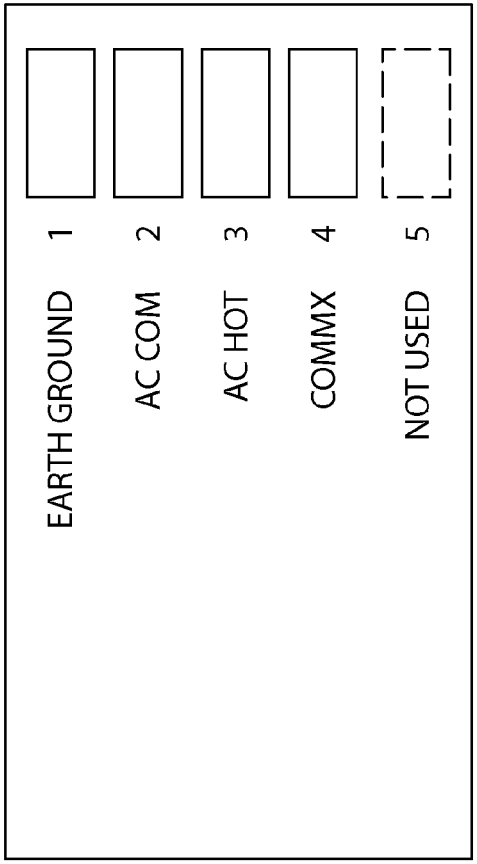
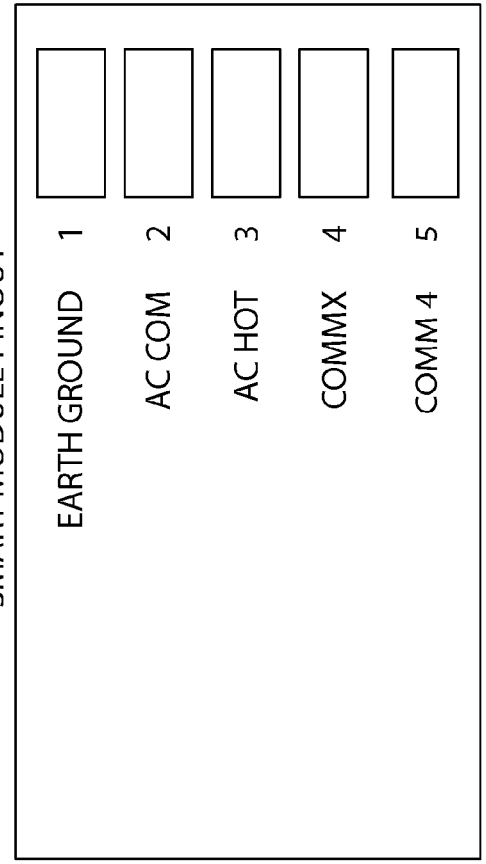

CODE REPLACEMENT FOR IRRIGATION CONTROLLERS

This application is a continuation of U.S. application Ser. No. 15/929,482, filed May 5, 2020, entitled CODE REPLACEMENT FOR IRRIGATION CONTROLLERS, which is a continuation of U.S. application Ser. No. 16/013,152, filed Jun. 20, 2018, entitled CODE REPLACEMENT FOR IRRIGATION CONTROLLERS, which is a continuation of U.S. application Ser. No. 15/376,197, filed Dec. 12, 2016, entitled CODE REPLACEMENT FOR IRRIGATION CONTROLLERS, now U.S. Pat. No. 10,025,284, which is a continuation of U.S. application Ser. No. 14/254,816, filed Apr. 16, 2014, entitled CODE REPLACEMENT FOR IRRIGATION CONTROLLERS, now U.S. Pat. No. 9,547,313, which is a continuation of U.S. application Ser. No. 13/794,489, filed Mar. 11, 2013, entitled CODE REPLACEMENT FOR IRRIGATION CONTROLLERS, which is a continuation of U.S. application Ser. No. 12/911,683, filed Oct. 25, 2010, entitled CODE REPLACEMENT FOR IRRIGATION CONTROLLERS, now U.S. Pat. No. 8,417,390, which is a continuation of U.S. application Ser. No. 11/767,390, filed Jun. 22, 2007, entitled CODE REPLACEMENT FOR IRRIGATION CONTROLLERS, now U.S. Pat. No. 7,844,367, all of which are incorporated herein by reference in their entirety.

FIELD OF INVENTION

This invention relates to an irrigation controller for controlling the operation of an irrigation system. In particular, this invention relates to a modular irrigation controller with expandable features.

BACKGROUND OF THE INVENTION

Modular irrigation controllers use optional modules that can be added to the controller to increase the number of irrigation stations that may be controlled by the controller. For example, U.S. Pat. No. 5,956,248 (William et al.) provides an irrigation controller having a housing that encloses a microprocessor that stores and executes watering programs, and includes station modules that can be added within the housing to increase the number of irrigation stations controlled. Additionally, U.S. Pat. No. 5,262,936 (Faris et al.) provides a controller having a base unit for actuating a predetermined minimum number of irrigation stations. External station expansion modules can be added to the base unit for increasing the number of irrigation stations controlled by the controller. Also describes are optional pump modules and accessory timer modules that behave the same as the station modules in that they provide an electrical output signal to a pump or to an accessory (such as a light), instead of to an irrigation station. However, the expansion modules in these patents simply act as additional station outputs (e.g., a conduit extension of the logic inside the controller and only include driver circuitry responsive to commands from the base unit) and do not provide any additional functionality or intelligence. In order to add functionality to these controllers apart from adding additional station outputs (e.g., to control additional stations or accessories), a user would have to purchase another irrigation controller configured with the desired functionality.

There exists, therefore, a need for an improved irrigation controller with a flexible and expandable architecture modular design, along with an enhanced communications to the modules that will provide enough flexibility for further additions to an irrigation system, not only to include additional output stations, but also to upgrade to new features and capabilities of expansion and re-configuration.

BRIEF SUMMARY OF THE INVENTION

Several embodiments of the present invention answer the above and other needs by providing an irrigation controller with flexible and expandable capabilities for controlling the operation of an irrigation system. In accordance with this several embodiments, the irrigation controller includes a base unit with a removable and programmable control panel and a bus for communicating with a plurality of removable modules capable of performing a variety of functions and expanding the capacity of the irrigation controller beyond the physical limitations of its housing. Also provided are various methods and features for use in the modular irrigation controllers described herein as well as in other irrigation control systems.

Some embodiments provide methods of implementing irrigation control, these methods comprise: detecting a presence of a first module coupled with a control unit of an irrigation controller, the control unit operating in accordance with a bootloader set of code and a first set of code to implement irrigation control; identifying that the first module stores a second set of code; and activating the bootloader set of code to replace the first set of code with the second set of code.

Other embodiments provide methods of implementing irrigation control. These methods comprise: operating an irrigation control unit of an irrigation controller according to a first set of code to implement irrigation control and a bootloader code; receiving a second set of code from a first module that is removably coupled with the control unit; and replacing the first set of code with the second set of code.

Still other embodiments provide methods of a module supplying a set of code to an irrigation controller, the method comprising: determining a current module mounting location of the irrigation controller to which the module is mounted; receiving a request for a first set of code stored on the module that is to replace a second set of code of the irrigation controller, where the irrigation controller is operating according to the second set of code; and transferring a copy of the first set of code to the irrigation controller.

Some embodiments provide an expansion module for a modular irrigation controller comprising: a housing; an electrical connector coupled to the housing to removably connect to one of a plurality of module mounting locations of the modular irrigation controller, each module mounting location electrically coupled to a control unit of the modular irrigation controller that executes stored irrigation programs; a memory within the housing that stores a first set of code, where the memory allows a copy of the first set of code to be transferred to the control unit to replace at least a portion of a current set of code stored in the control unit.

Still other embodiments provide modular irrigation controllers that comprise: a housing; a control unit within the housing, the control unit including a first microcontroller for executing stored irrigation programs and a first set of code of the control unit; a plurality of module mounting locations within the housing adapted to removably receive modules, each module mounting location communicationally coupled to the first microcontroller; a module removably mounted to a first module mounting location and contained within the housing, the module communicationally coupled to the first microcontroller and the module comprises memory storing a second set of code to replace at least a portion of the first set of code of the control unit and allows a copy of the second set of code to be transferred to the control unit to overwrite at least a portion of the first set of code of the control unit.

Some embodiments provide an apparatus that couples with an irrigation controller and provides the irrigation controller additional functionality, the apparatus comprising: a processor; a communication port that communicationally couples with an irrigation controller; and a memory that stores: a first set of irrigation controller code that replaces existing irrigation controller code stored on the irrigation controller; a functional set of code that provides irrigation functionality, where the functional set of code is activated by the irrigation controller and implemented from the apparatus to provide at least some irrigation control functionality during irrigation.

Other embodiments provide expansion modules for a modular irrigation controller comprising: a housing; an electrical connector adapted to removably connect to any one of a plurality of expansion module mounting locations of a modular irrigation controller, each expansion module mounting location electrically coupled to a control unit controlled by firmware stored in the control unit, the control unit executes stored irrigation programs; a microcontroller within the housing and coupled to the electrical connector; and a memory coupled to the microcontroller, the memory containing a new firmware version of the firmware stored in the control unit; the microcontroller adapted to load the new version of the firmware into the control unit.

Some further embodiments provide expansion modules for a modular irrigation controller comprising: a housing; an electrical connector adapted to removably connect to any one of a plurality of expansion module mounting locations of a modular irrigation controller, each expansion module mounting location electrically coupled to a control unit controlled by firmware stored in the control unit, the control unit executes stored irrigation programs; and a memory within the housing and coupled to the electrical connector, the memory containing a new firmware version of the firmware stored in the control unit; the memory adapted to allow the control unit of the modular irrigation controller to load the new version of the firmware from the memory into the control unit.

Additionally, some embodiments provide methods of implementing irrigation control, comprising: coupling a module storing a first set of code to a controller operating according to a second set of code; automatically replacing the second set of code with the first set of code; and activating the controller to operating according to the first set of code to provide irrigation control.

In one embodiment, the invention may be characterized as an expansion module for a modular irrigation controller comprising: a housing; an electrical connector coupled to the housing and adapted to removably connect to one of a plurality of expansion module mounting locations of the modular irrigation controller, each expansion module mounting location electrically coupled to a control unit of the modular irrigation controller that executes stored irrigation programs; a microcontroller within the housing and coupled to the electrical connector; the microcontroller adapted to: determine that the expansion module has been connected to the one expansion module mounting location; and transmit a signal to the control unit to indicate the presence of the expansion module to the control unit.

In another embodiment, the invention may be characterized as an expansion module for a modular irrigation controller comprising: a housing; an electrical connector coupled to the housing and adapted to removably connect to one of a plurality of expansion module mounting locations of the modular irrigation controller, each expansion module mounting location electrically coupled to a control unit of the modular irrigation controller that executes stored irrigation programs; a microcontroller within the housing and coupled to the electrical connector; a visual indicator coupled to the housing and the microcontroller, wherein at least a portion of which is visible from outside of the housing and indicates a status of the expansion module.

In yet another embodiment, the invention may be characterized as an expansion module for a modular irrigation controller comprising: a housing; an electrical connector coupled to the housing and adapted to removably connect to one of a plurality of expansion module mounting locations of the modular irrigation controller, each expansion module mounting location electrically coupled to a control unit of the modular irrigation controller that executes stored irrigation programs; a microcontroller within the housing and coupled to the electrical connector; an audible indicator coupled to the housing and the microcontroller, the audible indicator emitting an audible sound that indicates a status of the expansion module.

In a further embodiment, the invention may be characterized as an expansion module for a modular irrigation controller comprising: a housing; an electrical connector coupled to the housing and adapted to removably connect to any one of a plurality of expansion module mounting locations of the modular irrigation controller, each expansion module mounting location electrically coupled to a control unit of the modular irrigation controller that executes stored irrigation programs; a microcontroller within the housing and coupled to the electrical connector; an input device coupled to the housing and to the microcontroller, the input device adapted to send a signal to the microcontroller in response to the operation of the input device by a user.

In another embodiment, the invention may be characterized as an expansion module for a modular irrigation controller comprising: a housing; an electrical connector adapted to removably connect to any one of a plurality of expansion module mounting locations of a modular irrigation controller, each expansion module mounting location electrically coupled to a control unit adapted to execute stored irrigation programs; and a microcontroller within the housing and coupled to the electrical connector, the microcontroller adapted to: transmit commands to the control unit, the commands causing the control unit to display information to a user.

In yet another embodiment, the invention may be characterized as a modular irrigation controller comprising: a housing: a control unit within the housing, the control unit including a first microcontroller for executing stored irrigation programs and a memory; a plurality of expansion module mounting locations within the housing adapted to removably receive expansion modules, each expansion mounting location electrically coupled to the first microcontroller; a first expansion module removably mounted to a first expansion module mounting location and electrically coupled to the first microcontroller, the first expansion module including driver circuitry for actuating irrigation valves in accordance with control signals received from the first microcontroller; and the first microcontroller adapted to store user defined configuration data specific to the first expansion module in the memory, the user defined configuration data retained in the memory when the first expansion module is removed from the first expansion module mounting location.

In a further embodiment, the invention may be characterized as a modular irrigation controller comprising: a housing: a control unit within the housing, the control unit including a first microcontroller for executing stored irrigation programs, the control unit having a first internet protocol address; a plurality of expansion module mounting locations within the housing adapted to removably receive expansion modules, each expansion mounting location electrically coupled to the first microcontroller; an expansion module removably mounted to a first expansion module mounting location and contained within the housing, the expansion module electrically coupled to the first microcontroller, the expansion module including a second microcontroller, the second microcontroller adapted to operate with the first microcontroller, the expansion module having a second internet protocol address; wherein the control unit addresses the expansion module using an internet transmission protocol.

In another embodiment, the invention may be characterized as a modular irrigation controller comprising: a housing: a control unit within the housing, the control unit including a first microcontroller for executing stored irrigation programs; a plurality of expansion module mounting locations within the housing adapted to removably receive expansion modules, each expansion mounting location electrically coupled to the first microcontroller; an expansion module removably mounted to a first expansion module mounting location and electrically coupled to the first microcontroller, the expansion module including a second microcontroller, the second microcontroller adapted to operate with the first microcontroller; wherein the first microcontroller is adapted: to transmit an authentication request to the expansion module; receive a response to the authentication request from the expansion module; and determine, based on the response, if the expansion module is authorized to operate with the first microcontroller.

In another embodiment, the invention may be characterized as a modular irrigation controller comprising: a housing: a control unit within the housing, the control unit including a first microcontroller for executing stored irrigation programs; a plurality of expansion module mounting locations within the housing adapted to removably receive expansion modules, each expansion mounting location electrically coupled to the first microcontroller; an expansion module removably mounted to a first expansion module mounting location and electrically coupled to the first microcontroller, the expansion module including a second microcontroller, the second microcontroller adapted to operate with the first microcontroller; wherein the first microcontroller is adapted: to transmit an authentication request to the expansion module; receive a response to the authentication request from the expansion module; and determine, based on the response, if the expansion module is authorized to operate with the first microcontroller.

In another embodiment, the invention may be characterized as an expansion module for a modular irrigation controller comprising: a housing; an electrical connector adapted to removably connect to one of a plurality of expansion module mounting locations of a modular irrigation controller, each expansion module mounting location electrically coupled to a control unit that executes stored irrigation programs; and a microcontroller within the housing and coupled to the electrical connector, the microcontroller adapted to operate with the control unit; wherein the microcontroller is adapted: to transmit an authentication request to the control unit; receive a response to the authentication request from the control unit; and determine, based on the response, if the control unit is authorized to operate with the microcontroller.

In another embodiment, the invention may be characterized as a modular irrigation controller comprising: a housing; a control unit within the housing, the control unit including a first microcontroller for executing stored irrigation programs; a plurality of expansion module mounting locations within the housing adapted to removably receive expansion modules a back plane circuit board comprising a bus coupling the first microcontroller to each of the plurality of expansion module mounting locations; wherein the bus comprises a serial multi-drop bus comprising: a serial data in line; and a serial data out line.

In another embodiment, the invention may be characterized as an expansion module for a modular irrigation controller comprising: a housing having a surface adapted to contact one of a plurality of expansion module mounting locations of a modular irrigation controller, each expansion module mounting location electrically coupled to a control unit of the modular irrigation controller that executes stored irrigation programs; an electrical connector coupled to the surface and adapted to removably connect to the one of the plurality of expansion module mounting locations; driver circuitry within the housing adapted to actuate irrigation valves in accordance with control signals received from the control unit; a guidepost extending substantially perpendicularly from surface, the guidepost adapted to insert into a corresponding guide hole formed in expansion module mounting location; a tab extending substantially perpendicularly from the surface, the tab having a ledge formed at a distal end of the tab, the tab adapted to fit within a corresponding tab hole formed in the expansion module mounting location such that the ledge is located under an edge of a periphery of the tab hole.

In another embodiment, the invention may be characterized as a modular irrigation controller comprising: a housing: a back plane circuit board within the housing; a control unit removably mounted within the housing and electrically coupled to the back plane circuit board, the control unit including a first microcontroller for executing stored irrigation programs; a plurality of expansion module mounting locations within the housing and electrically coupled to the back plane circuit board and adapted to removably receive expansion modules; a first expansion module removably mounted to a first expansion module mounting location and electrically coupled to the first microcontroller; the first expansion module comprises: a second microcontroller, the second microcontroller adapted to operate with the first microcontroller; driver circuitry adapted to actuate irrigation valves in accordance with control signals received from the first microcontroller; and current detection circuitry coupled to the second microcontroller, wherein the second microcontroller is adapted to detect a short circuit condition or an over current condition and suspend irrigation.

In another embodiment, the invention may be characterized as a user interface for an irrigation controller comprising: a display screen; and a microcontroller for driving the display screen to display information; wherein the microcontroller is adapted to display a user interface screen that allows a user to select one of a plurality of user groups and, in response to a selection of the user, generate and display a sequence of display screens to facilitate the programming of the irrigation controller corresponding to the selected user group, where the sequence of display screens is different for each of the plurality of user groups.

In another embodiment, the invention may be characterized as a user interface for an irrigation controller comprising: a display screen; a microcontroller for driving the display screen to display information; and a memory storing user interface displays in each of a plurality of languages, wherein the microcontroller is adapted to display a user interface screen that allows a user to select one of the plurality of languages and, in response to a selection of the user, generate and display at least one menu display screen in the selected language.

In another embodiment, the invention may be characterized as an expansion module for a modular irrigation controller comprising: a housing; an electrical connector adapted to removably connect to any one of a plurality of expansion module mounting locations of a modular irrigation controller, each expansion module mounting location electrically coupled to a control unit controlled by firmware stored in the control unit, the control unit executes stored irrigation programs; a microcontroller within the housing and coupled to the electrical connector; and a memory coupled to the microcontroller, the memory containing a new firmware version of the firmware stored in the control unit; the microcontroller adapted to load the new version of the firmware into the control unit.

In another embodiment, the invention may be characterized as an expansion module for a modular irrigation controller comprising: a housing; an electrical connector adapted to removably connect to any one of a plurality of expansion module mounting locations of a modular irrigation controller, each expansion module mounting location electrically coupled to a control unit controlled by firmware stored in the control unit, the control unit executes stored irrigation programs; and a memory within the housing and coupled to the electrical connector, the memory containing a new firmware version of the firmware stored in the control unit; the memory adapted to allow the control unit of the modular irrigation controller to load the new version of the firmware from the memory into the control unit.

In another embodiment, the invention may be characterized as a user interface for an irrigation controller comprising: a control unit that executes stored irrigation programs; a display coupled to the control unit, the control unit adapted to cause information to be displayed on the display for the user; a memory adapted to store irrigation program parameters; wherein the control unit is adapted to display parameters stored in the memory relating to an irrigation program in a single user interface comprising one or more display screens that do not allow for the parameters to be edited.

In another embodiment, the invention may be characterized as a user interface for an irrigation controller comprising: a control unit that executes stored irrigation programs; a display coupled to the control unit, the control unit adapted to cause information to be displayed on the display for the user; a memory adapted to store irrigation program parameters; wherein the control unit is adapted to determine and store in the memory a total run time for an irrigation program and display the total run time for the irrigation program in a display screen that does not allow for the program related parameters to be edited.

In another embodiment, the invention may be characterized as an irrigation controller comprising: a housing; a control unit within the housing, the control unit including a first microcontroller configured to execute stored irrigation programs and a first set of code of the control unit; and a removable plug-in device that removably mates with a portion of the irrigation controller such that the removable plug-in device is communicatively coupled to the first microcontroller, wherein the removable plug-in device comprises a memory storing a second set of code to replace at least a portion of the first set of code of the control unit, wherein the removable plug-in device is configured to re-flash at least a portion of the first set of code allowing a copy of the second set of code to be transferred to the control unit to overwrite at least the portion of the first set of code of the control unit; wherein the first set of code of the control unit comprises a bootloader that when implemented writes the copy of the second set of code over the first set of code of the control unit with the exception of the bootloader that is not written over.

In another embodiment, the invention may be characterized as a method of implementing irrigation, the method comprising: activating a first microcontroller of a control unit positioned within a housing; storing, in a controller memory of the control unit communicationally coupled with the first microcontroller, one or more irrigation programs and a first set of code of the control unit, wherein the first microcontroller is configured to implement the one or more irrigation programs and to execute the first set of code; receiving a removable plug-in device that mates to a portion of the irrigation controller, wherein the plug-in device when mated is communicatively coupled with the first microcontroller, wherein the removable plug-in device stores a second set of code configured to replace at least a portion of the first set of code of the control unit; and re-flashing at least a portion of the controller memory copying the second set of code from the removable plug-in device and overwriting at least the portion of the first set of code of the control unit with a copy of the second set of code transferred from the removable plug-in device to the control unit; wherein the re-flashing at least the portion of the controller memory comprises executing a bootloader code of the first set of code that implements the overwriting the first set of code with the copy of the second set of code over the first set of code of the control unit with the exception of the bootloader code that is not written over.

BRIEF DESCRIPTION OF THE DRAWINGS

The above and other aspects, features and advantages of several embodiments of the present invention will be more apparent from the following more particular description thereof, presented in conjunction with the following drawings.

FIG. 12 is an illustration of one embodiment of the interface pin assignments for the ribbon cable connection between the control panel and the backplane circuitry.

FIG. 20 is an illustration of one embodiment of the pinout assignments of the base module connector.

FIG. 21 is an illustration of one embodiment of the pinout assignments of the expansion module connector.

FIG. 22 is an illustration of one embodiment of the pinout configuration of the external expansion housing connector.

FIG. 25 is an illustration of one embodiment of the pinout assignments for the liquid crystal display of the control panel.

FIGS. 36-50 provide several embodiments of display screens for display on the LCD of user interface of the controller in accordance with one embodiment of the invention.

FIG. 66 is a block diagram representation of the expansion module indicating the configuration of the pins.

FIG. 67 is a block diagram representation of the smart module indicating the configuration of the pins.

Figure 1:
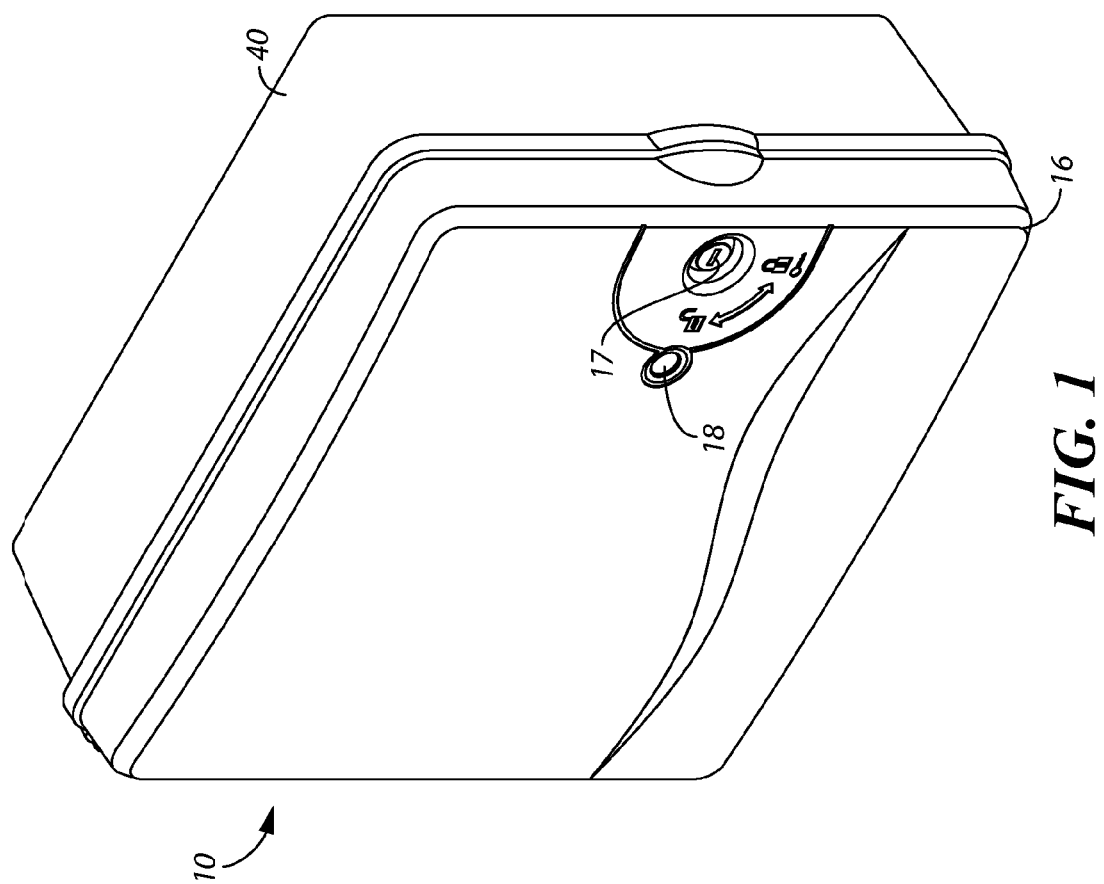
FIG. 1 is a three dimensional view of the irrigation controller according to one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Described herein are several embodiments relating to irrigation controllers for controlling irrigation stations. In many embodiments, the irrigation controllers are modular in that various functional components of the irrigation controller are implemented in removable modules that when inserted into position within the controller provide certain functionality. Accordingly, the embodiments described herein cover various functionalities, features and methods useful in such modular controllers; however, many embodiments apply to irrigation controllers generally. The following specification describes several embodiments of the invention in the context of two example modular controller implementations. For example, many embodiments of the invention are described in one or both of a modular controller as illustrated variously in FIGS. 1-51 and FIGS. 70-77, and a modular controller as variously illustrated in FIGS. 52-69 and FIGS. 70-77.

The present embodiments describe the modular capabilities of the irrigation controller as well as the ability to enhance and/or upgrade the controller. Some embodiments further provide abilities to provide new or revised operating code, instructions, software, programs and/or firmware to an irrigation controller without having to replace a processor or memory, and/or without having to take apart the irrigation controller. Firmware generally is a set of instructions, code and/or software that is embedded in a hardware device or memory. It is often provided on flash ROMs or as a binary image file on a computer readable medium.

Referring to the modular controller design, such as variously illustrated in FIGS. 1-51 and FIGS. 70-77, one embodiment of the invention, designated as irrigation controller 10, is generally illustrated in FIG. 1. According to several embodiments herein, the controller 10 is a modular irrigation controller that has an expandable architecture. As shown, the expandable architecture irrigation controller 10 is installed in a water-resistant controller housing 20 indicated in FIG. 2. When the unit is installed on site, typically on a wall or the like, through mounting holes 42, indicated in FIGS. 4 and 6, valve control wires and power wires 79 run through a wiring access hole(s) 41 at the bottom and the back of the rear housing 40 as seen in FIG. 5. Also provided are additional wiring access holes 41a and 41b in the event additional wires need access into the housing 20. This innovative irrigation controller 10 having an expandable architecture modular design allows for economical expansion as well as easy installation and addition of capabilities and features not found in other irrigation controllers. Further, the expandable architecture allows enhancements and/or upgrading of the irrigation controller 10.

The controller housing 20, formed of plastic or other suitable material, is designed to withstand various environmental conditions. In one form, the controller housing 20 includes rear housing 40 and door 16 that enclose the electrical components housed within the housing 20. In one embodiment, the housing 20 encloses the base unit 50, the base module 55 and a plurality of expansion modules 65 to protect their electronic components and connections. As described further throughout this specification, in preferred form, a plurality of different types of expansion modules 65 are provided that may be removably inserted in any one of one or more locations within the controller 10. Thus, in many embodiments, a controller 10 is provided with different types of expansion modules having different functionality with the same controller. Additionally, in many embodiments, expansion modules used as station outputs may have a different number of station outputs and be inserted in any one of one or more locations within the controller. Still further, some expansion modules provide functionality that is not provided through the controller 10. In some implementations, some expansion modules 65 cannot operate with a current operating version of the controller 10, and as such, the module can provide an upgrade or a new operating version of firmware, code, instructions, software and/or other operating code to a controller to allow at least in part the functionality provided by the expansion module to be utilized.

Figure 2:
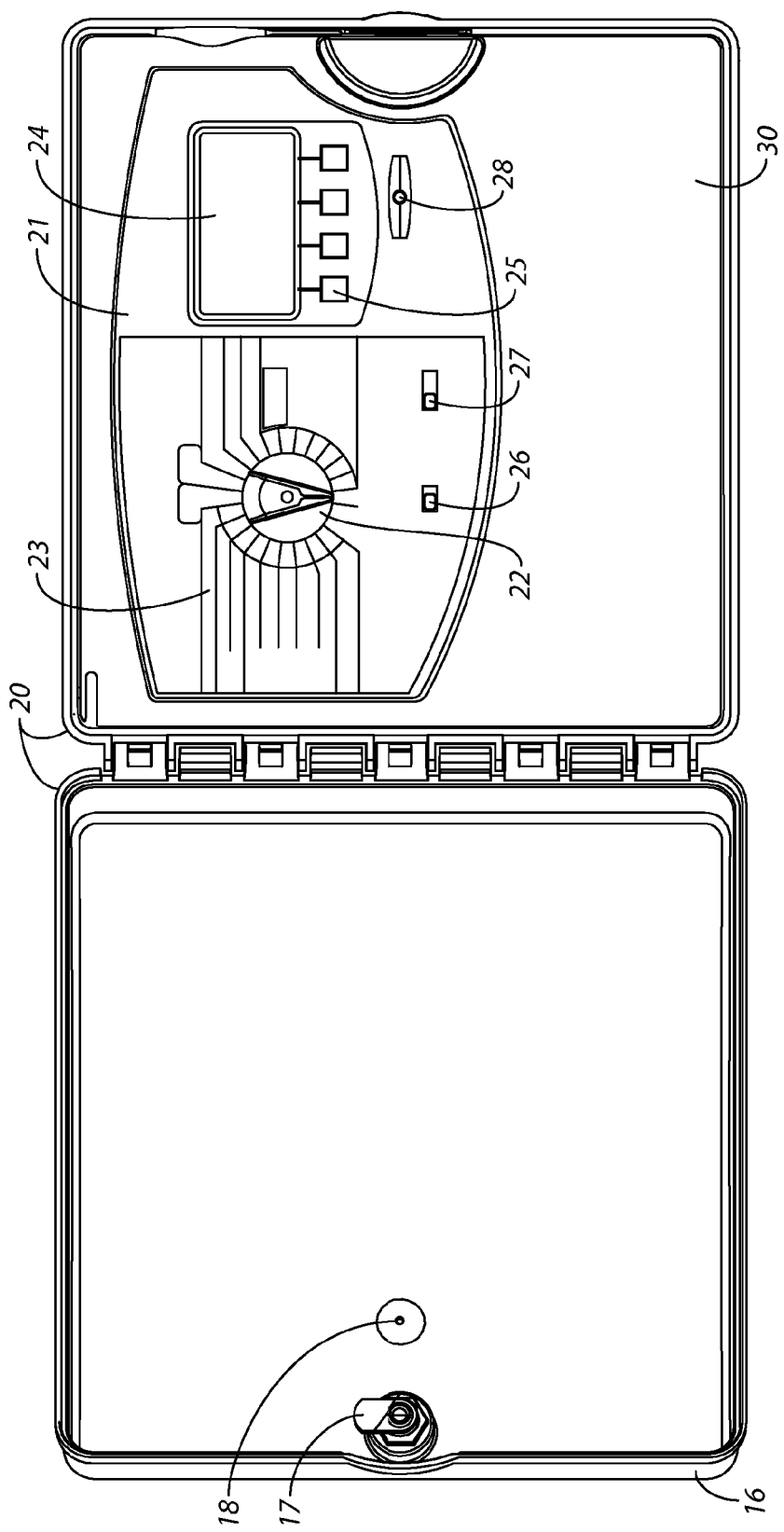
FIG. 2 is a front view of the open irrigation controller of FIG. 1 showing the control panel user interface and inside view of the door.
Figure 3:
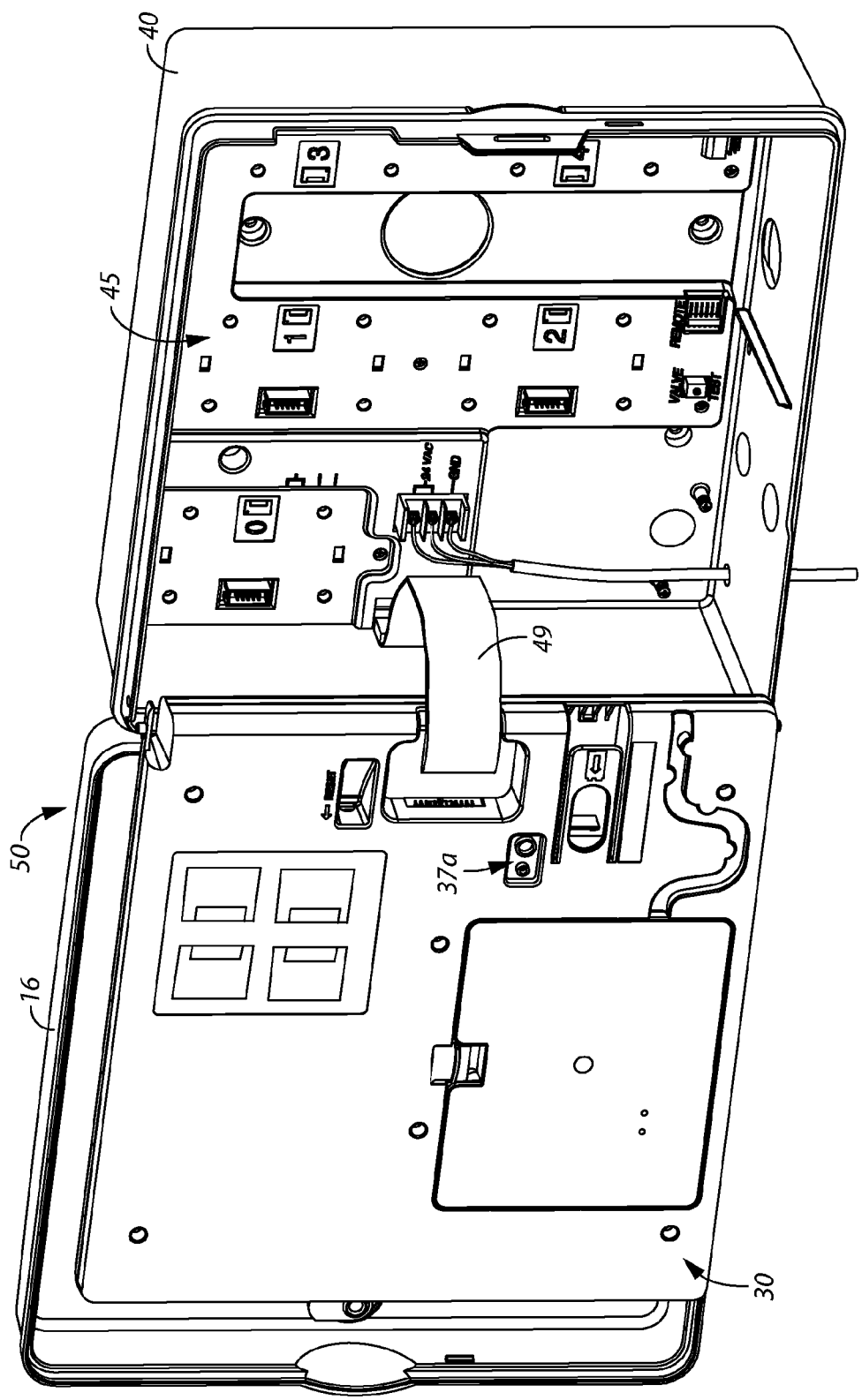
FIG. 3 is a three dimensional view of the open irrigation controller of FIG. 2 with the control panel also swung open, showing the backplane and its connection to the control panel through the ribbon cable.
Figure 4:
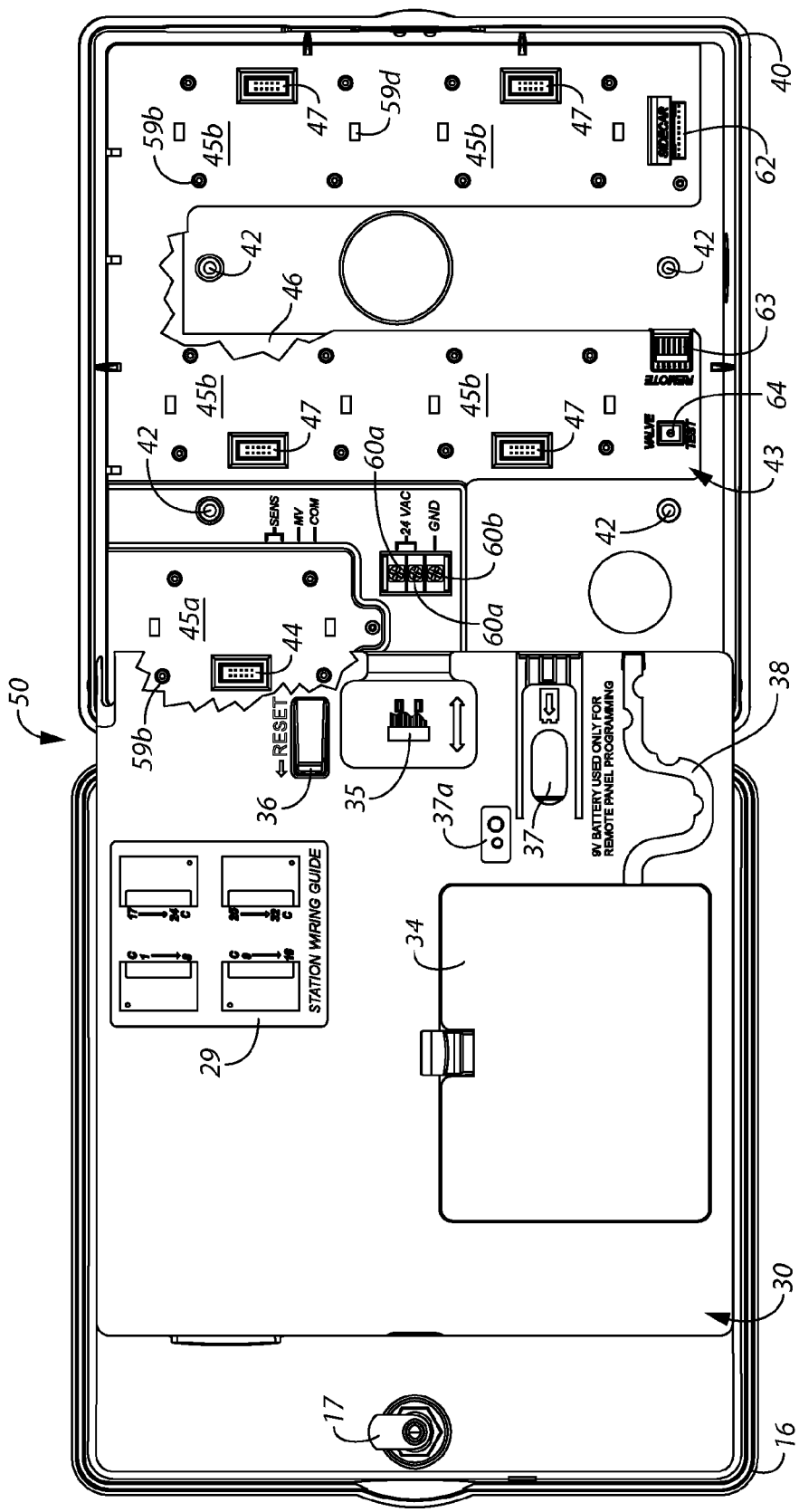
FIG. 4 is a front view of the open irrigation controller of FIG. 2 showing the back of the control panel and the interior of the rear housing and having a portion of the control panel cut away to show a larger portion of the base module receptacle and having a portion of the backplane cover cut away to show the backplane circuitry underneath the backplane cover.
Figure 5:
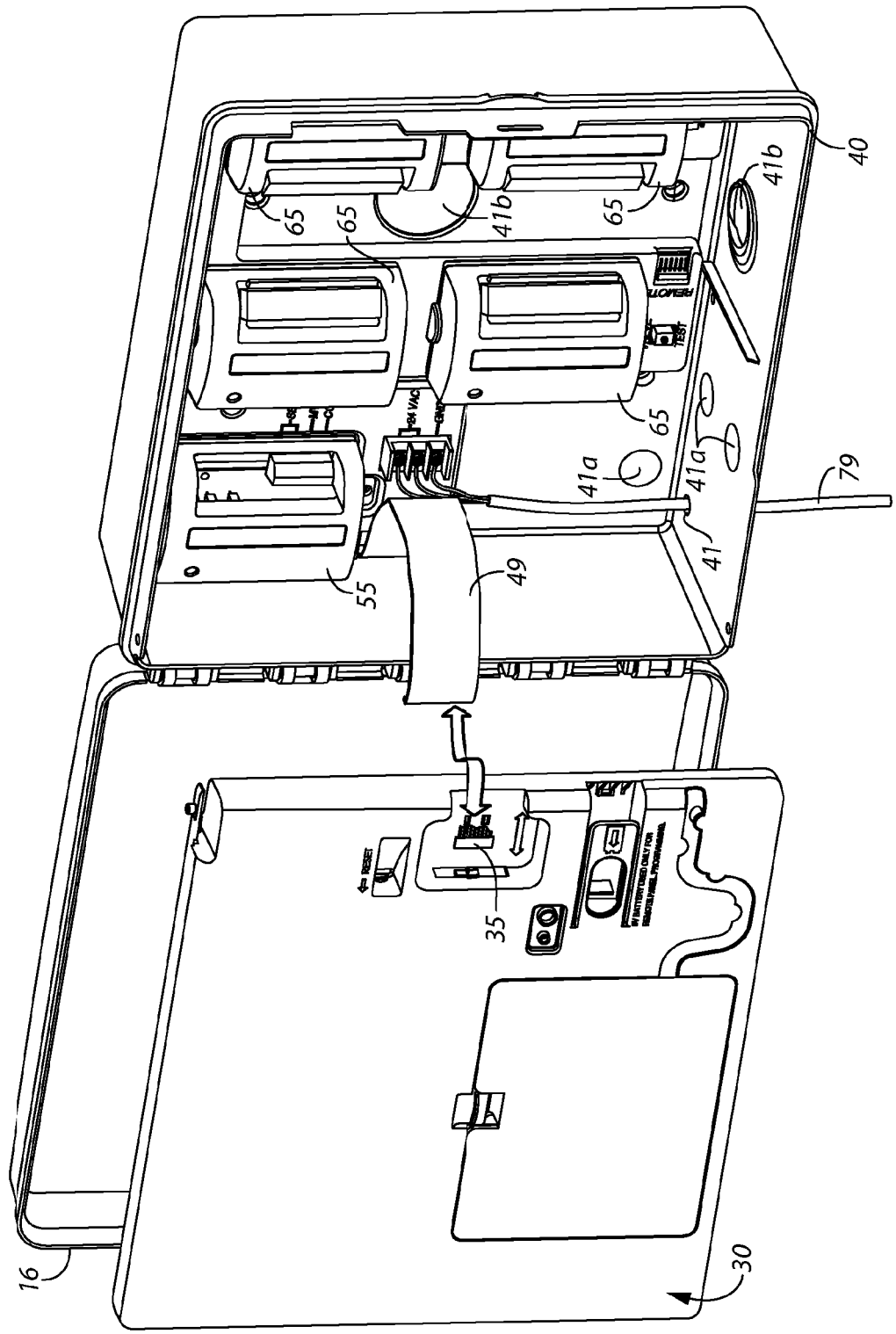
FIG. 5 is a three dimensional view of the irrigation controller of FIGS. 1-5 showing the base module and the expansion modules installed and the control panel detached.
Figure 6:
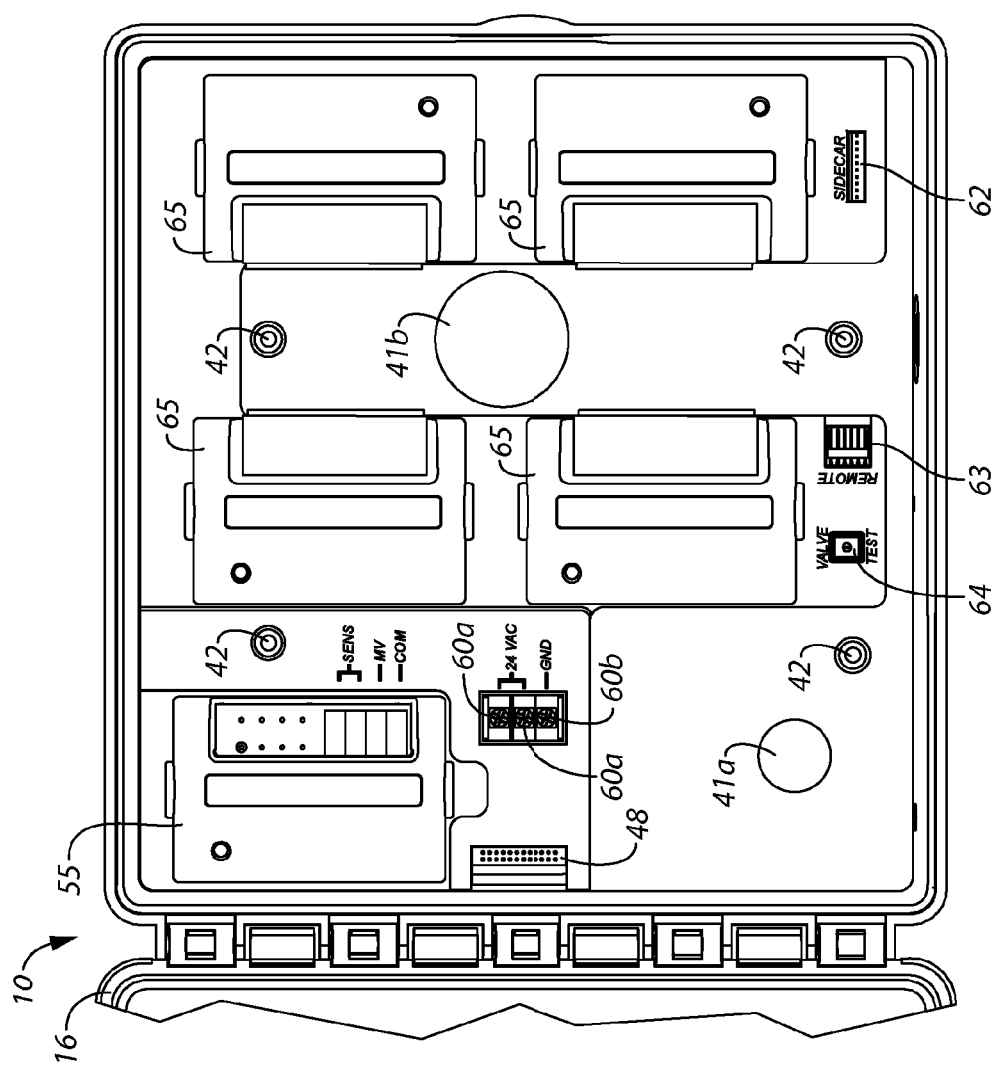
FIG. 6 is an enlarged front view of the open controller of FIGS. 1-5 with the door cut away, control panel removed and showing the interior of the rear housing with the base module and the expansion modules installed.
Figure 16:
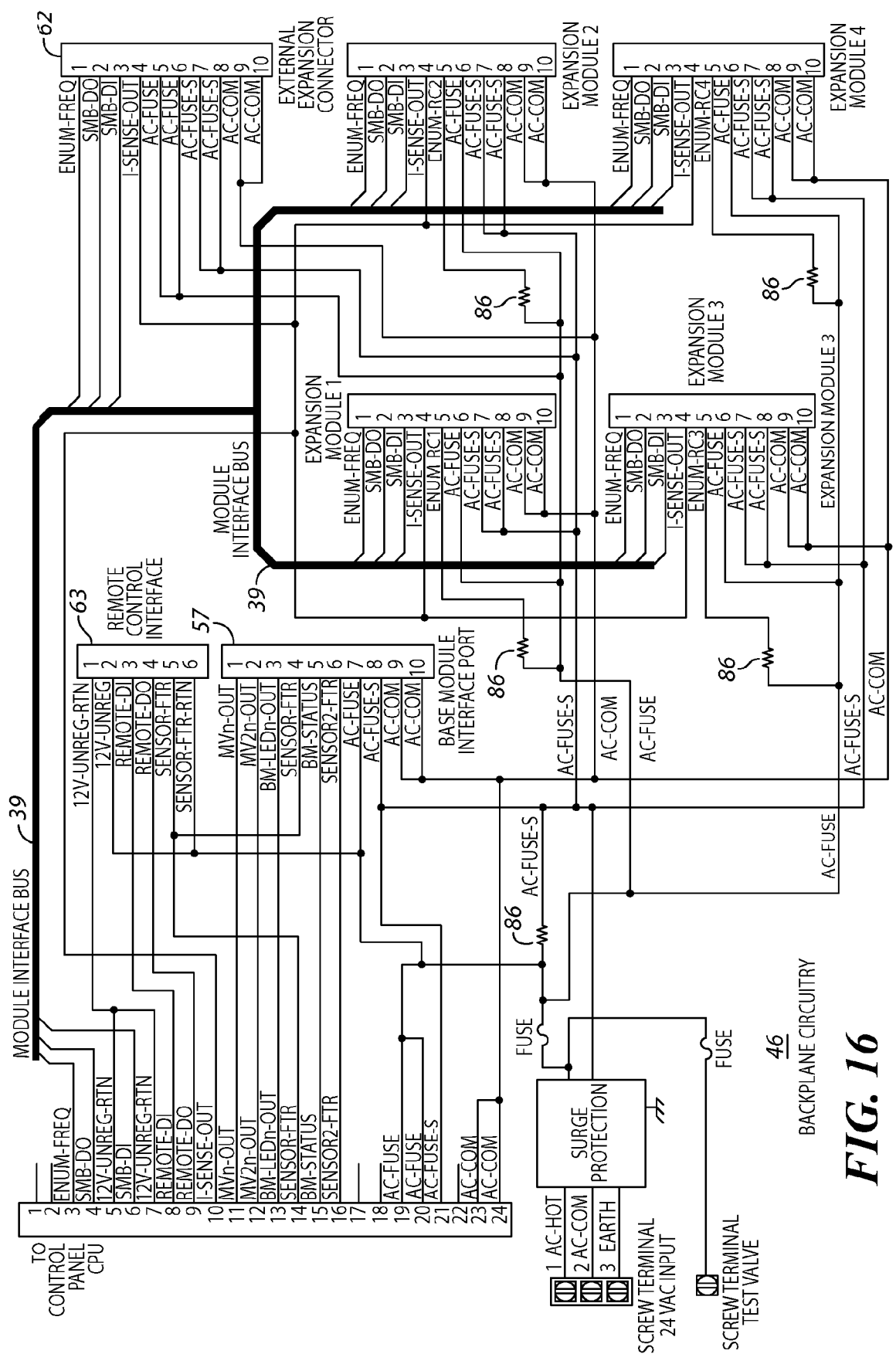
FIG. 16 is a schematic diagram of one embodiment of the backplane circuit.

The base unit 50, shown in FIG. 3 and FIG. 4, carries out basic irrigation functions and also performs other advanced functions. The base unit 50 is comprised of the control panel 30 (also referred to generically as the main control unit or the control unit) and the controller housing 20 as further indicated in FIG. 2 and accommodates the backplane 45 which is indicated in FIG. 3. The backplane 45 provides backplane circuitry 46 (one embodiment of which is illustrated in FIG. 16) to provide electrical interconnections between various components and modules to be housed within the housing 20.

The door 16 pivotally swings open from a closed position to an open position as seen in FIG. 2 to reveal the removable and programmable control panel 30 that includes a user interface 21 to enter and maintain an irrigation schedule and to display controller status and other functions. The door 16 contains an opening or hole 18 to provide direct viewing of the illuminating status indicator 28 on the control panel 30 when the door 16 is closed. The door 16 has a lock 17 to restrict access to the base unit 50.

Looking at FIG. 4, a battery compartment 37 is provided to accommodate the battery of the control panel 30. The storage posts 37a used for storage of a battery connector, also visible in FIG. 3, are recessed to facilitate flat placement of the control panel 30 on a table during programming, when the control panel 30 is detached from the base unit 50. Also provided is an optional station wiring guide 29 that may be adhered to an interior surface of the control panel 30 to provide easy identification of the various station modules.

The reset button 36 on the back of the control panel 30 consists of a right-angle mounted switch component (not shown) on the front side of the control panel circuitry 31 for easy and cost effective manufacturing and can be discretely actuated by a pencil or a screwdriver for hardware reset. The reset button 36 serves to restart the control panel microcontroller 32 from a potential lock-up condition possibly caused by electrical disturbances.

Indicated in FIG. 4, the communication wire retention channel 38 conveniently restrains and directs the communications cables (not shown) to the external communication interface 34a (see FIG. 10) while the external communication interface panel 34 is closed and the electronic components are protected against environmental damage.

Importantly, it is an objective of several embodiments of the invention to have the control panel 30 modular and removable from the controller housing 20 and the base unit 50, as seen in FIG. 5. Advantageously, the control panel 30 can be programmed with irrigation schedules by a user while detached from the rest of the base unit 50. A pin and socket mechanism 35, plus a ribbon cable 49 connection to the backplane circuitry 46 of the back plane 45 permits the control panel 30 to be removed from the base unit 50. To provide power so that the control panel 30 can be removed and programmed independent of an outside power source, a battery (not shown) is provided in the recessed battery compartment 37, seen in FIG. 4, at the back of the control panel 30. This further provides additional flexibility and economic advantage in that, for example, a damaged control panel can quickly be changed and replaced with a new control panel without the need to replace the entire base unit 50. It is noted that while in many embodiments, the control unit or control panel 30 is modular and removable, in other embodiments, the control unit is integral to the controller housing and not intended to be removable.

Figure 11:
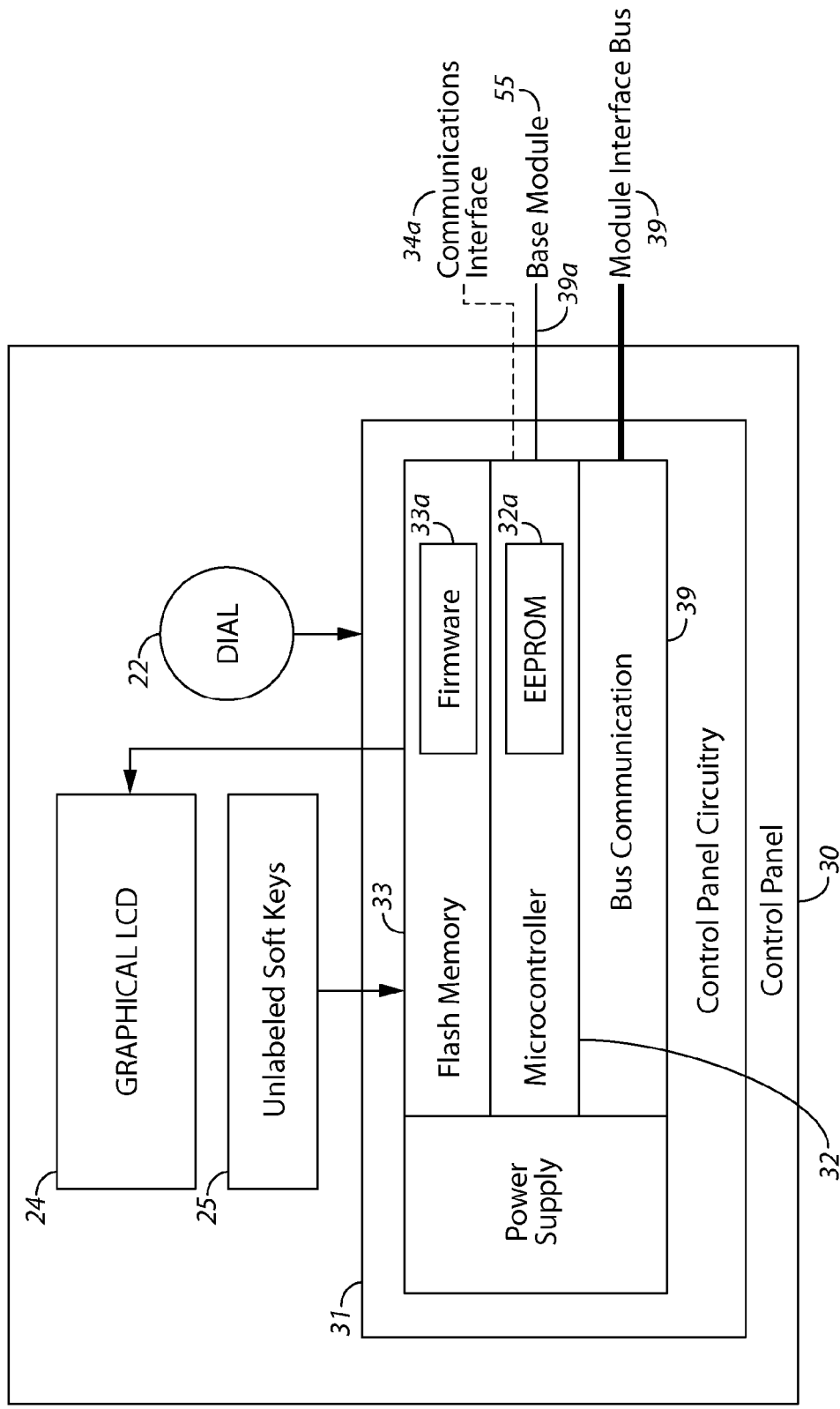
FIG. 11 is a block diagram of one embodiment of the control panel.

Now looking at FIG. 11, located within the control panel 30, the control panel circuitry 31 includes the main microcontroller 32 that communicates with base module 55 through base module signal lines 39a extending through the backplane circuitry 46 and the pins of a base module connector 44. The main microcontroller 32 also communicates with the expansion modules 65 through a communication bus 39 extending through the backplane circuitry 46 and the pins of the module connectors 47 (shown in FIG. 4) to control the irrigation functions as defined in the irrigation program as well as the other functions contained in expansion modules 65. Depending on the implementation, the bus 39 may be a serial or parallel bus. In preferred form, the communication bus is a multi-drop serial bus and is described further below. It is also noted that as used throughout this specification, the term "microcontroller" refers to an electrical device that minimally includes a processor logic (e.g., one or more microprocessors), memory (e.g., one or more memory devices), and inputs and outputs and is adapted to execute instructions based on information stored in memory either within the microcontroller or external to the microcontroller. Microcontrollers as used herein also include any necessary timers and/or clocks.

It is also an object of several embodiments of the invention to have the communications interface port 34a, as part of the control panel circuitry 31, connecting to a plurality of modular cartridges (not shown) facilitating a communications link via a plurality of media such as a radio modem, a telephone modem, wireless networks, hard-wired or fiber optic systems, etc. interfacing to a plurality of computers and networks. Such communications link allows the irrigation controller 10 to intercommunicate for various commands including those for irrigation, for the update of the firmware 33a without the removal of any electronic components from the irrigation controller 10, and for the uploading and downloading of irrigation schedules. Also, the schedules that the user has entered at the control panel 30 may be extracted and sent to a central control system via the communications interface 34. In one example, the communications interface port 34a uses a dual-sided 2×5-pin edge card type with pin assignments illustrated in FIG. 26.

Figure 10:
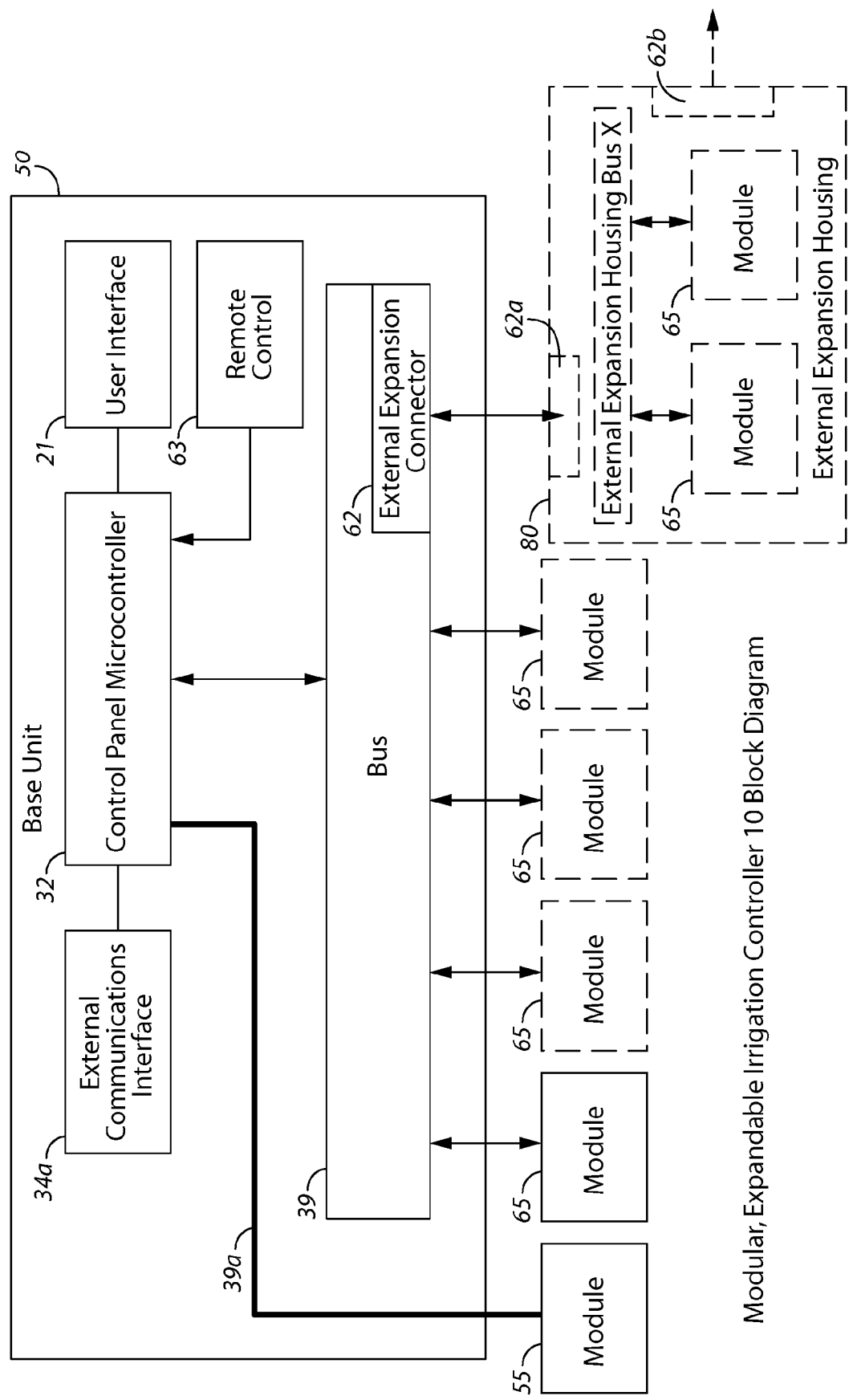
FIG. 10 is a block diagram of one embodiment of the irrigation controller of FIGS. 1-7.

The main microcontroller 32 gathers information or commands from the user interface 21, processes them and sends the commands to the base module 55 via control signals and to the expansion modules 65 via the communication bus 39 to drive the valves. As illustrated in FIG. 10, the control panel microcontroller 32 also has the ability to interface with other external peripherals including expansion modules 65, external expansion housing(s) 80 including additional expansion modules 65, and the external communications interface 34a. The expansion modules 65 are provided in many different forms including an expansion module that provides additional station outputs to control additional irrigation valves, an expansion module that provides outputs to devices other than to additional irrigation stations, an expansion module that provides inputs to the main microcontroller 32 (e.g., in the form of external conditions provided by sensors), a smart expansion module that provides additional functionality not originally found in the main microcontroller 32 as originally configured, one or more expansion modules that upgrade the irrigation controller 10 and/or provide new or revises operating code(s), instructions and/or firmware 33a that at least in part allows the irrigation controller 10 to operate according to the new or revised firmware to control irrigation and/or interaction with modules, and interface extension smart expansion modules that provide functionality to direct the main microcontroller to provide a user interface extension to the expansion module so that the expansion module can performed its additional functionality.

Figure 14:
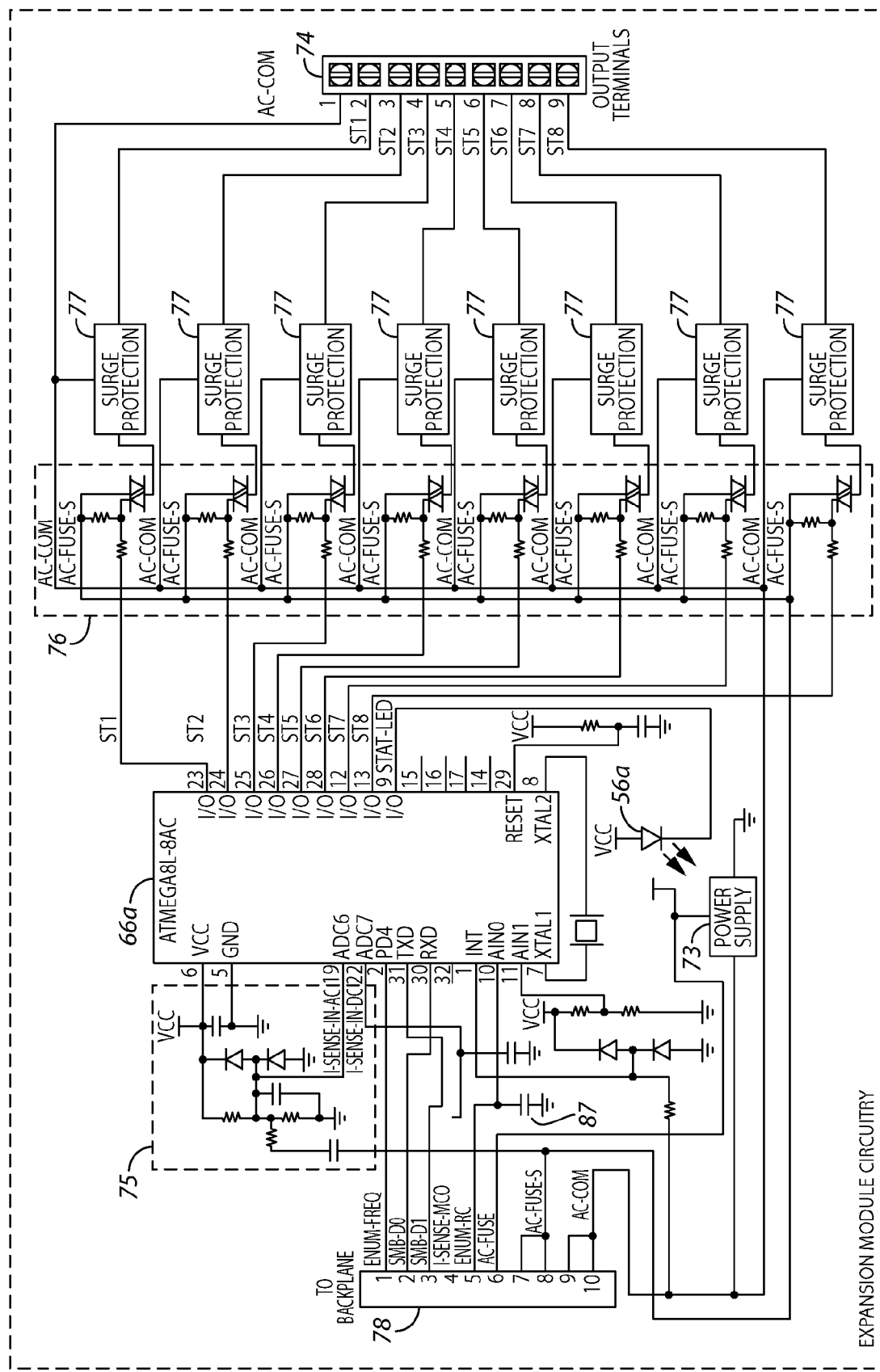
FIG. 14 is a schematic diagram of one embodiment of an expansion module functioning as a station output module.
Figure 17:
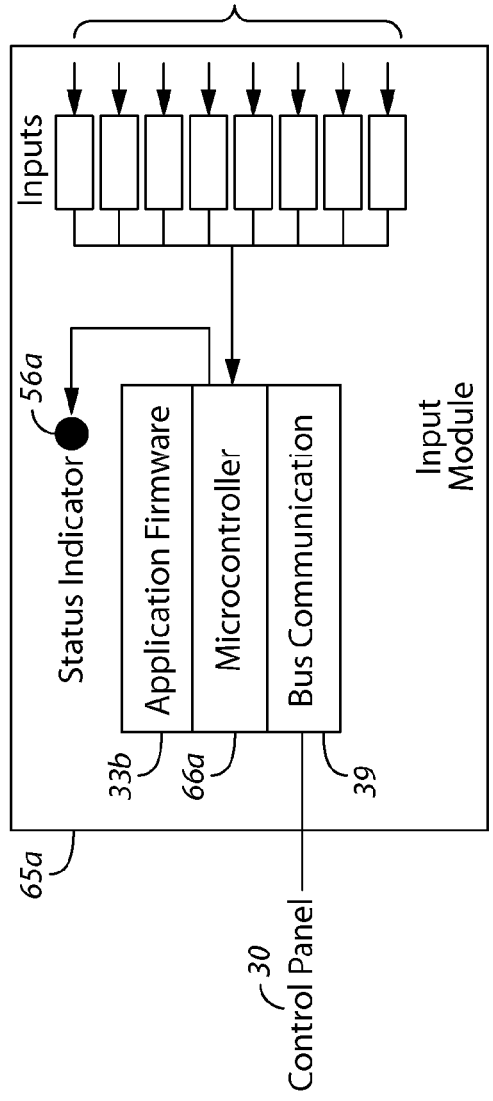
FIG. 17 is a block diagram of one embodiment of an expansion module functioning as an input module.
Figure 18:
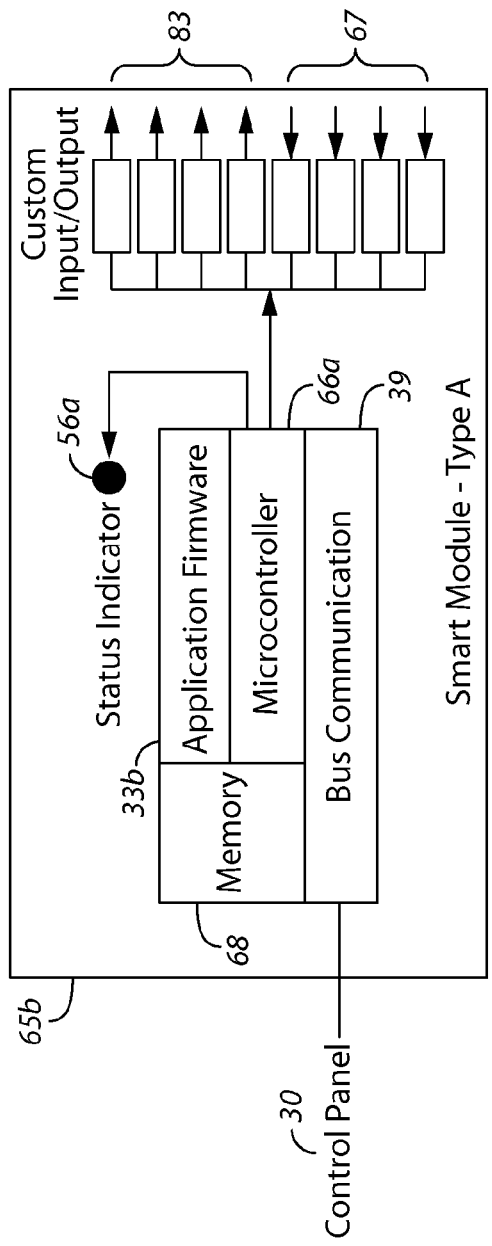
FIG. 18 is a block diagram of one embodiment of an expansion module functioning as a smart expansion module.

In many embodiments, the main microcontroller 32 and the communication bus 39 have an architecture that allows the main microcontroller of the main control panel 30 to work together with the expansion modules 65 in order to implement the functionality of the irrigation controller 10. For example, in preferred form, one or more of the expansion modules 65 include their own microcontroller, e.g., microcontrollers 66a as seen in FIGS. 14, 17 and 18. In smart expansion modules, the microcontrollers 66a of the expansion modules are adapted to communicate with and share data with the main microcontroller. The main microcontroller is configured to be able to accept additional expansion modules and work together with them. For example, the main microcontroller is configured to be able to transmit data, parameters or variables which correspond to or are a part of one or more irrigation programs stored by the main microcontroller, in response to requests from the expansion module(s) 65 for such data, parameters and variables. Additionally, the main microcontroller 32 is configured to accept and store changes updates and/or replacements to parameters, variables, one or more irrigation programs as provided by an expansion module, operating conditions, operating code and/or firmware. For example, in one embodiment, an expansion module 65 receives a copy of a stored irrigation program from the main microcontroller 32, adjusts the program based on the functionality of the expansion module 65 and sends the updated irrigation program to the main microcontroller to replace the existing irrigation program. Advantageously, such architecture allows an irrigation controller to be designed while allowing for expansion modules to be designed to add additional functionality to the capabilities of the irrigation controller. The additional functionalities may not even be known at the time of the manufacture of the irrigation controller 10 and the control panel 30; however, since the main microcontroller is configured to share its data and accept data and control signaling from an expansion module, the capabilities of the irrigation controller may be expanded without requiring that a user purchase a new irrigation controller. Instead, the user would simply purchase a new expansion module 65 having the desired functionality. Accordingly, additional functionality can be provided to the irrigation controller 10 through the use of some types of expansion modules 65 without requiring that any firmware or software in the main microcontroller 32 be added, changed or replaced. Further, some expansion modules 65 provide updates to operating code of the control unit 30 and/or replacement of code, instructions and/or firmware 33a (referred to generally herein as firmware) implemented by the main microcontroller 32 to enhance the irrigation controller 10 without having to replace the irrigation controller.

Generally, this type of coordinated operation between the main microcontroller 32 of the control panel 30 and the various expansion modules 65 is provided through the configuration of the main microcontroller 32 to be able to operate together with expansion modules of unknown functionality and its ability to share data with the expansion modules 65 and ability to act in response to data and commands from the expansion module. Additionally, a communication link and protocol are provided that allow data flow between the main microcontroller 32 and the various expansion modules 65. Further details and description are provided throughout this specification.

The main microcontroller 32 is also capable of directly monitoring other inputs such as the valve solenoid current, the presence of the base module 55, sensor inputs (e.g. rain and flow), and the AC line frequency. In addition to the user interface 21, the main microcontroller 32 is able to accept commands through the remote control port 63, shown in FIG. 4, and an external communication interface 34a, illustrated in FIG. 10.

Importantly, it is an objective of several embodiments of the invention to provide a communication link between the main microcontroller 32 and the distributed microcontrollers 66a of the expansion modules 65, seen in FIG. 14. In one embodiment, the communication protocol uses a physical layer based on a 9-bit capable Universal Synchronous Asynchronous Receiver Transmitter (USART). This provides an addressing mechanism internal to the USART that avoids continuously interrupting the distributed microcontrollers 66a. The USART utilizes a serial protocol on the module communication bus 39 that has a plurality of data in and data out pins as well as an optional serial clock pin. The transmission of data from the main microcontroller occurs on the data out pin (e.g., SMB-DO of FIG. 12) and the reception occurs on the data in pin (e.g., SMB-DI of FIG. 12). A serial clock is used in the case of synchronous data communication only. In the case of asynchronous communication, the serial clock pin is not used. In various forms, the communication protocol for communications on the bus 39 works with asynchronous data communication or with synchronous data communications when a serial clock is provided. However, the irrigation controller 10 takes the technology a step further by programming the microcontrollers 66a of the expansion modules to configure their serial data out pins to be in high impedance mode until they are addressed. For example, in one embodiment, the main microcontroller 32 always drives its data out pin actively as it is the only device driving this signal. When individually addressed, each distributed microcontroller 66a of the expansion modules 65 re-configures its serial transmit data out pin (e.g., SMB-DI of FIG. 21) on-the-fly to drive the data bus 39 and transmit data on this pin. Consequently, several embodiments offer a communications protocol that can be extended and modified with minimum impact on the rest of the system. The bus 39 could be expanded to virtually any length and the expansion modules could be located remotely from the irrigation controller 10 either independently or located in an external expansion housing(s) 80. It is noted that the USART is a well known communication protocol. Accordingly, the communication bus is a multi-drop bus structure in that all expansion modules 65 are coupled to the same bus 39 and each pulls any communications intended for it from the bus through the addressing mechanism of the USART. In preferred form, the bus 39 comprises a serial data bus; however, it is understood that in other embodiments, the bus 39 has a parallel line structure.

Interconnect communication busses in existing modular irrigation controllers use a master/slave architecture. For example, the controller of U.S. Pat. No. 5,748,466 (McGivern et al.) employs a query/response model with the main microcontroller making a query to the module and expecting a response from it to ascertain the number of stations installed in the irrigation controller. Such a query/response relationship of the controller and modules results in unnecessary overhead and bandwidth usage on the interconnecting bus, becoming a limiting factor in expansion capability. Further, such overhead can reduce the operating speed of the system. Several embodiments of the invention solve this problem by having the expansion module 65 self-detect its installation and announce its presence to the main microcontroller 32. Generally, the microcontroller 66a of the expansion modules is configured to detect when it is connected to the connector 47 of the backplane 45. Once this determination is made, the microcontroller 66a causes a message to be transmitted to the main microcontroller via the communication bus 39 announcing that the expansion module has been installed. The microcontroller 66a waits for an acknowledge message back from the main microcontroller 32. If no acknowledge is received, the microcontroller 66a sends additional messages to the main microcontroller 32 until the main microcontroller 32 acknowledges the presence of the expansion module 65. Therefore, since the expansion modules are configured to self detect their installation in the controller 10, the main microcontroller 32 does not need to query the expansion modules 65. This results in saved overhead and bandwidth usage allowing the irrigation controller 10 to self-configure and provide for more overall expansion capacity with less demand on the main microcontroller 32 and the bandwidth of the communication bus 39.

It is an object of several embodiments to make the programming of a watering schedule into the irrigation controller 10 free of historical challenges that users have been facing with the prior art irrigation controllers. One embodiment solves the problem of difficult entry and incorrect setup of a watering schedule into existing controllers through the incorporation of a water wizard for easy setup, programming and use. The water wizard allows the irrigation controller 10 to confirm automatically that a watering schedule entered by the user is consistent and logical and guides the user through the programming steps necessary to setup the irrigation controller 10 and program a watering schedule into it. This intelligent water wizard is based on the main microcontroller 32 built into the irrigation controller 10. The water wizard guides the user through a series of logical steps, asking only for the needed information in an intuitive form and subsequently creating a schedule to satisfy the needed irrigation. For example, the water wizard asks if the irrigation is for lawn, trees or shrubs. Then it asks what the soil type is. And then it inquires about the Sun exposure. The water wizard would ask for a specific zone or watering time as necessary to complete the irrigation schedule. This union of native human language with the logic of an irrigation controller has been unprecedented in the art of inventing irrigation controllers.

It is a further object of other embodiments to include a novel water-conserving feature in which the user interface 21 provides 'program review' and 'total run time' features. Using the program review feature, the controller 10 displays to the user, e.g., on the LCD 24 (generically referred to as a display 24), a listing of all stations and watering times on a single display screen or series of displays screens that a user may scroll through. Advantageously, the user does not have to manipulate the rotary dial 22 or navigate complex menus in order to separately view irrigation settings or the irrigation program for various stations.

FIGS. 36-48 provide display screens generated for display on the LCD 24 that provides program review features in accordance with an embodiment of the invention. In the following display screens, text provides the information while the bottom edge of the screen indicates which soft key 25 should be pressed to select a function or go forward or backwards through the display screen sequence. FIG. 36 illustrates the main display that allows the user to review programmed information for troubleshooting or other purposes. For example, the display of FIG. 36 allows the user to select the soft key below "1" to select option 1—confirm programs, while soft key below "2" selects option 2—test all valves. Selecting option "1" prompts the display screen of FIG. 37 to be displayed. This display screen allows the user to select between three options: 1—program review, 2—program run time, and 3—valve run time. In accordance with one embodiment, selecting option 1 enters the user into the program review display sequence of FIGS. 38A through 48 in which the user can review the programmed status of all stations and their watering times.

In response to selecting option 1 in the display screen of FIG. 37, the display screen of FIG. 38A is displayed. This screen displays the watering start times for all valves 1, 2, . . . , 8. It is noted that if no start times are programmed, the display screen of FIG. 38B is displayed instead of the screen of FIG. 38A. Furthermore, it is noted that this display screen and the other displays screens of FIGS. 38A through 48 illustrate the status of program A. To view the status of programs B, C, etc., the user simply moves the program selector switch 27 to the appropriate program.

Selecting the soft key corresponding to "next" in the screens of FIG. 38A or 38B results in the display screen of one of FIG. 39A, 39B, 39C, 39D or 39E providing the watering day cycle for the selected program to be displayed depending on whether the watering day cycle is cyclical, custom, odd, odd 31, or even. Selecting the "next" option in any of the displays of FIGS. 39A-39E displays the display screen of FIG. 40, which then provides the watering days (based on the watering day cycle). Selecting the "next" option in the display of FIG. 40 displays the display screen of FIG. 41, which then provides the run times for each valve. The soft keys corresponding to "+" and "−" allow the user to scroll through more valves not fitting on one the single display screen. Selecting the "next" option in the display of FIG. 41 displays the display screen of FIG. 42, which then provides the amount of seasonal adjust (e.g., 115%). If there is no seasonal adjust present (e.g., the value is 100%), the display screen of FIG. 42 is skipped. Selecting the "next" option in the display of FIG. 42 (or FIG. 41 if FIG. 42 is skipped) displays the display screen of FIG. 43, which then provides the number of rain delay days remaining. Again, if there are no rain delays days remaining, this display screen is skipped. Selecting the "next" option in the display of FIG. 43 (of FIGS. 41, 42 if there is a skipped display) displays the display screen of FIG. 44, which then provides the status (e.g., either "on" or a programmed "off" day) for each calendar day. The "+" and "−" allow the user to scroll through subsequent and previous days while indicating the status for that day. Selecting the "next" option in the display of FIG. 44 displays the display screen of FIG. 45, which then provides any programmed valve delays. Selecting the "next" option in the display of FIG. 45 displays the display screen of FIG. 46A, which then provides cycle and soak times for all valves. In the illustrated embodiment, since all valves will not fit on the same display screen, the "+" and "−" soft keys allow the user to scroll through the valves. For example, pressing the "+" key once advances the list to the display screen of FIG. 46B to reveal valve 06 and remove valve 01. Likewise, pressing the "+" soft key further, further advances the display to the display of FIG. 46C and eventually to the display of FIG. 46D. Selecting the "next" option in any of the displays of FIGS. 46A-46D displays the display screen of FIG. 47, which then provides the status of the master valve or pump for valve 01. Again, the user may press the "+" and "−" soft keys to scroll through more valves. Selecting the "next" option in the display of FIG. 47 displays the display screen of FIG. 48, which then provides the status of a sensor override (e.g., overriding the rain sensor) for each valve. The user can use the "+" and "−" soft keys to scroll through more valves. The display screens of FIGS. 36 through 48 provide one embodiment of a program review feature in the display menus that allows a user to easily review the entire program for any program A, B, C, etc., and switch between the same display information for different programs easily (by using the program selector switch 27) in a simple intuitive manner. This is in contrast to known controllers that require a user to traverse through extensive programming menu systems to retrieve the same information.

Figure 49:
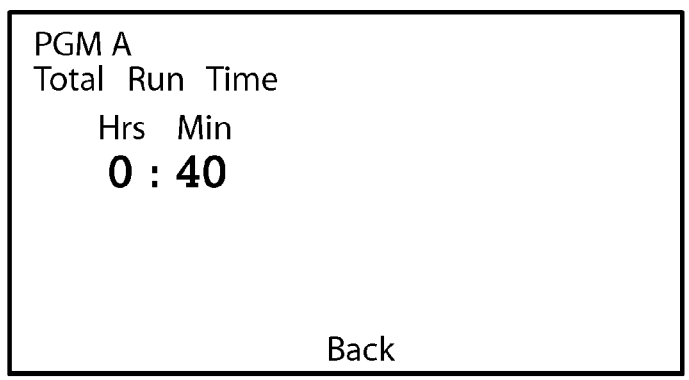
Figure 50:
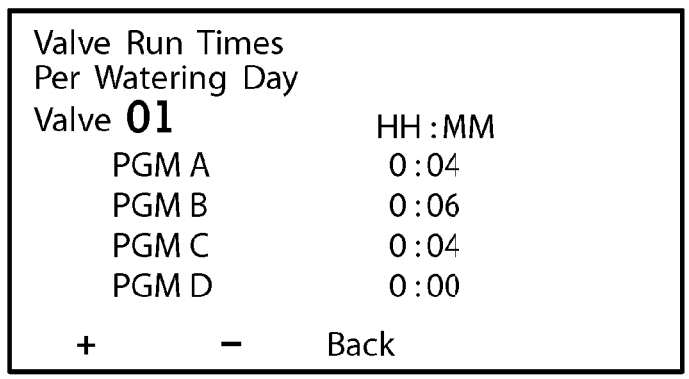

FIGS. 49 and 50 illustrate one embodiment of a screen display provided by the user interface 21 to display 'total run time' features. For example, selecting the option "2" in the display of FIG. 37 displays the display screen of FIG. 49, which then provides the total run time for the program representing the total watering time per day for that program. Alternatively, selecting option "3" in the display of FIG. 37 displays the display screen of FIG. 50 which provides the total run time per watering day per valve to be displayed on the LCD 24 of the user interface 21. These total run time display screens allow contractors, water auditors and homeowners to see exactly how much irrigation will occur per day based on the controller's settings. The total run time calculations include many factors including watering time, cycle and soak settings and the effects of seasonal adjust. It assumes there is no interference from a stacking effect, rain sensor, central control, or user intervention. Such calculations and ease in retrieving them through the user interface represents a significant advance in the user interface for irrigation controllers.

One advantage of the various program review user interface display screens, such as shown in FIGS. 36-50, is that this interface only allows the user to "review" the programs and parameters. In this interface, the user cannot make changes to the program as the user is trying to review the program. This user interface solves a problem encountered in many controllers in which while attempting to review a given program or parameter, a user accidentally makes changes to the program (since when viewing program information in such controllers, the user has entered programming interface displays and menus).

Irrigation controllers are being provided with more and more features, buttons, labels and ever thickening manuals while trying to provide the user with more feedback and while supposedly simplifying the user interface, but ultimately adding to the complexity. Several embodiments answer the user interface complexity problem in the field of art, by pushing the complexity into the internal computer program logic of the irrigation controller 10. Basically, the user is asked about the watering or typical conditions or constraints existing on the landscape. The irrigation controller 10 configures itself in terms of the overall watering needs and objectives. This "Intelligent Use of Water" TM concept relieves the user of having to know detailed information about station run times, optimum watering time of the day, start times, number of start times, etc.

In one embodiment, the irrigation controller 10 intelligently stores and recalls module programming and configuration information in order to eliminate the need to reprogram the controller or expansion module when expansion modules are changed. For example, information unique to each expansion module is stored in a configuration data table residing in the non-volatile storage device (EEPROM) 32*a* of the main microcontroller 32 (see FIG. 11). As an alternate embodiment, this same configuration data could be stored in the flash memory 33. This configuration data typically represents data that is specific to the expansion module 65. For example, the configuration data may include: what type of module the expansion module is (e.g., whether it is a station expansion module, an input module, a decoder module, etc.); how many station outputs are provided by the expansion module; how many and what type of inputs are provided by the expansion module; in the event the expansion module receives inputs from sensor devices, what type of sensor devices the expansion module is coupled to (e.g., moisture, rain, wind sensors), etc. This configuration data is transferred to the main microcontroller 32 from the microcontroller 66*a* of the expansion module 65 over the bus 39. This data is then stored in the non-volatile configuration data table. When the configuration data needs to be installed into a new replacement module, the data is recalled from the non-volatile memory and transferred to the module over the bus 39.

When a given expansion module 65 is removed and replaced by an identical expansion module (or a different module with similar function), all configuration data and programming related to the expansion module removed is retained by the controller 10 and is applied to the replacement expansion module. In one embodiment, the module location and module's electronic SKU (stock keeping unit) number are used to track if a "new" module in a module mounting location 45*b* can accept the data. Once the newly installed expansion module 65 announces its presence to the main microcontroller 32 of the control unit, the configuration data table is scanned to verify that the same type of modules are mounted in the controller housing. If there is a match, the newly installed expansion module is passed the programming and configuration data already existing in the non-volatile memory 32*a* (or 33) eliminating the need for the user to reprogram the expansion module configuration or irrigation schedule. In the event there is not a match, then the main microcontroller 32 determines that the newly installed expansion module is not identical to the removed module or is not intended to be a replacement for the removed expansion module, and the stored configuration data may be deleted or overwritten with new configuration data if the memory is needed.

Irrigation controllers are growing in complexity with each generation. According to several embodiments, the use of a Real Time Operating System (RTOS) in the main microcontroller 32 of the irrigation controller 10 simplifies and makes the operation of the microcontroller 32 more robust. It allows for a more complex program to be developed that is more robust and of higher quality in a shorter amount of time. In preferred form, the controller 10 employs the real time operating system (RTOS) to allow separate program sections to communicate between themselves in a well-defined fashion. Since each piece of program runs independently in its own context, it is easier to write and read the supporting software as well as to troubleshoot software bugs during the development stage and have a bug-free software running in the irrigation controller 10.

The microcontroller 32 of the main control unit or control panel 30 houses non-volatile memory backup (EEPROM) 32*a*, shown in FIG. 11, which is used to store and maintain, while the power is off, information provided as input, via the user interface (UI) 21, remote control port 63 or the communications interface 34. This non-volatile memory backup 32*a* on the main microcontroller 32 maintains the watering schedule details, module data and other system parameters upon line power outage.

Also shown in FIG. 11, the firmware 33*a* for the irrigation controller 10 is stored in the flash memory 33. This flash memory allows the firmware 33*a* to be updated in the field without the need to replace the main microcontroller 32, by using an expansion module 65*c*, referred to as a re-flash module (one example of which is illustrated and described further in connection with FIGS. 32-33 and 70-77) or through the communications interface 34a without the need to replace any physical component on the controller 10.

Figure 35:
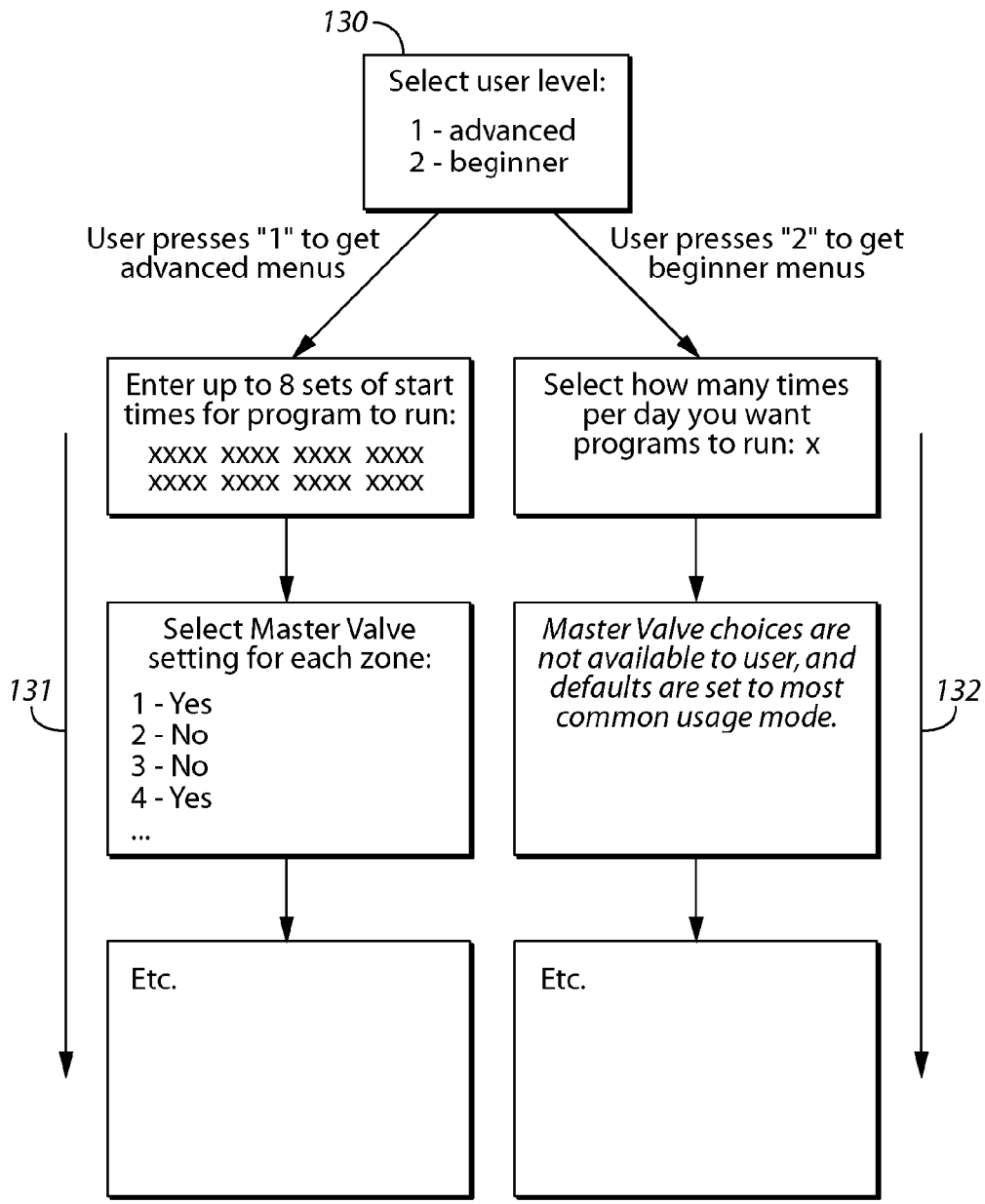
FIG. 35 is one embodiment of a display screen sequence in which a user can select a user group, which then alters the display screen and programming sequence.
Figure 39C:
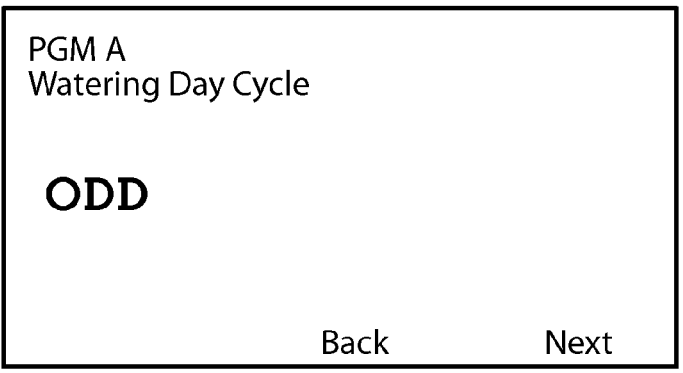
Figure 39D:
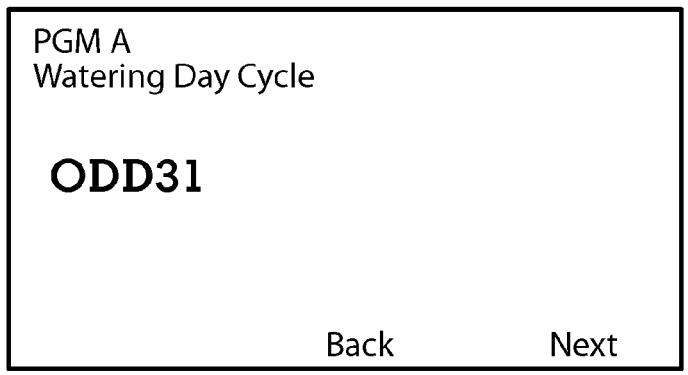
Figure 39E:
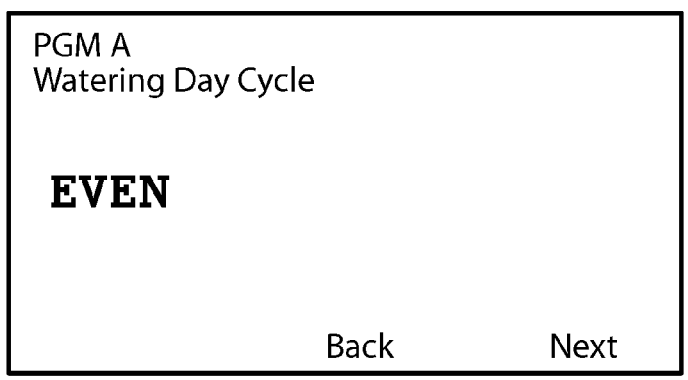

One of the objectives of another embodiment is to customize the user interface 21 according to the needs of the different user groups such as the contractors or the commercial users and novice users who lack experience in programming controllers. One embodiment solves the problem of having to design/redesign an irrigation controller according to the changing interface demands of the different user groups such as a classic contractor, a modern contractor, a novice user, etc., by offering a simple menu of user groups. The user simply makes a selection based on what user group they belong to and the overall user interface 21 changes with display driven menus tailored exclusively for that specific user group. For example, according to one embodiment, the user is able to specify in a user interface display settings display screen what type of group the user/programmer of the irrigation controller belongs to: a modern contractor (a contractor who is accustomed to modern methods to program an irrigation controller), a classic contractor (a contractor who is accustomed to a traditional method of programming an irrigation controller), or a novice (a user not familiar with the programming of an irrigation controller). Once the user selects which group the user belongs to, the user interface (i.e., the display screens and programming sequence) are presented to the user accordingly. Thus, the programming process the user must navigate to program the controller will vary depending on which group the user selects. One embodiment is illustrated in FIG. 35, which presents a programming setup display screen 130 offering the user to select whether the user is an advanced user, such as a contractor (option 1) or a beginner (option 2). Once the user selects which group the user belongs to, the display screens and programming sequence changes. For example, if the user is advanced, display screen sequence 131 is followed, while if the user is a beginner, display screen sequence 132 is followed.

As seen in FIG. 2, the user interface (UI) 21 consists of a rotary dial 22 for programming, a plurality of indicators 23, a liquid crystal display (LCD) 24 (generically referred to as a display), a status indicator 28 (e.g., a visual and/or audible alarm) to alert the user to a status condition, the unlabeled soft keys 25, a sensor switch 26, and a program selector switch 27. In one embodiment, the status indicator 28 indicates the status of the functionality of the control panel 30. For example, when flashing, the status indicator indicates to the user a fault condition in the controller 10, while when the indicator is constantly illuminated, this indicates that the controller has suspended irrigation, e.g., due to a rain sensor. In preferred form, the status indicator 28 comprises a visual indicator, such as a light emitting device, e.g., a light emitting diode (LED), that visibly indicates a status of the controller. In preferred form, the opening or hole 18 formed in the door 16 is aligned with the status indicator so that the status indicator is visible from the exterior of the controller housing while the door is closed. In other words, the user does not have to open the controller housing in order to determine that there is a fault. In other embodiments, the status indicator 28 comprises an audible alarm, e.g., a sound emitting device, e.g., a small speaker, that emits an audible sound to indicate the status (e.g., fault condition or normal operation) of the controller. In another embodiment, the status indicator 28 is both a visual indicator and an audible indicator of a status of the controller 10.

Figure 23A:
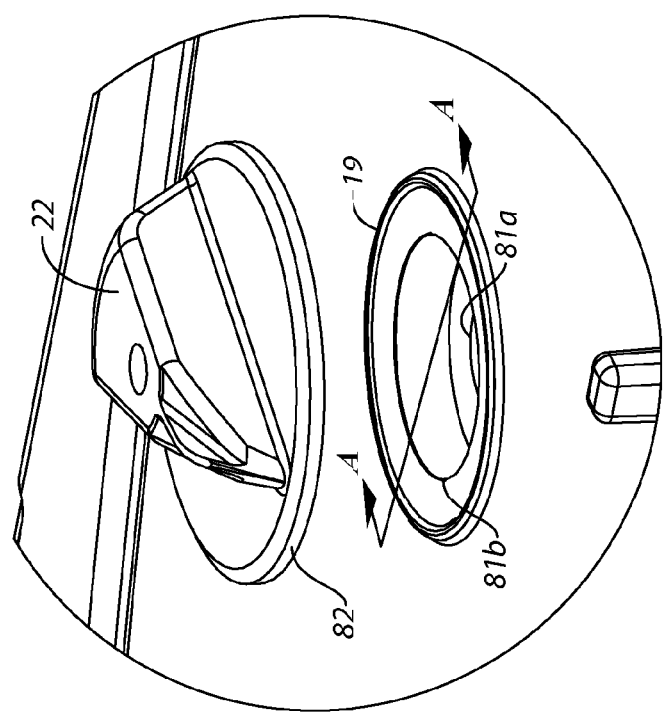
FIG. 23A illustrates the annular ring molded onto the control panel 30, running around the rotary switch post (not shown) and forming a barrier against water in accordance with one embodiment of the invention.
Figure 23B:
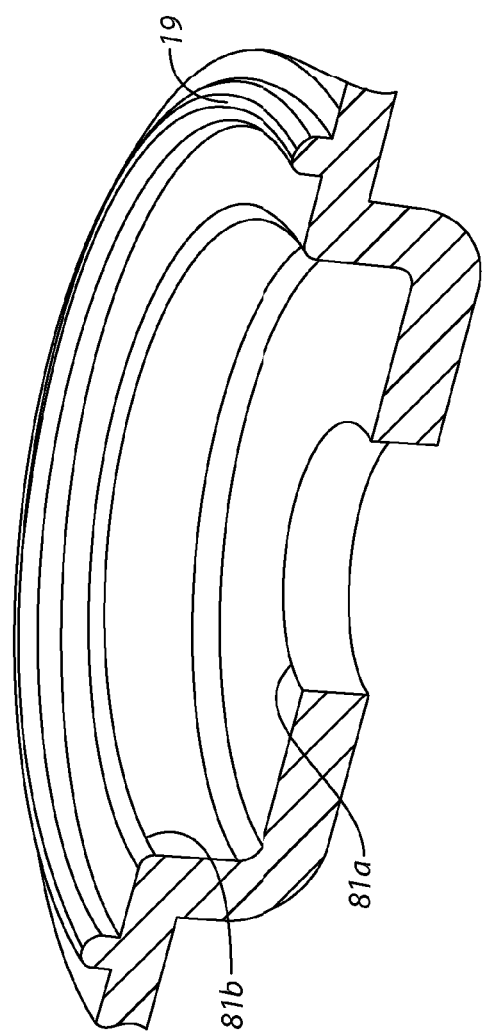
FIG. 23B is a cut away view of the annular ring of FIG. 23A taken at section A-A of FIG. 23A according to one embodiment.

Shown in FIGS. 23A and 23B, an annular ring 19, molded onto the control panel 30, runs around the rotary switch post (not shown) and forms a barrier against water entry into the controller 10. This protects the internal circuitry from water damage. In the illustrated form, the annular ring 19 is a raised wall, rib or barrier that extends perpendicularly from the surface of the control panel 30 and annularly about a recess 81b within which is formed a hole 81a that is provided to allow a post to connect the rotary dial 22 to the switching components within the controller 10. The annular ring 19 is designed to fit underneath the lip 82 or edge of the rotary dial 22. In use, with the control panel oriented such that the surface of the control panel is vertical (in the orientation of FIGS. 1-4), any water that seeps underneath the lip 82 of the rotary dial 22 contacts the raised surface of the annular ring 19 and is directed around the outer perimeter of the annular ring 19 and away from the recess 81b and hole 81a. Thus, the annular ring 19 provides additional protection from water entering the interior of the control panel 30.

The unlabeled soft keys 25 (also shown in FIG. 2) are used interactively with the commands that appear on the LCD 24. This approach places the label for each key 25 on the LCD 24 rather than on the keys themselves, allowing the label to change as appropriate, making the irrigation controller 10 easier to use and eliminating the need to create a different button for each label needed.

Existing irrigation controllers are limited to small, simple LCD segmented displays with limited language capability and limited graphic capability. It is a further objective of several embodiments to enhance the user experience through a display that can support a plurality of graphics and different alphabetical characters of different languages. To this end, the irrigation controller 10 employs a graphical display controlled by the control panel microcontroller 32 accommodating a superior language and graphics support with more lines of information displayed on the LCD 24 having the pinout configuration as illustrated in FIG. 25. This pinout provides 8 bits of data (D0-D7) to the LCD 24. As seen in FIG. 11, in one embodiment, the firmware 33a which implements multiple alphabets, languages, font sizes and graphics facilitates the offering of the alphabets of multiple languages for display by the irrigation controller 10. This solution involves a specialized and innovative set of graphics routines that enable the multiple alphabets and text strings to be stored in memory 33 or 32a and written to the display 24 with limited RAM resource demand on the main microcontroller 32. In preferred form, this innovative firmware graphic routines treat each language's alphabet as a collection of bitmap characters. As each character is displayed on the screen, the individual dots on the screen are made dark or light to form that character. This results in a single character stored in the firmware controlling up to several hundred individual dots that represent the character on LCD 24. This is done through a look-up process' where the single character indexes into the bitmap collection stored in the firmware. A similar method is used for storing pictures and icons, where a single character stored in EEPROM 32a is used to translate into up to thousands of dots on the screen by looking-up the stored graphic bitmap based on the single character. This results in minimized memory usage which is crucial for the high volume manufacturing of the irrigation controller 10 at a low cost.

In several embodiments, the user is allowed to select which language to view the display screens in. Known controllers are configured to display screens in a single language (e.g., English). However, since the controller stores display screens in multiple languages, the user can select a given language or change the display screen language. The language selection is stored in non-volatile memory (e.g., EEPROM 32*a*) so that the setting is saved for use after a power outage occurs. For example, the user simply navigates (through the rotary switch 22, the display screen menus and soft keys 25) to a language select screen to select the language of choice. Additionally, the language of initial display may be set when shipping the product, if for example, the controller will be shipped to a specific country having a commonly accepted language. The user will have the ability to change this language, but at least the initial language will be in the most common language of that country.

While the user interface 21 in accordance with some embodiments of the invention utilizes different fonts to emphasize certain details to the user, different portions of the display 24 can be flashing to emphasize certain other details. A plurality of graphic icons is also employed as part of the emphasis mechanism of the user interface 21.

Figure 15:
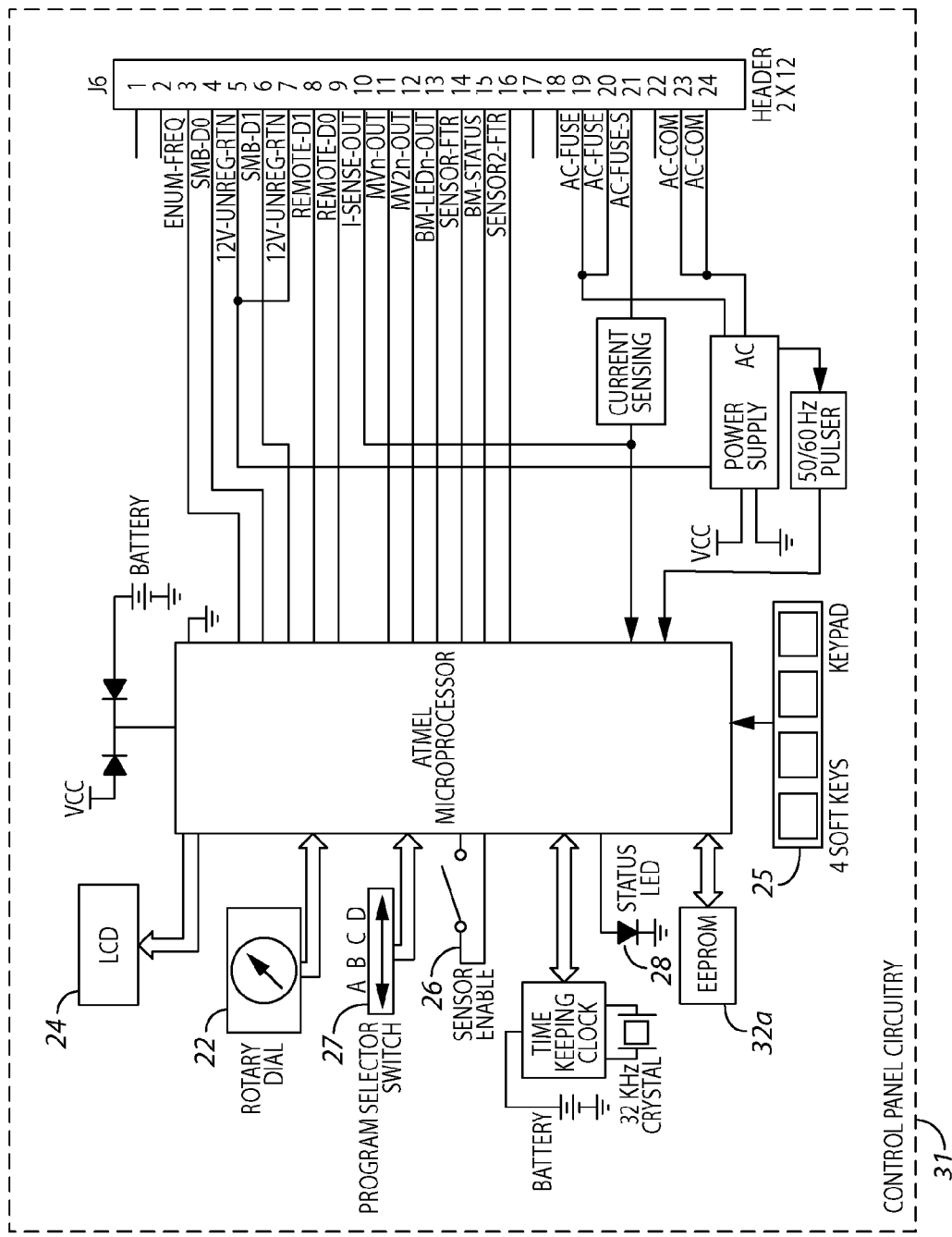
FIG. 15 is a schematic diagram of one embodiment of the control panel circuit.

Now returning to FIG. 4, located within the rear housing 40, the backplane circuitry 46 is used primarily as an interconnection between the various modular components (e.g., the modules 55, 65) and the control panel circuitry 31 (one example of which is illustrated in FIG. 15). The backplane circuitry 46 (one example of which is illustrated in FIG. 16) is also used to connect with the remote control unit (not shown here) via remote connection port 63 as well as the external expansion housings 80 via external expansion housing connector 62 whose pin configuration is illustrated in FIG. 22. The backplane circuitry 46 additionally accommodates two terminal blocks 60*a*, shown in FIG. 4, connecting the 24 VAC supply voltage to the controller 10 and one grounding terminal block 60*b* which is used for grounding to provide electrical surge protection.

The backplane circuitry 46 provides a valve test through a single-position screw terminal 64, also shown in FIG. 4. The valve test connection terminal 64 is provided with a 24 VAC supply voltage.

The backplane 45 also includes a base module mounting location 45*a* and a plurality of expansion module mounting locations 45*b*. Each mounting location 45*a* and 45*b* provides a location on the backplane where a module can be mounted thereto. The base module mounting location 45*a* includes a connector 44 that includes pins or contacts electrically coupled to the backplane circuitry 46. Each expansion module mounting location 45*b* also includes a connector 47 that includes pins or contacts electrically coupled to the backplane circuitry 46. In operation, the base module 55 is mounted within the housing 20 at the base module mounting location 45*a* of the backplane 45, and the expansion module(s) 65 are mounted within the housing 20 at corresponding expansion module mounting locations 45*b* of the backplane 45.

As seen in FIG. 3, the backplane circuitry 46 is connected to the control panel circuitry 31 via a ribbon cable assembly 49. The connector layout and assigned signals for the ribbon cable 49 are illustrated in FIG. 12.

Figure 28:
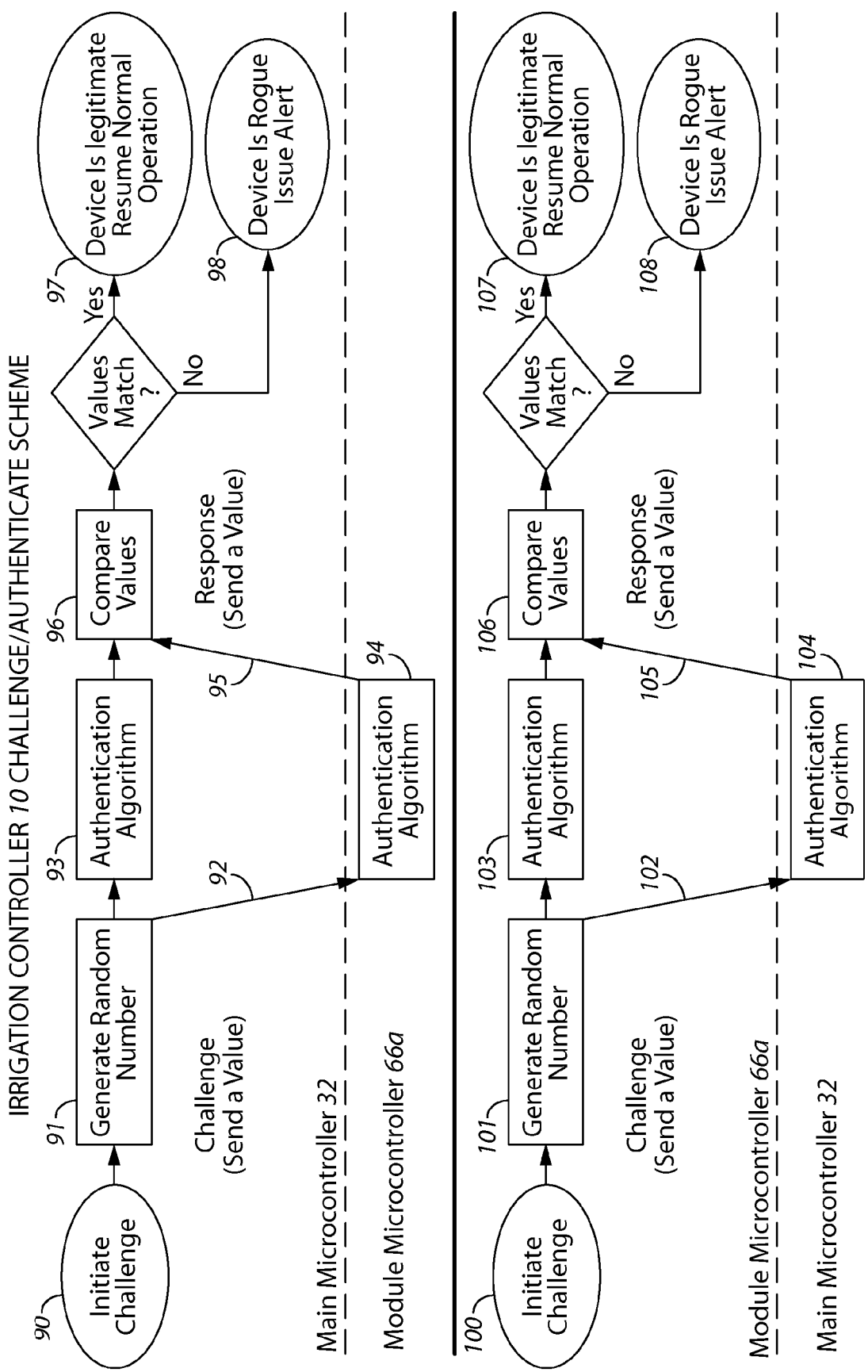
FIG. 28 is an illustration of the challenge/authenticate model in accordance with an embodiment of the invention.

According to several embodiments of the invention, mechanisms are provided to ensure that modules installed into the controller are compatible with the controller 10 and that these modules 65 were built by an authorized manufacturer. In one embodiment, each module 65 contains a predetermined textual message, e.g., a textual message that is copyright protected, that is transmitted by the module 65 over the bus 39 to the main microcontroller 32. The main microcontroller 32 expects to receive a valid textual message (e.g., the copyright message) from every module 65. If it does not receive such a message, the main microcontroller 32 will treat that specific module as rogue and ignore it. According to a second embodiment, both the modules 65 and the main microcontroller 32 contain a challenge/authenticate mechanism. This allows for a "mutual authentication" scheme that can be initiated by either the main microcontroller 32 or the expansion module microcontroller 66*a*. As shown in FIG. 28, in one form where the main microcontroller 32 initiates the authentication procedure (Step 90), the main microcontroller 32 will generate a random number (Step 91), pass this random number to the module 65 as a challenge (Step 92, which can be generically expressed as transmitting an authentication request to the expansion module 65), and also process this random number (Step 93) through a secret authentication algorithm contained inside the main microcontroller 32. The module 65 will receive this random number and also process this same random number (Step 94) through an identical secret authentication algorithm contained inside the module's microcontroller 66*a*. The module's microcontroller 66*a* will send the result (Step 95) from the secret authentication algorithm as a reply to the main microcontroller 32. Based on the response from the expansion module, the main microcontroller 32 will determine if the expansion module is an authorized expansion module. For example, the main microcontroller 32 will compare the result it computed internally with the result provided by the module (Step 96). If the results match, then this indicates to the main microcontroller 32 that the module does indeed know the secret authentication algorithm and therefore must be a valid module built by an authorized manufacturer (Step 97). The main microcontroller 32 will then continue to interact and communicate with that module 65. If the result does not match, the expansion module is not authorized to operate with the main microcontroller and a rogue alert will issue (Step 98). The controller 10 is also able to display a message on the LCD 24 to indicate that a rogue module has been detected.

Expansion modules 65 would also like to have assurance that they are installed in a controller 10 that has also been built by an authorized manufacturer. In this embodiment, the module 65 issues a challenge to the main microcontroller 32 (Step 100), as shown in FIG. 28. The module 65 will generate a random number (Step 101), pass this random number to the main microcontroller 32 as a challenge (Step 102, which can be generically expressed as transmitting an authentication request to the main microcontroller 32), and also process this random number (Step 103) through a secret authentication algorithm contained inside the module 65. The main microcontroller 32 will receive this random number and also process this same random number (Step 104) through an identical secret authentication algorithm contained inside the main microcontroller 32. The main microcontroller 32 will send the result from the secret authentication algorithm as a reply to the module 65 (Step 105). Based on the response from the main microcontroller, the module 65 will determine if the main microcontroller is an authorized control unit. For example, the module 65 will then compare the result it computed internally with the result provided by the main microcontroller 32 (Step 106). If the results match, then this indicates to the module 65 that the controller 10 does indeed know the secret authentication algorithm and therefore must be a valid controller built by an authorized manufacturer (Step 107). The module 65 will then continue to interact and communicate with the controller. If there is no match, then the main microcontroller of the control unit is not authorized to operate with the expansion module and a rogue alert will issue (Step 108).

In preferred embodiments, the confidentiality of these transfers (steps 92, 95, 102, 105) is maintained by encrypting the data sent over the communication bus 39.

With an expandable architecture, it is possible that users could attempt to keep adding modules without limits. This may make it difficult to distinguish different products with different capacities in the market. A further object of some embodiments of the invention is to limit the number of modules, the number of each type of module, the number of external expansion housings, or any combination thereof. To that end, a mechanism exists in the firmware 33*a* such that if the user attempts to exceed the imposed limits, the irrigation controller 10 advises the user that a limit has been reached. Also, the controller 10 refuses to operate any modules that exceed the limit. For example, in one embodiment, a limit of the number of modules (or a limit of the number of certain types of modules that is allowed to be attached to the controller (including all expansion housings) is stored in the memory of the microcontroller (e.g., firmware 33 or the EEPROM 32*a*). When a module is enumerated, the main microcontroller checks to see if there are stored any limits. If there are, beyond the limit, the main microcontroller will not enumerate the additional modules or operate therewith. Additionally, the main microcontroller will send or cause an error message to be displayed to the user indicating that the user has exceeded the maximum number of modules (or maximum number of modules of a given type of module).

Figure 8:
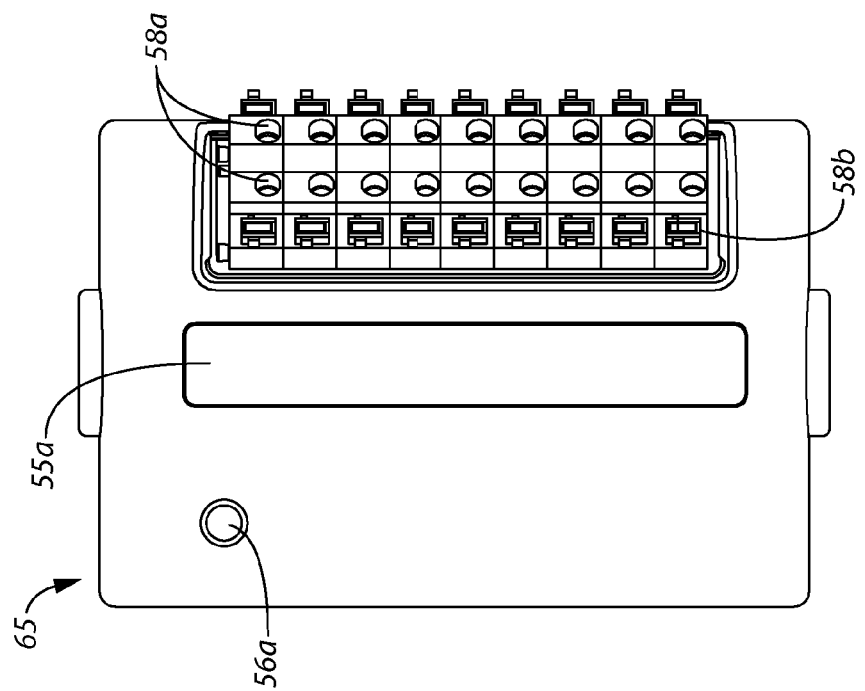
FIG. 8 is an enlarged plan view of the expansion module.
Figure 7:
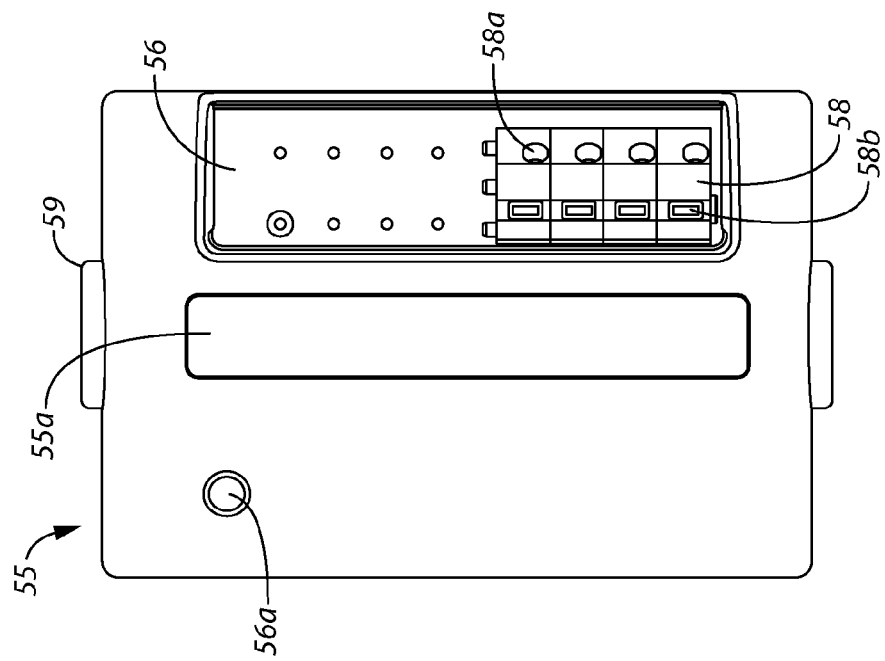
FIG. 7 is an enlarged plan view of the base module.

As indicated in FIGS. 7 and 8, each module contains a module status indicator 56*a*, e.g., a light emitting diode (LED), that is activated either by the module 55, 65 itself or by the main microcontroller 32. This module status indicator 56*a* is utilized to report status information, error conditions, correct operation or other functions to the user. To distinguish different status values, the indicator 56*a* utilizes a combination of different colors, changing illumination pattern extending from steady to various blinks and/or uses a combination of blinking and colors. It will be obvious to those skilled in the art that this status indicator 56*a* could be any alternate type of electro-illumination element. In other embodiments, the status indicator comprises a sound emitting device, such as a small speaker driven by the microcontroller of the module.

An alternate embodiment of a module status indicator 56*a* to communicate the module status is using a display screen, such as an LCD directly on the module, that is operated by the microcontroller 66*a* of the modules 55, 65. See, for example, the diagram of FIG. 34. This display screen will display module status and fault conditions through text and/or graphical elements. The modules can also have an LCD or other numeric, alpha-numeric, or graphical display to convey more information than a simple lighted indicator (such as an LED). The display would be used to convey module-specific or module-related information such as status, setup, or operational readings. This could be, for example, evapotranspiration data, the real-time status of alarm inputs, or the activation or enabling of features. This would allow the end user to more efficiently and better use the module and the product as a whole. In another embodiment, the module 55, 65 itself includes a user input device, such as a keypad or other data entry or manipulation method. The microcontroller 55, 65 of the module 55, 65 is configured to accept inputs based on user interaction with the user input device and information displayed on a display screen located on the module. See, for example, the diagram of FIG. 34. For example, in the case of a decoder module, this would make the module very flexible and autonomous. This could also serve to decrease the burden placed on the control panel microcontroller 32.

Figure 51:
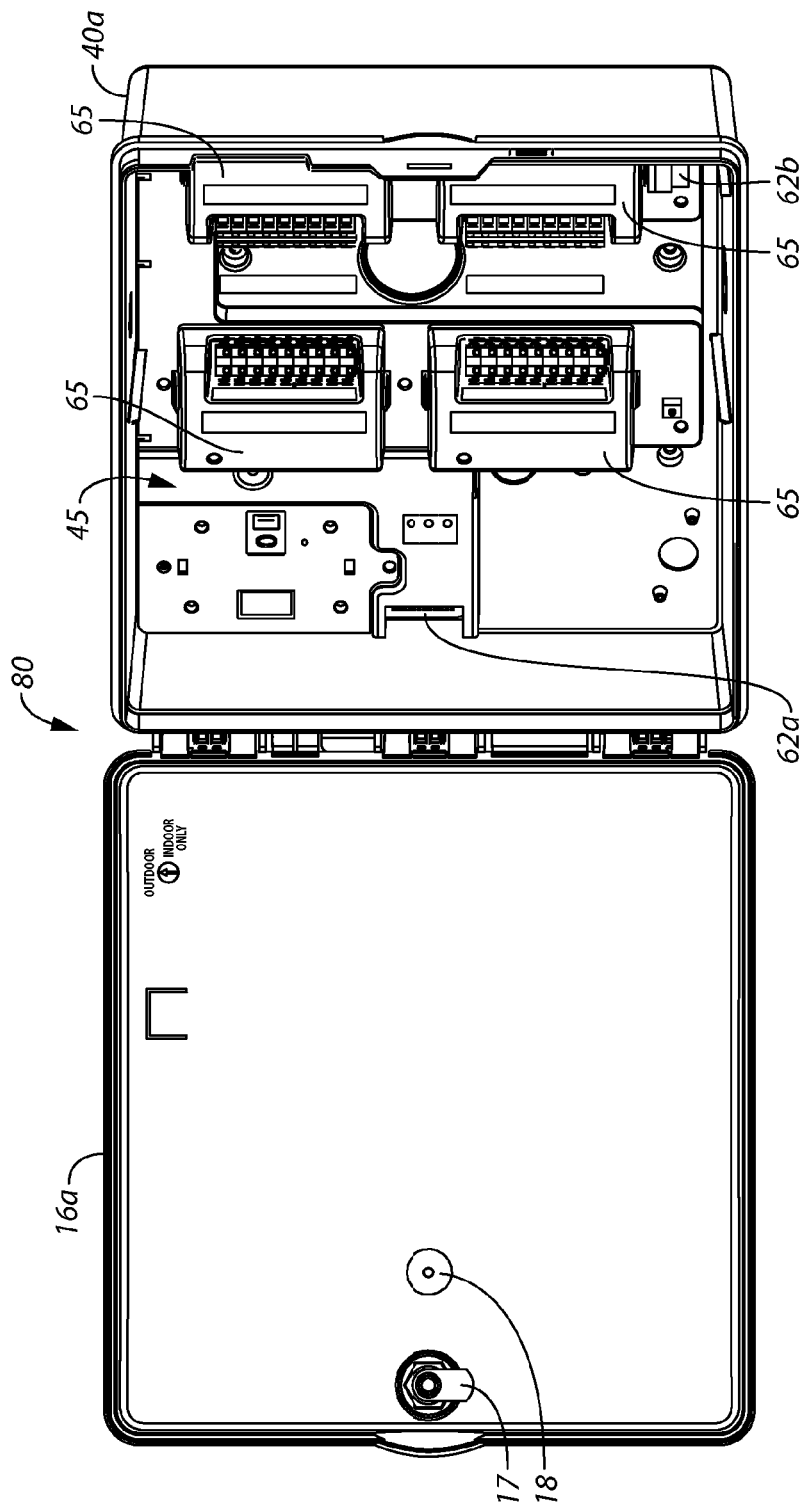
FIG. 51 is a three dimensional view of the open expansion housing showing the backplane and its expansion modules in accordance with one embodiment of the invention.

As illustrated in the embodiment of FIG. 10, the irrigation controller 10 can easily be expanded in capacity beyond the physical size of the controller housing 20 by the addition of external expansion housings 80 (see the expansion housing of FIG. 51) that are chained together and function as one controller, operated by a single control panel 30. In preferred form, the external expansion housing 80 expands the communication bus 39 from the main microcontroller 32 to allow more modules 55 and/or 65. In an alternate embodiment, the external expansion housings 80 are linked to one another with a power line, wherein the power line carries both power and data between the main microcontroller 32 and the external expansion housings 80. Other alternate embodiments utilize fiber optics, wireless links or infrared links to transfer data between the main microcontroller 32 and the external expansion housings 80. In one form, the backplane circuitry 46 interfaces to the external expansion housing 80 through a 1×10 pin-header connector 62 shown in FIG. 4. The connector 62 pinout and assigned signals are shown in FIG. 22. The external expansion housing interface connector 62*a* (see FIG. 10) allows coupling of the external expansion housing to the bus 39. The connector 62*b* facilitates the attachment of a further external expansion housing 80 serving to extend the bus 39 so that multiple external expansion housings can be daisy-chained together. Any module, except for the base module 55, can be in any position in the main body housing 20 or in any of the external expansion housings 80. Referring to FIG. 51, one embodiment of the expansion housing is similar to the housing 20 in that it has a rear housing 40*a* and a door 16*a*, lock 17 and hole 18. The cable connecting to the connector 62 of the backplane of the housing 20 couples at the other end to the connector 62*a* of the backplane 45 of the expansion housing. Advantageously, the expansion housing allows additional expansion modules 65 to be coupled to the main microcontroller of the controller 10.

Figure 9:
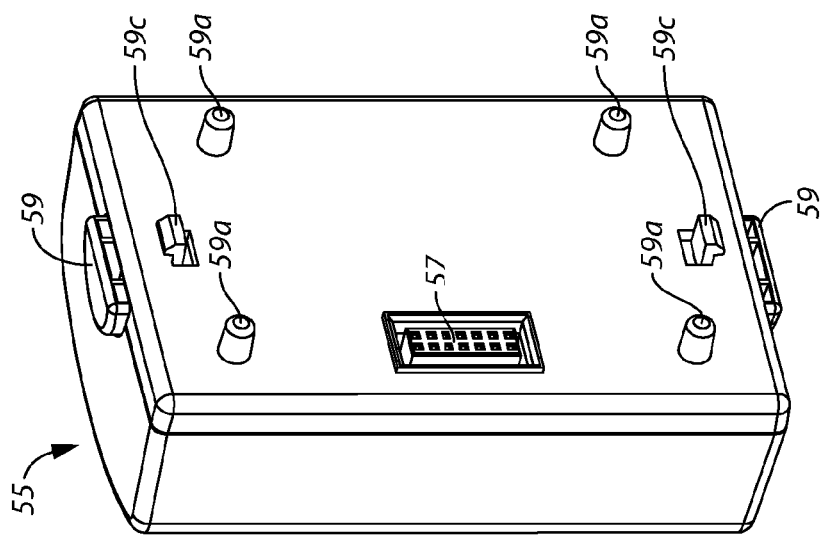
FIG. 9 is three dimensional view of a base module showing the module latch buttons and the module interface connector.
Figure 13:
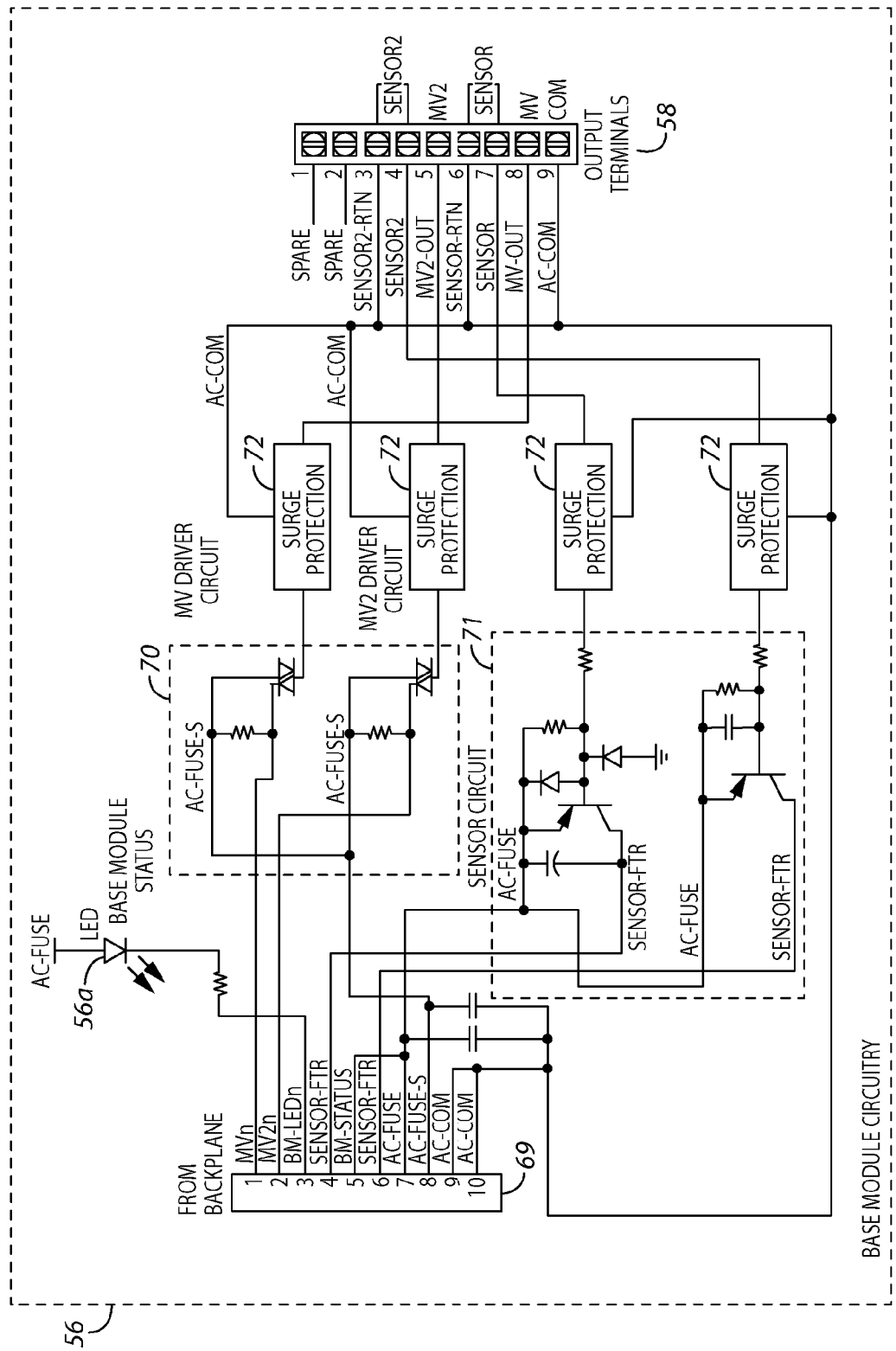
FIG. 13 is a schematic diagram of one embodiment of the base module circuit.

Shown in detail in FIGS. 7 and 9, the base module 55 is a non-intelligent unit which is used to drive the master valves, the module status indicator 56*a* and to carry rain sensor input signals from the rain sensors to the main microcontroller 32. As seen in FIG. 9, the base module 55 accommodates a connector 57 (e.g., a 2×5-pin header connector) to interface with the connector 44 coupled to the backplane circuitry 46. The base module 55 includes circuitry 56 (one example of which is illustrated in FIG. 13), a plurality of wire output terminals 58 and the module status indicator 56*a* (in this case, an LED). In preferred embodiments, the controller 10 cannot function to control irrigation operations without the base module 55 mounted in the controller housing 20. As seen in FIG. 13, the base module circuitry 56 includes the base module pinout 69, driver circuitry 70 for the master valve, a sensor input circuit 71, surge protection circuitry 72, and the output terminals 58. The connector pinout 69 and the assigned signals are illustrated in FIG. 20. It is noted that as used throughout this application, the term "driver circuitry" in connection with actuating or activating an irrigation valve generally refers to any combination of electrical circuitry to cause an appropriate actuating signal to be delivered or deliverable to the irrigation valve. For example, in one embodiment, the driver circuitry includes drivers and output switches (such as triacs or relays). Additionally, the driver circuitry may vary depending on the type of irrigation valve that the circuitry is to drive (e.g., whether the valve is a latching or non-latching solenoid activated irrigation valve).

In one embodiment, a mechanism exists whereby the accidental installation of the base module 55 in any of the expansion module mounting locations 45b or the accidental installation of an expansion module 65 in the base module mounting location 45a is mechanically prevented. In one form, this mechanism utilizes the 'polarity key feature' in which the base module connector 57 is turned 180 degrees in the opposite direction from the placement of the expansion module connector 67. This connector polarity key feature is also reflected on the corresponding pins of connectors 44 and 47 of backplane circuitry 46 that couple and interconnect with the base module connector 57 and the expansion module connector 67 respectively. This mechanism prevents the base module 55 from properly mating if there is an attempt to mount the base module into one of the expansion module mounting locations 45b and also prevents the expansion module 65 from properly mating if there is an attempt to mount an expansion module to the base module mounting location 45a.

Additionally, as seen best in FIG. 4, the connectors 44, 47 are located off-center within the respective mounting locations 45a, 45b, such that even if the module were turned 180 degrees, it would be physically prevented from connecting into the mounting location. For example, guideposts 59a formed on the back of the modules 55, 65 are designed to fit within guide holes 59b of the mounting locations 45a and 45b. As seen in FIG. 4, the vertical spacing between the guide holes on the left and right sides of the mounting locations 45a, 45b varies, such that if the module were turned 180 degrees, it could not mate into the mounting location. Additionally, in some embodiments, the male/female connectors are switched on the base module 55 and the expansion modules 65. For example, in one embodiment, the connector 47 on the expansion module mounting location 45b is a male connector while the corresponding connector 57 on the expansion module 65 is a female connector. In order to prevent the base module and the expansion modules from getting mixed, the connector 44 on the base module mounting location 45a is a female connector while the corresponding connector 57 on the base module 55 is a male connector.

Seen in FIGS. 7 and 8, the module identification strip 55a located on the module tops provide easy identification of modules 55, 65 while eliminating the need to manufacture different covers for different module types. These identification strips may be color-coded and/or contain labeling text and/or icons.

FIG. 8 illustrates an expansion module 65, which can be configured as having a variety functions depending on the type of module. For example, the expansion module(s) 65 can be employed for expansion to increase the number of irrigation stations as well as to expand the functionality of the irrigation controller 10. Such expansion module(s) 65 used for output are intelligent units driving a plurality of output stations. Referring to FIG. 14, when employed for output, the expansion module circuitry 66 of the expansion output module 65 includes a power regulator 73, a "common" electrical connection for station output terminals 74, an independent microcontroller 66a which communicates with the main irrigation microcontroller 32, a current sensor circuit 75, valve-driver circuitry 76 and surge protection circuitry 77 as shown in FIG. 14. It is noted that as used throughout this application, the term "driver circuitry" in connection with actuating or activating an irrigation valve generally refers to any combination of electrical circuitry to cause an appropriate actuating signal to be delivered or deliverable to the irrigation valve. For example, in one embodiment, the driver circuitry includes drivers and output switches (such as triacs or relays). Additionally, the driver circuitry may vary depending on the type of irrigation valve that the circuitry is to drive (e.g., whether the valve is a latching or non-latching solenoid activated irrigation valve).

The expansion modules 65 interface with the backplane circuitry 46 through the connector 47 (e.g., a 2×5-pin header connector) indicated in FIG. 4. The expansion module pinout 78 and the assigned signals for the connectors 47 and 57 are illustrated in FIGS. 14 and 21. The expansion module(s) 65 can be used at any connector 47 of any expansion module mounting location 45b, except for the one connector 44 at the base module mounting location 45a allocated to the base module 55. It is noted that due to the communication bus structure and communication protocol, expansion modules are allowed to be placed in any expansion module mounting location in any order, coupled with the fact that the main microcontroller 32 is configured to not expect modules 65 to be connected in any specific order in the expansion module mounting locations 45b.

In addition to station output expansion modules 65, each module connector 47 can also accept other types of input/output modules that will work together with the main microcontroller. In one example, an expansion input module 65a can include a plurality of inputs 67 coupled to the microcontroller 66a such as one providing sensor inputs with an architecture that is illustrated in FIG. 17. This type of module 65a identifies itself (e.g., once the module detects its installation) to the main irrigation microcontroller 32 as an input module type so that the main microcontroller 32 can store configuration data and interact appropriately with the expansion module. Depending on its configuration as dictated by the firmware 33b, the microcontroller 66a either passes the input data to the main control unit via the bus 39 or processes the input data in some way prior to passing the data to the control unit. The irrigation controller 10 can then use these inputs as conditional qualifiers to alter the way it runs an irrigation schedule or program.

The architecture for an expansion module type known as a smart expansion module 65b is shown in FIG. 18. This type of module may contain any combination of input and/or output signals (e.g., station output signals to actuate additional irrigation valves or other output signals). The signals are not only restricted to irrigation applications but may also consist of data signals, communication signals, etc. The microcontroller 66a inside the smart expansion module 65b is programmed to perform a specific set of tasks dependent on the overall function of the expansion module. A smart expansion module 65b is also unique in that it can interact with the main irrigation microcontroller 32 by sharing internal data. A unique aspect of several embodiments is that the communication methods, messages and protocols between the microcontroller 66a of the smart expansion module 65b and the main irrigation microcontroller of the main control unit or control panel 30 allow either microcontroller 66a, 32 to access data, variables, and constants contained in the other's memory space. For example, the microcontroller 66a can request and receive irrigation program related data (or the irrigation program itself), make changes to it in accordance with its programmed functionality, and return the irrigation program-related data to the main microcontroller 32. The main microcontroller 32 is designed such that it can respond to requests for data and information from the smart expansion module 65b as well as accept commands from the smart expansion module 65b.

This allows a smart expansion module 65b to observe intricate details occurring inside the main microcontroller, and also allows the smart expansion module to affect how the main microcontroller 32 behaves by changing data in the main microcontroller's memory space. In this manner, the installation of a smart expansion module 65b to the irrigation controller 10 can dramatically change the overall behavior of the system. Advantageously, this allows the controller 10 to have a significant upgrade of features and capability just by installing a smart expansion module 65b and not having to replace any existing electronics or code in the irrigation controller 10 itself. It is noted that in preferred embodiments, there is a two way communication of irrigation program-related data between the main control unit and the expansion module 65b. This two way data communication is the type of communication that can alter the operation of the main microcontroller 32 or otherwise alter the stored irrigation programs of the main microcontroller 32.

In the diagram of FIG. 18, the smart expansion module 65b includes inputs 67 and outputs 83 (which in some embodiments includes station output terminals 58), coupled to the microcontroller 66a, which communicates with the control unit or control panel 30 via the bus 39. The module 65b also includes module firmware 33b to operate the microcontroller 66a and additional module memory 68.

One example of a smart expansion module 65b is an evapotranspiration (ET) module that receives ET data at an input 67 and may optionally include one or more station outputs 67. The microcontroller 66a requests and receives an irrigation program from the main microcontroller 32, alters the program in accordance with the decision making programmed into the module 65b based on received ET data and returns the irrigation program with altered parameters to the memory of the main microcontroller 32. The main microcontroller 32 is adapted to receive the replacement irrigation program, store it and execute it. In this manner, the expandable and open architecture of the main control unit or control panel 30 together with the addition of the smart expansion module 65b provides additional functionality (e.g., the ability to adjust schedules based on ET data) to the irrigation controller that was not present in the originally designed and configured control panel 30, without any firmware updates or other changes to the control panel. According to this architecture, the main microcontroller does not need to know in advance the types of possible smart expansion modules 65b that it could operate together with, it simply shares its data with other modules of unknown functionality and responds to commands and executes adjusted schedules provided by these modules 65b. Advantageously, the user does not need to purchase a new control panel to upgrade to functions not provided by the control panel, the user simply purchases a smart expansion module 65b that provides the desired functionality.

Figure 19:
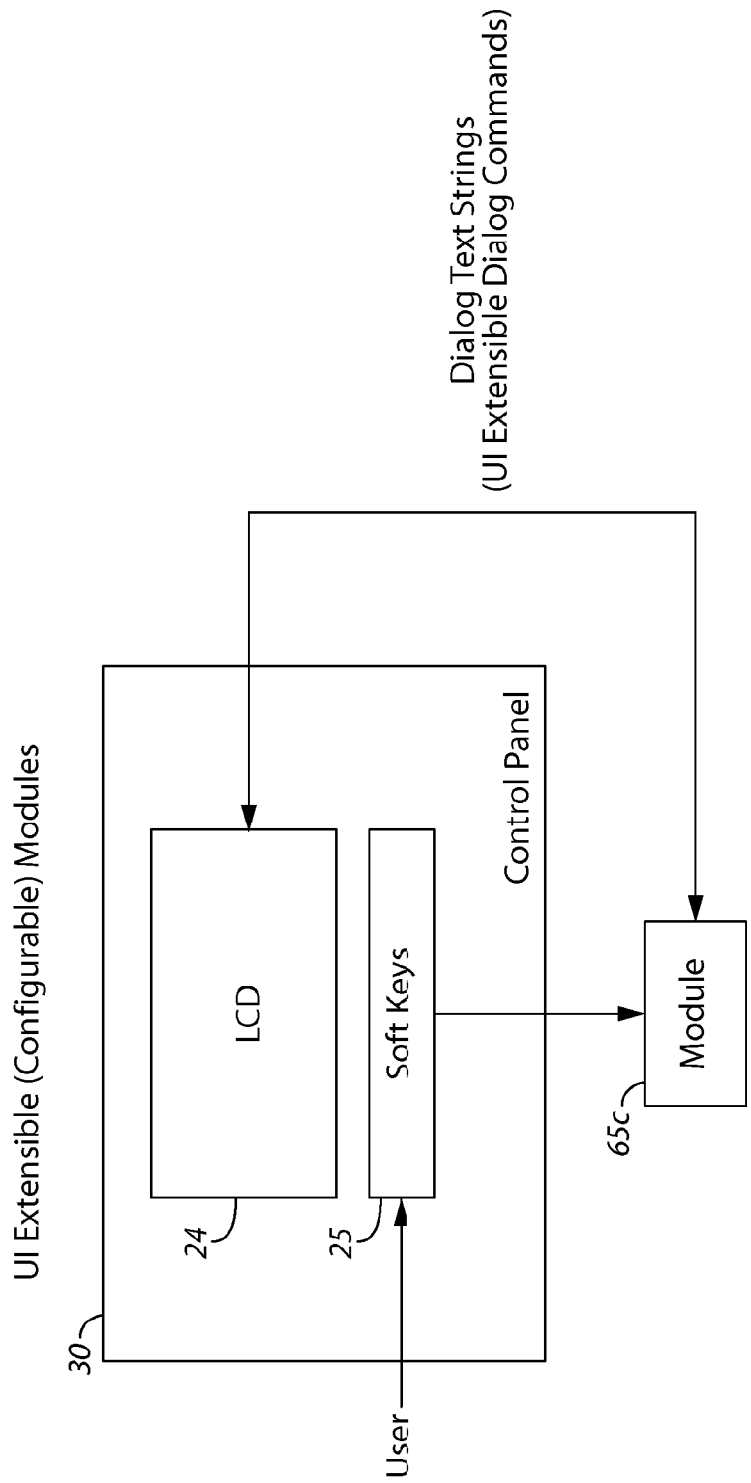
FIG. 19 is a block diagram showing the logical interaction of an expansion module functioning as a user interface extensible (configurable) module in accordance with one embodiment of the invention.

Moreover, in other embodiments, a variation of smart expansion modules defined as interface extension smart modules 65c is provided which also has the ability to interact with the user interface 21 of the control panel 30. The interactions between the user and the interface extension module 65c are shown in FIG. 19. For example, the interface extension expansion module has the ability to send control signaling to the main microcontroller 32 of the control panel 30 to cause textual and graphical information to be displayed on the LCD display 24. It performs this by sending special messages containing the information to display to the main irrigation microcontroller 32. The main microcontroller, which is directly connected to the LCD driver electronics, then places that information on the LCD for the user to see.

For full interaction with the user, the main microcontroller 32 can also monitor any pressings of the soft keys 25 and will forward that information to the interface extension smart module. The interface extension smart module 65c is also illustrated in the diagram of FIG. 18 with the module firmware 33b specific to the functionality of the module 65c. In addition, all of the other front panel (main control unit) controls, switches 26 and 27 and the rotary dial 22, are also able to be monitored in the same way by the interface extension smart module. In this manner, the interface extension module 65c is able to display menus and other information to the user, and then monitor the user's selections with the soft keys. The interface extension smart module is able to create a user interface and entry interaction that does not exist in the firmware 33a of the controller 10, without changing or upgrading any firmware operating the main microcontroller 32. For example, in an interface extension module 65c including ET functionality (such as the smart expansion module 65b described above), the interface extension smart module 65c can generate specific types of displays and prompts for user input, e.g., to configure the ET adjustment processes. The main microcontroller 32 would cause these displays to be displayed on the LCD 24 and monitor the user responses on the soft keys 25, and finally forward the user response to the display screen or menu provided by the interface extension smart module 65c. Advantageously, this provides an easy way for the user to access and/or configure a smart expansion module using the main control panel 30.

Figure 32:
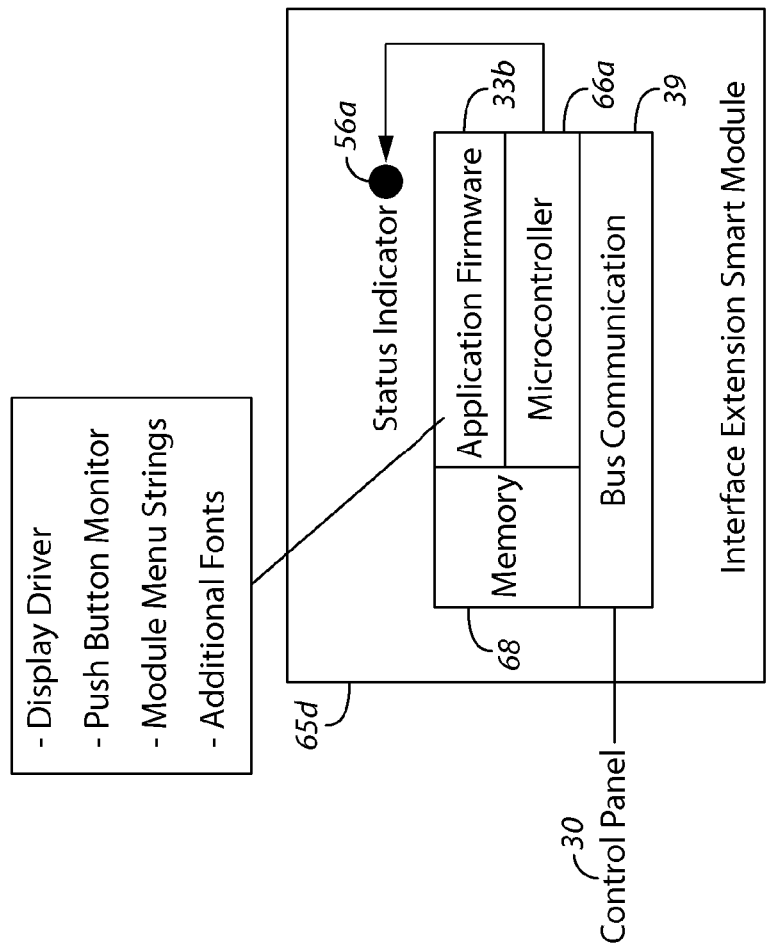
FIG. 32 is a block diagram of one embodiment of an expansion module functioning as an interface extension smart module.

One embodiment of an interface extension smart module 65d is illustrated in FIG. 32. This embodiment is similar to the embodiment of FIG. 18, but does not have any inputs 67 or outputs 83. Also illustrated are functional features stored in the firmware 33b and/or memory 68 of the interface extension module 65d. For example, functionality to implement a display driver (through the main microcontroller), to monitor the user inputs of soft keys 25 (through the main microcontroller), additional menu displays and menus (to be sent to the main microcontroller for display) and any additional fonts for the display menus is stored in the firmware 33b and/or the memory 68.

Figure 33:
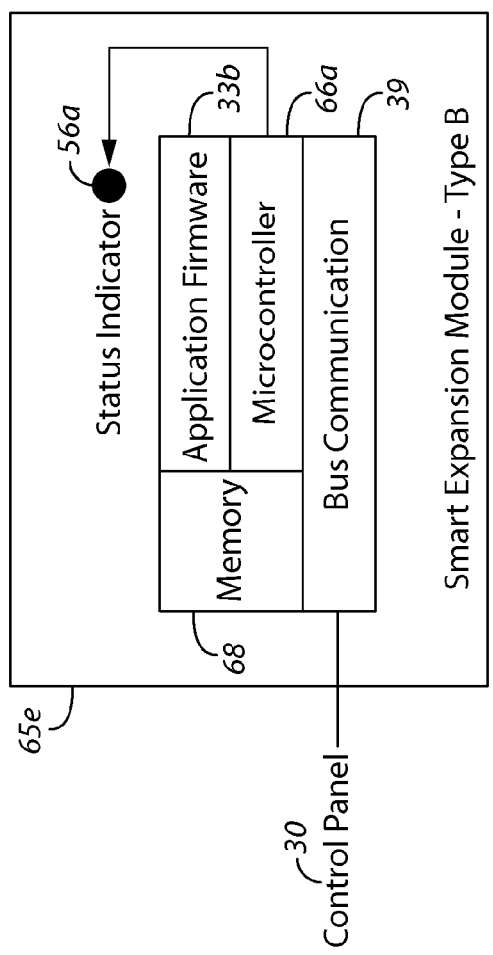
FIG. 33 is a block diagram of one embodiment of an expansion module functioning as a smart expansion module without any station inputs or outputs.
Figure 70:
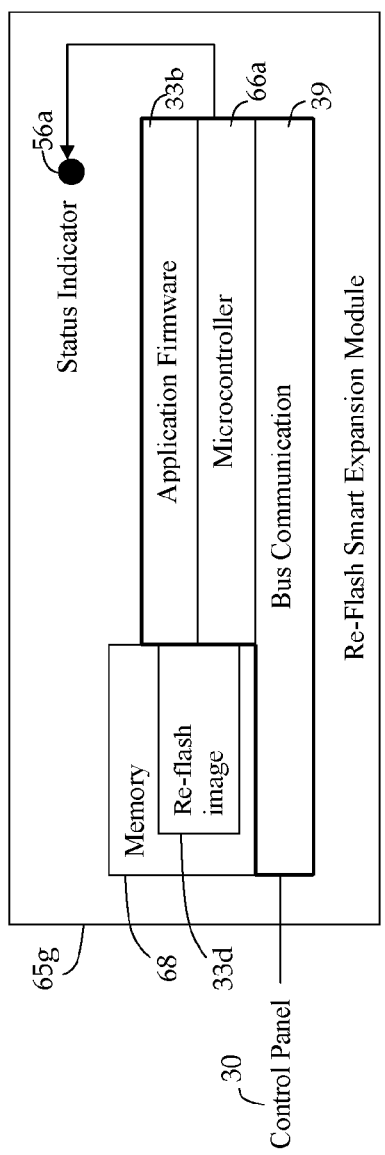
FIG. 70 shows a smart expansion module according to some embodiments that is similar to the smart module illustrated in FIG. 33, and stores a version of firmware in the memory.

Another variation of a smart expansion module 65e is illustrated in FIG. 33. In this embodiment, the expansion module 65e does not provide terminal inputs or outputs and adds functionality not present in the main microcontroller 32. For example, functionality of the module 65e is stored in the firmware 33b and in the microcontroller 66a. Additionally, like the other modules 65, 65a, 65b, 65c and 65d, the expansion module 65e can be interchangeably and removably inserted into any module mounting location 45b. In one embodiment, the expansion module 65e comprises a re-flash module, which stores new firmware (in memory 68) to replace the existing firmware 33a in the control panel 30. FIG. 70 shows a smart expansion module 65g according to some embodiments that is similar to the smart module 65e illustrated in FIG. 33, and stores a version of firmware 33d in the memory 68. The version of the firmware 33d can replace the firmware 33a of the control panel 30, which can provide the control panel with enhanced features, fix problems with a prior version of firmware, provide additional communication capabilities and/or interactive capabilities to interact with the re-flash smart expansion module 65g to utilize additional functionality available through the module that was not available in previous expansion modules and/or the control unit 30, and/or other such capabilities and functionalities at the time of development of the firmware 33a. When this re-flash module 65g is inserted into the controller, the main microcontroller 32 and/or the microcontroller 66a initiates the process of loading the new firmware 33d into the control panel 30 (typically after the control panel has authenticated the expansion module 65e) as described fully below.

In some embodiments, the expansion module 65e and/or 65g add functionality to the irrigation controller that does not require inputs or outputs. In an alternative embodiment, a re-flash expansion module is provided that does not require a microcontroller, and where the memory 68 storing the new firmware 33d in the module is directly coupled to the electrical connector 57 of the module. Upon installation, the main microcontroller of control unit extracts the new firmware from the memory and the memory is allowed to directly transmit a copy of the firmware to the main microcontroller without the need for a microcontroller in the re-flash expansion module. In this way, the functionality of the controller is updated (e.g., to include ET adjustment capabilities, flow control, user language selection, additional user language, and/or other such functionality). In still other embodiments, the expansion module provides additional irrigation functionality (e.g., flow control, signal decoding, ET adjustments, sensor monitoring, defining a user operating language while the module is connected, adding and/or replacing an optional user operating language, and/or other such irrigation functionality) to the irrigation controller 10 that is not provided by the irrigation controller as well as providing a re-flash of the firmware 33a and/or other operating code of the control unit 30 and/or main microcontroller 32.

In some embodiments, the firmware 33a of the control unit 30 includes a dedicated code, application and/or program, referred to below as bootloader code 33c (see FIG. 76, for example). The bootloader code 33c can be a limited functionality code that implements a re-flash of the firmware 33a and/or activates the irrigation controller to operate according to currently store firmware. For example, the flash memory 33 of the control unit 30 can store a version of the firmware that is about a 128 Kbyte image of the firmware code. A portion of the 128 Kbyte code can include the bootloader code 33c. In some instances, this portion can comprise 8 Kbytes of bootloader code that has specific functionality. This bootloader code is protected and/or restricted so that it cannot be overwritten or cannot be overwritten without additional authorization. Upon activation of the main microcontroller 32 and/or irrigation controller 10, the bootloader can be initially activated to start the remainder of the controller by providing a boot up process that activates the firmware 33a of the control unit 30. By protecting the bootloader code, the main microcontroller 32 can be activated even if a version of the firmware becomes corrupt, is incompletely replaced and/or other such potential errors. Further, the bootloader can initiate and/or control the replacing or re-flashing of the firmware (except for the bootloader code). The bootloader continues to operate even while the firmware is being replaced because the bootloader is protected and is not overwritten. In other embodiments, however, the bootloader 33c may also be replaced, for example, by copying a second bootloader to the flash memory and/or over a portion of the firmware. The microcontroller 32 can then be reactivated to access the second bootloader instead of the initial bootloader. Further, the second bootloader can initiate a subsequent re-flash of the remainder of the flash memory 33 and firmware to update the firmware and/or copy over the initial bootloader and provide a complete firmware.

In some embodiments, a re-flash device, cartridge and/or module can couple with the communication interface port 34a, the external expansion connector 62, the remote control port 63 or other relevant connection that allows the re-flash device or module to communicate with the control unit 30 and provide a firmware image to the control unit. For example, a re-flash device (e.g., a re-flash module 65g, or other device) can couple with the external expansion connector 62 and operate similar to other modules in the mounting locations 54b; a portable computing device, such as a laptop or other such computing device can couple with the communication interface port 34a of the irrigation controller 10 to similarly provide an upgrade and/or replacement of the firmware 33c; and/or other re-flash devices can couple with one or more other connections and/or ports to communicate (e.g., an RS232 connection) with the microcontroller 32.

Further, some implementations provide for a modular cartridge (not shown) to couple with the communication interface port 34a. The modular cartridge can provide one or more functions to the irrigation controller 10, such as providing a modem or other communication link. Still further, the modular cartridge can provide a firmware image that can be used to replace the firmware 33a of the control unit 30. In some implementations, the cartridge can include a controller capable of taking control of the irrigation controller 10 and forcing a re-flash of the firmware 33a. For example, when the cartridge is installed it can identify a version of firmware 33a in the flash memory 33 and determine that the cartridge contains a newer version and activate a re-flash.

Additionally or alternatively, a remote device, such as a remote central irrigation controller or remote computer can communicationally couple with control unit 30 through the communication interface port 34a of the irrigation controller 10 to supply a version of firmware to replace the existing firmware 33a. Similarly, an expansion module or other device can couple with the external expansion connector 62 to provide a re-flash or replacement of the firmware 33a. Some embodiments further provide for additional functionality in addition to the re-flashing of the firmware. For example, a re-flash module could couple with the expansion connector 62 to provide a re-flash, but additionally identify language selection that is used by the irrigation controller 10. Upon connecting the module with the expansion connector 62 the microcontroller identifies the language selection and transitions to the defined language without further user interaction. Other embodiments provide similar language selection through devices other than re-flash modules, such as a simple language designation device that can couple with the expansion connector 62.

In some embodiments, the memory 68 of the re-flash module 65g is an external memory chip that is external to the processor chip that contains the microcontroller 66a, memory to store at least the application firmware 33b and the bus interface 39. In other embodiments, however, the memory 68 can be part of the processor chip. Further, in some embodiments, the application firmware 33b is part of the memory 68 and/or is stored in memory 68.

When a re-flash extension module 65g is inserted into the irrigation controller 10, the module in some embodiments enumerates itself to the control unit 30. Prior to enumerating, for example when utilizing the serial bus 39, the module waits for a silent period on the bus. When the bus is silent for a predefined relevant period of time (e.g., 5 ms, 10 ms, 20 ms or some other relevant duration) the re-flash extension module 65g announces its presence to the control unit 30 and/or main microcontroller 32, and then waits for a reply. A collision on the bus is assumed when the re-flash module does not receive an enumerate command from the control unit 30 within a second predefined period, and will attempt to re-enumerate or re-send the enumeration. In some instances, the re-flash module 65g implements a random back off (e.g., based on a mounting location and/or slot number into which the re-flash extension module is inserted) and then re-attempts the enumeration. In some embodiments, re-flash modules 65g can operate without enumerating themselves, and instead, the main microcontroller 32 detects their insertion (e.g., by querying modules periodically, based on a schedule and/or randomly). When the re-flash module 65g is detected, the main microcontroller 32 can request information from the module, such as module type, version of firmware 33d, functions, connections and/or other relevant information.

Once enumerated, the re-flash module returns an identification to the main microcontroller 32 identifying itself as a re-flash module. Upon detecting that the module is a re-flash module, the main microcontroller can activate the bootloader to implement a re-flash and/or a replacement of the current firmware or other code with a copy of the new version of firmware 33d from the re-flash extension module 65g when such re-flashing is desirable.

Figure 71:
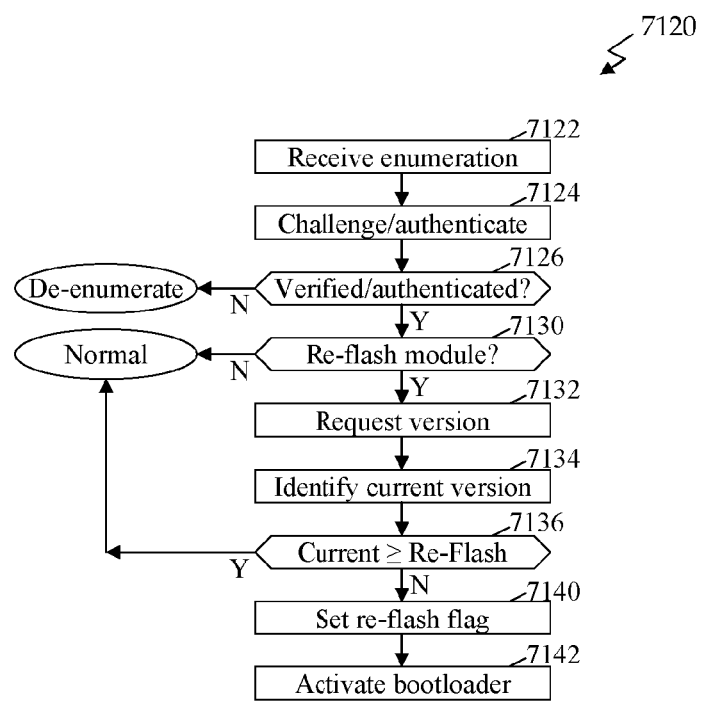
FIG. 71 depicts a simplified flow diagram of a process to activate a bootloader and implement a re-flash or code replacement of a main controller.

FIG. 71 depicts a simplified flow diagram of a process 7120 to activate a bootloader and implement a re-flash or code replacement of a main controller 32 according to some embodiments. During operation of the irrigation controller 10, in some implementations, when an expansion module 65 is inserted into a mounting location 45b, the module enumerates itself. In step 7122, the main controller 32 receives the enumeration. In some embodiments, the re-flash module does not have to enumerate itself, and instead the control unit 30 can detect its presences, for example, by polling the mounting locations. In step 7124, the main controller initiates a challenge and/or authentication of the expansion module 65g. For example, the main controller can initiate the authentication procedure of FIG. 28 and/or of FIG. 24 as further described below.

In step 7126, it is determined whether the expansion module is verified or authenticated. When the module is not authenticated the module is de-enumerated as described with reference to step 120 of FIG. 24 below and/or an error is indicated (e.g., displayed on the LCD display 24, the module status indicator 56a is activated (e.g., flashes) or other such indications. Alternatively when the expansion module is authenticated, step 7130 is entered where it is determined whether the module is a re-flash module. This determination can be based on information provided by the expansion module 65 during the enumeration process, information provided in response to a request from the main microcontroller 32 and the like. When the expansion module is not a re-flash module, the process 7120 terminates and the control unit 30 continues with normal operations.

Alternatively when the expansion module 65 is a re-flash module, step 7132 is entered where the main microcontroller 32 requests and receives a version of the firmware 33d on the re-flash module 65g. In step 7134, the microcontroller further identifies a version of the current firmware 33a operating on the control unit 30. The microcontroller then determines in step 7136 whether the re-flash version of the firmware 33d is greater than the current version of the firmware 33a (i.e., whether the re-flash version is newer than the current version of firmware). When the current version is greater, the process terminates and the control unit 30 continues with normal operations. In those instances where the re-flash version of the firmware 33d is greater than the current version, step 7140 is entered and a re-flash flag is set. This re-flash flag can be a flag set in the non-volatile memory 32a (e.g., EEPROM), flash memory 33, a latch or register separate from the memory 33, in external memory and/or other relevant flag. The process 7120 then continues to step 7142 where the bootloader 33c is activated to implement a re-flash based on the version of the firmware 33d in the expansion module 65g. In some embodiments, the activation of the bootloader initiates a process 7220 described below with reference to FIG. 72.

Figure 72:
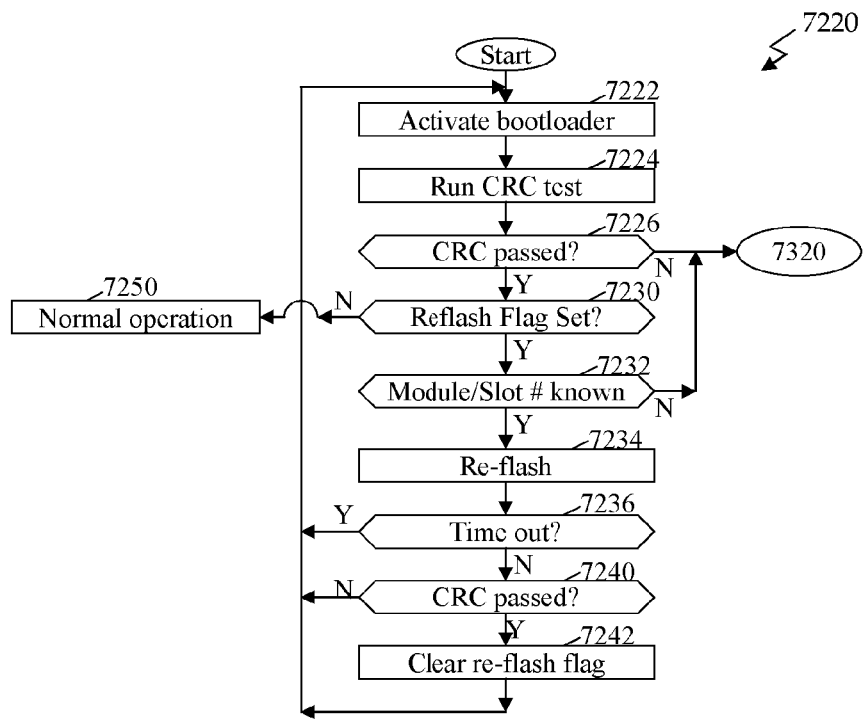
FIG. 72 shows a simplified flow diagram of a process to activate a control unit and/or to implement a re-flash of firmware.

FIG. 72 shows a simplified flow diagram of a process 7220 to activate a control unit 30 or microcontroller 32, and/or to implement a re-flash of firmware and/or code replacement of a main controller 32 according to some embodiments. In step 7222, the bootloader is activated. The bootloader can be activated and/or triggered upon power up of the irrigation controller 10, a reset of the irrigation controller, the detection of a re-flash expansion module (e.g., step 7142 of the process 7120 of FIG. 71), based on a jump to the bootloader during operation of the irrigation controller, a timeout occurs during the operation of the bootloader and/or during the process 7220, following a completion of a re-flash and/or other such instances. In step 7224, the bootloader 33c activates a validation or verification of the current firmware 33a and/or operating code to determine whether it is valid. In some instances, the current firmware may be corrupted, incomplete or other problems may be experienced with the current version of the firmware 33a. For example, an incomplete version of firmware may be stored because a previous re-flash failed to complete. The check of the current firmware can include one or more verifications, such as a check sum error evaluation, a cyclic redundancy check (CRC), and/or other relevant evaluations of the firmware to verify the firmware.

In step 7226, it is determined whether the current firmware 33a is valid or verified (e.g., the CRC test passed). When the verification or check (e.g., CRC) fails, the process 7220 activates a subsequent process 7320 to access a re-flash expansion module as described fully below. Step 7226 compensates for at least those instances where a previous re-flash of the firmware 33a failed to complete, a corrupted firmware was stored and/or other similar conditions. Step 7230 is entered when the verification in step 7226 passes, and the bootloader 33c determines whether a re-flash flag is set. As introduced above with reference to the process 7120 of FIG. 71, in some embodiments when a re-flash expansion module is identified, the re-flash flag can be set. When the re-flash flag is not set, the process 7220 terminates and the irrigation controller 10 continues to step 7250 and normal irrigation control operations. As introduced above, in some instances, the bootloader 33c is activated upon start-up, power up and/or reset of the control unit 30 and/or the main microcontroller 32. Steps 7222, 7224, 7226 and 7230 verify the firmware 33a and initiate the normal operation of the irrigation controller when a re-flash is not to be performed.

Alternatively, when a re-flash flag is set, the process in some embodiments enters optional step 7232 to determine whether a mounting location and/or slot number 45b is known. In some implementations, when a re-flash expansion module is detected during the enumeration, such as during the process 7120 of FIG. 71, the mounting location can be recorded when the re-flash flag is set. When the mounting location 45b is not known, the process 7220 activates an additional process 7320 of FIG. 73 to identify a re-flash module that might be utilized during a re-flash. As indicated, step 7232 can be optional, and in those embodiments that do not include step 7232, the process 7220 activates the subsequent process 7320 of FIG. 73 in attempts to identify one or more re-flash modules 65g. When step 7232 is included and a mounting location is known, step 7234 is entered where a re-flash is activated. Some embodiments further confirm that version of the firmware 33d of the re-flash module is greater than the current version of the firmware 33a before activating the re-flash.

The re-flash initiated in step 7234 retrieves a copy of the firmware image 33d on the re-flash expansion module 65g. In some implementations, the re-flash image is retrieved in pages, portions or packets at a time and stored to the flash memory 33. Typically, these pages of the re-flash image are stored to flash memory 33 replacing the previous version of the firmware 33a such that a complete re-flash copies over the entire flash memory 33 with the exception of the bootloader 33c that remains intact. As indicated above, typically the bootloader 33c is protected and cannot be overwritten and/or cannot be overwritten without additional authorized accesses. The re-flashing of the flash memory provides a revised or new version of the firmware to the irrigation controller 32 providing enhanced functionality and/or communication capabilities, abilities to utilize additional functionality provided by expansion modules 65 (including functionality that may be provided by the expansion module 65g that has just provided the new version of the firmware), correct errors in a prior version of firmware and/or other such advantages.

Still referring to FIG. 72, in step 7236 it is determined whether a timeout has been detected and/or whether the re-flash is complete. This timeout can occur, for example, if a response to a request (e.g., request for a portion of the firmware image) is not received from the re-flash expansion module or other such timeouts. In those instances where a timeout occurs or other similar errors occur, the process 7220 returns to step 7222 to again activate the bootloader 33c in attempts to activate the main microcontroller 32 and/or implement a re-flash of the flash memory 33. Alternatively, when a timeout does not occur and/or the re-flash is complete, a verification is performed in step 7240 to verify the re-flashed firmware. Again, this verification can be based on a CRC, check sum and/or other relevant verifications. When the verification is valid and/or the CRC is verified the re-flash flag is cleared and/or reset and the process 7220 returns to step 7222 to reactivate the bootloader to activate the main microcontroller 32 to operate in accordance with the new version of firmware stored in the flash memory 33 and enter the normal irrigation control operation (step 7250). Alternatively, the process returns to step 7222 without clearing or resetting the re-flash flag and attempts to again re-flash the firmware or return to the normal irrigation operations without re-flashing, when a valid version of the firmware is still accessible and/or following a verification (e.g., step 7224).

The return to step 7222 can be implemented, for example to compensate for those instances where multiple re-flash modules are occupying multiple mounting locations and the bootloader 33c does not identify a highest or most current version of firmware of the multiple re-flash modules prior to initiating a re-flash. This way, the bootloader sequentially accesses the multiple re-flash modules and does not implement a re-flash associated with those modules with the same or lower versions of the recently re-flashed firmware 33a, while subsequently accessed re-flash modules with newer or high versions can be utilized to again re-flash the flash memory 33. This operation of not checking each re-flash module prior to implementing a re-flash can simplify the bootloader code 33c, which may be advantageous in those instances where the memory space of the firmware 33a available for the bootloader code 33c is limited, as well as avoiding having to store re-flash versions and associated mounting locations and having to make a determination of which re-flash version is to be utilized in a re-flash when a re-flash is to be employed.

Figure 73:
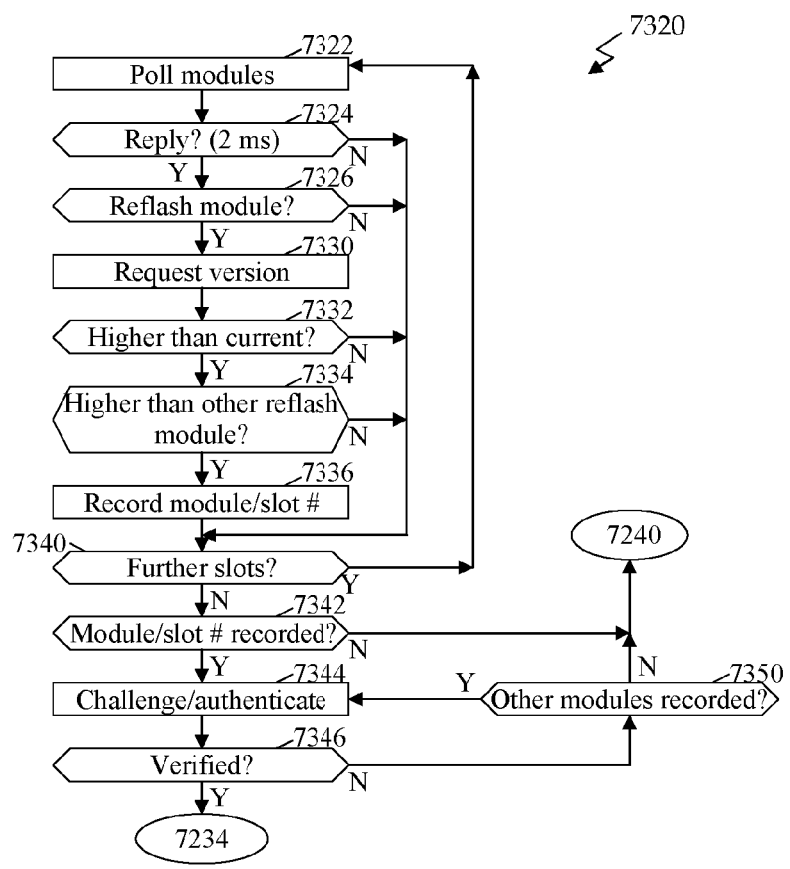
FIG. 73 depicts a simplified flow diagram of a process to identify a re-flash expansion module and initiate a re-flash and/or a code replacement of the firmware.

FIG. 73 depicts a simplified flow diagram of a process 7320 to identify a re-flash expansion module and initiate a re-flash and/or a code replacement of the firmware 33 of the main microcontroller 32. As described above, the process 7220 typically initiates the process 7320 and the bootloader remains active to implement process 7320. In step 7322 the bootloader queries and/or polls the one or more expansion modules 65 in the module mounting locations 45b to determine whether any modules are re-flash modules. This inquiry can comprise a command to each module and/or mounting location 45b requesting a re-enumeration, requesting an identification of the module, requesting a version of firmware stored on the module and/or other such requests. Step 7322 can optionally be excluded in those instances where the re-flash modules are known through prior enumerations as described further above and below.

In step 7324, it is determined whether a reply is received from the expansion module and/or mounting location 45b. In some implementations, a time period is monitored and if a reply is not received from the mounting location it is determined that a expansion module is not mounted in the addressed mounting location and/or the module mounted does not recognize communications sent based on a secondary bootloader protocol as fully described below. For example, the time period can be about 2 ms, 4 ms, 5 ms or other relevant time periods. Further, the time period can depend on many factors, such as the number of mounting locations, whether one or more expansion housings 80 are coupled with the controller, types of expansion modules expected to be incorporated and/or other such factors.

When a reply is not received (e.g., within the time threshold) the process 7320 jumps to step 7340 to determine whether further mounting locations or slots are to be evaluated. Alternatively, when a reply is received from an expansion module step 7326 is entered and the response from the expansion modules is evaluated to determine whether the responding expansion module is a re-flash expansion module. In those instances where the module is not a re-flash module, the process continues to step 7340. When the module is a re-flash expansion module step 7330 is entered where a request is transmitted for a version of the firmware image 33d stored in the re-flash expansion module 65g. Step 7330 may be skipped when a version is provided with the reply to the polling in step 7322. In step 7332, the version of the firmware of the re-flash module is evaluated to determine whether it is newer and/or higher than the current version of the firmware 33a being utilized by the irrigation controller 10.

When the current version of the firmware is newer than or the same as the firmware image of the re-flash module the process 7320 continues to step 7340. Alternatively, some embodiments include optional step 7334 where the process attempts to identify whether the firmware image of the re-flash module is the newest or highest version of multiple re-flash modules coupled with the irrigation controller 10 by determined whether the version of the firmware image 33d of the re-flash modules is newer or greater than firmware images of other re-flash modules. When one or more other re-flash modules have a firmware image that is newer or has a higher version of the firmware of the re-flash module being evaluated, the process 7320 skips to step 7340. Alternatively, in optional step 7336 the mounting location 45b and/or module identification is recorded and/or stored when the re-flash module being evaluated contains a re-flash firmware image 33d that is newer or greater than the current version 33a and is newer and/or greater than firmware versions of previously identified and evaluated re-flash modules. Other embodiments, however, do not attempt to identify which re-flash module 65g has a newest version when multiple re-flash modules are incorporated into the irrigation controller 10. Instead, the process 7320 can optionally skip from step 7332 to step 7344 to implement a re-flash when a re-flash module 65a is identified as having a version of the firmware 33d that is newer than the current version of the firmware 33a. The newest version is ultimately retrieved when multiple re-flash modules are incorporated into the irrigation controller 10, in these embodiments, by cycling through at least a portion of the process 7320 where successive re-flash modules are accessed in determining whether those modules have newer versions of the firmware image.

Still referring to FIG. 73, in step 7340 as introduced above it is determined whether further mounting locations and/or modules are to be queried to determine whether those mounting locations contain re-flash modules. In those instances where further mounting locations are to be evaluated the process returns to step 7322 to query another mounting location and/or module. Alternatively, the process 7320 continues to step 7342 to determine whether a mounting location or module has been recorded indicating that a re-flash module is mounted in a mounting location 45b that contains a firmware image 33d that is newer and/or has a higher version number than a current firmware image 33a stored in the flash memory 33. When a mounting location has not been identified and recorded the process 7320 transitions to step 7240 of the process 7220 of FIG. 72 where a verification of current firmware 33a is performed.

In those instances where a mounting location 45b has been recorded and/or identified the process 7320 continues to step 7344 to initiate a challenge and/or authentication of the identified re-flash module. This challenge or verification can be similar to step 7124 of the process 7120 of FIG. 71 and/or the authentication procedure of FIG. 28 and/or of FIG. 24 as further described below. Step 7344 can also be an optional step in those embodiments when the expansion module is challenged and/or verified prior to initiating the bootloader code 33c and the processes 7220 and 7320 (e.g., in steps 7124 and 7126 of the process 7120 of FIG. 71). In step 7346 it is determined whether the identified re-flash module is verified. When the module is verified, the process transitions to step 7234 of the process 7220 of FIG. 72 to implement the re-flash of the firmware 33a with the newer version of firmware 33d stored in the identified re-flash expansion module 65g. Optionally, when the module is not verified, the process 7320 continues to step 7350 to determine whether another re-flash expansion module was identified in steps 7322-7336 that contains a firmware image 33d that is newer than a version of the current firmware 33a utilized by the main microcontroller 32. When another re-flash module was identified, the module with the next highest version is selected and the process returns to step 7344 to authenticate the module. When there are no other re-flash modules identified with versions of firmware newer than a current version the process terminates and activates step 7240 of the process 7220 of FIG. 72 to initiate a validation (e.g., performs CRC testing) of the current firmware 33a in attempts to activate the irrigation controller 10 using the current firmware. In some embodiments, steps 7334, 7336, 7340 and 7342 are optional. In those instances where they are not included, once a re-flash module with a higher version firmware image is detected in step 7332, the process 7320 skips to step 7344 to initiate an authentication of the expansion module. The process 7320 can then be repeated for each subsequent module that has a newer version of the firmware.

The above process 7320 is typically implemented by the bootloader 33c of the main microcontroller 32. As such, the bootloader controls the re-flash of the firmware 33a. In some embodiments, however, some or all the control of the re-flash can be transferred to the re-flash module 65g. For example, the main controller 32 can forward information about the current version of the firmware 33a as well as information of other versions available from other re-flash modules coupled with the bus 39 and/or the main microcontroller 32. The re-flash module 65g can then make a determination whether it contains a version of firmware 33d that is newer than the current version 33a in the flash memory 33 and/or of other re-flash modules. In those instances where the module identifies itself as having the higher version of firmware 33d, it can direct the activation of the bootloader 33c to initiate a replacement of firmware and/or control the copying of the newer version 33d to the flash memory 33.

Further, typically the re-flash of the firmware 33a is implemented without the need for user interaction. This allows a streamlined process and provides users with the relevant versions of firmware without the user having to implement the code replacement and/or without the user even having to know or understand that a code replacement was taking place. In other embodiments, however, additional steps can be included, for example, in one or more of the processes 7120, 7220 and/or 7320 that provide for user interaction and/or confirmation. For example, the user can be notified (e.g., on the display 24 of the control panel 30 of the re-flash and asked to confirm the re-flash (this confirmation can be achieved in some instances by the user inserting the re-flash expansion module 65g, selecting a key 25 and/or other such confirmation), having the user select a firmware version (e.g., through user interface, keys 25 and/or the like) when multiple versions are available and/or other such user interaction. Many embodiments, however, do not need user interaction and can implement the code replacement or re-flash without user input. Further, some embodiments notify the user of the re-flash but do not need further user interaction.

Figure 34:
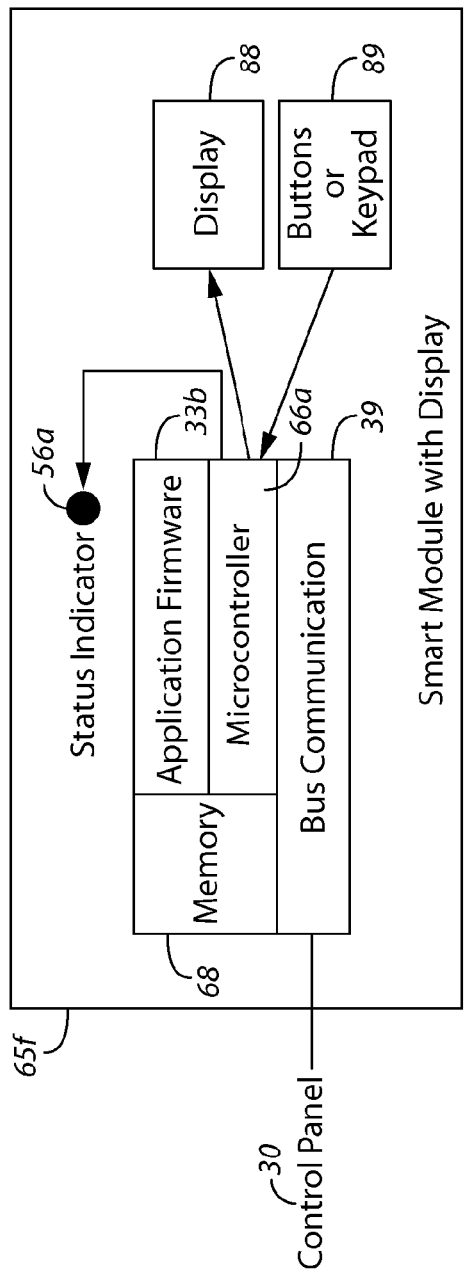
FIG. 34 is a block diagram of one embodiment of an expansion module functioning as a smart expansion module and including a display and a user input key.

Another variation of a smart expansion module 65f is illustrated in FIG. 34. In this embodiment, the expansion module 65f includes one or both of a display 88 and a user input device 89, such as one or more keys, buttons, knobs, or any other type of device to allow a user to input information to the module. Although the module 65f is illustrated without terminal inputs or outputs, some variations of this module 65f include inputs and outputs. The display 88 minimally acts as a status indicator to indicate to the user a status of the operation of the module 65f. Additionally, the display functions to provide an additional user interface as might be required in order for the user to program and implement the functionality of the expansion smart module 65f. Additionally, the input device(s) 89 provides a way for the user to enter data or otherwise program or configure the module 65f. The firmware 33b allows the microcontroller 66a to drive the display and interpret user interactions with the input device(s) 89.

In one embodiment, once the rotary dial 22 is turned to the "Smart Module" setting, the LCD 24 provides a list of the installed smart expansion modules (and smart expansion modules having interface extension capabilities), e.g., modules 65b, 65c, 65d, 65e, 65f. When this list appears, thanks to their built-in intelligence, these type of expansion modules have the ability to report their name and capabilities. Through the data received from the expansion modules 65 during the enumeration process (i.e., the process of the expansion modules 65 self detecting their installation and reporting their presence, type and configuration information to the main microcontroller), the main microcontroller 32 knows what module mounting locations have modules 65 in them so it knows how many modules belong on this list. Once the user selects the expansion module 65 which he/she wants to program from the list, by using the soft keys 25, the smart features are activated and the selected interface extension module 65c takes control of the controller display (e.g., LCD 24) and provides the user interface screens to the main microcontroller for display. The availability of an "exit" option on the menus created by the interface extension module 65c allows exiting from the 'user interface extensibility' mode, bringing back the list of smart expansion modules to the LCD 24.

Various expansion modules 65 and particularly smart expansion modules may be added to the controller to perform a variety of functions that expand the capabilities of the irrigation controller 10 beyond its basic irrigation functions. Other examples of functional expansion modules not specifically described above that may be added to the controller include: a latching solenoid module that sends a DC pulse along a wire to a latching solenoid operated valve; a wireless module having a wireless transmitter (radio, optical, etc.) that sends a wireless signal to a receiver at a self powered valve; a feature module containing an extra feature such as cycle and soak, etc., not present in the original controller; an alarm module for communicating fault conditions to a homeowner, an alarm company or alike; an lighting module that provides a low voltage output signal to outdoor lighting system (similar to an irrigation output, but intended to operate lights); a fertigation module connecting an automatic fertilization system and allowing the irrigation controller 210 to automate fertilization; a communication module connecting the controller 10 to other communication channels and/or networks including the internet, etc.

Figure 24:
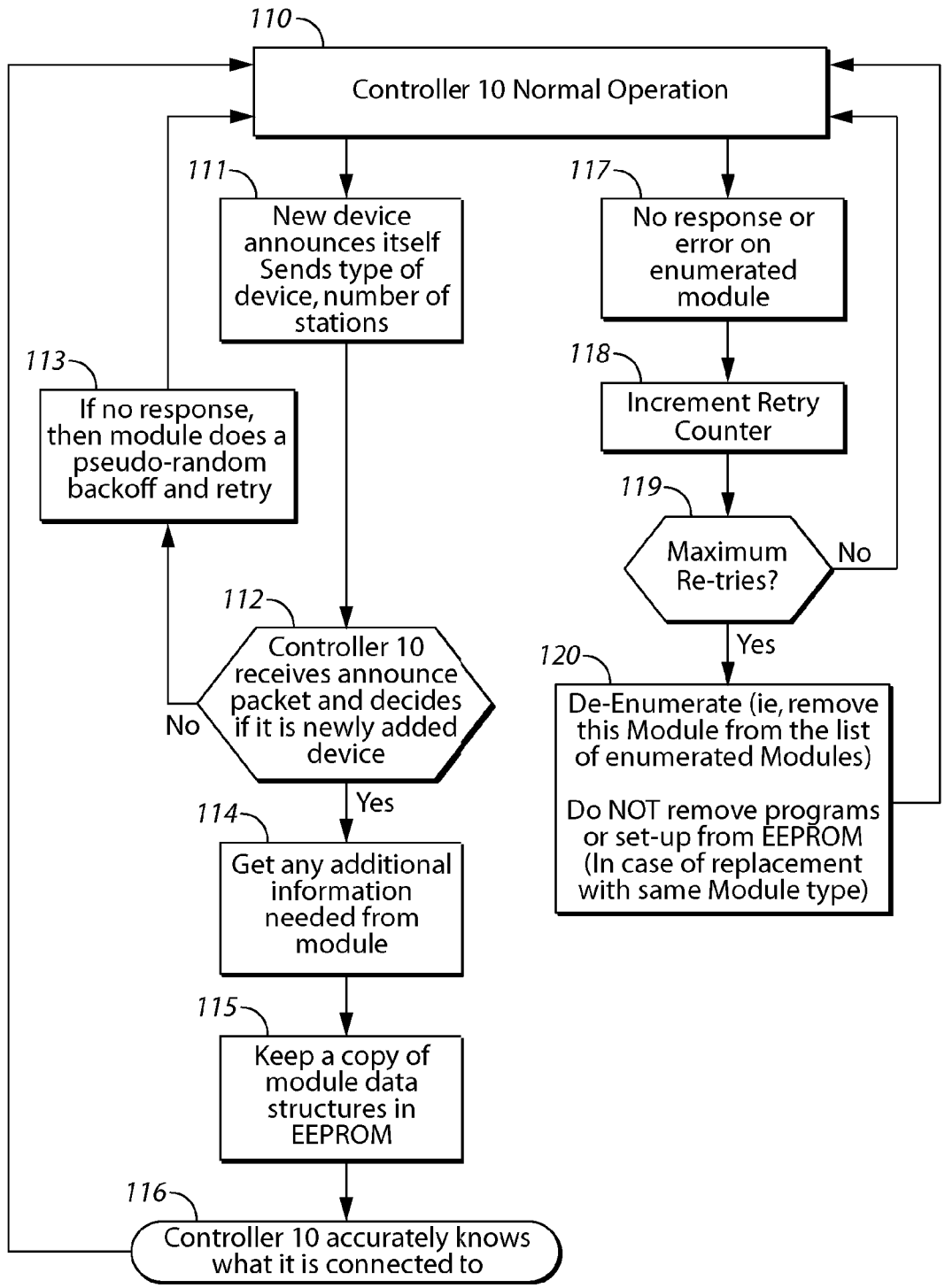
FIG. 24 is a flow chart illustrating the module enumeration process in accordance with one embodiment of the invention.

Referring next to FIG. 24, a flow chart is shown that illustrates one embodiment of the module enumeration process. Enumeration generally involves the process of each expansion module 65 determining its location in the controller backplane 45, and reporting this information and other details about the module to the main microcontroller. Initially, the modular controller is in normal operational mode (110), executing one or more irrigation programs or waiting to be programmed by a user. Many embodiments of the invention allow expansion modules 65 to be inserted and removed during operation of the controller 10 without having to power down the controller 10 or control panel 30. Since the main microcontroller 32 does not query for new modules, when a new expansion modules is mounted to an expansion module mounting location 45b, the new module 65 detects its presence, determines which mounting location it is in, and announces its presence (along with its type or functionality, and the number of output stations it includes) (Step 111). Typically, the expansion module 65 waits until the communication bus is quiet and sends a signal, such as an announce message to the main microcontroller. It is noted that in some embodiments, rather than sending a message (containing some data) to announce its presence, the expansion module sends or causes an electrical signal to be output to the main microcontroller, the characteristics of the signal or simply, its presence at the microcontroller, serve as an announcement of the expansion module. The control unit receives the signal (e.g., announce packet or message) from the expansion module and decides if it is a newly installed module (Step 112). If so, it adds the module 65 to a tracking list so that the main microcontroller 32 knows which modules 65 are present. The control unit will then respond to acknowledge the new expansion module 65 (not shown). Since the module 65 expects to receive a response from the controller, if the module 65 does not receive an acknowledge packet or message back from the main microcontroller 32 of the control unit, the module will assume that a data collision has occurred, and it will wait a period of time (either random or fixed duration), and make another announcement attempt. In one embodiment, the module performs a pseudo-random back off and retransmits the announce message (Step 113). That is, the module 65 waits and retries sending the message. The amount of time can depend, for example, on the mounting location and different mounting locations can have different back off periods. Once acknowledged, the main microcontroller 32 will initiate a two-way challenge/authentication with the module (such as described with reference to FIG. 28). Additionally, the expansion module 65 provides any additional information (Step 114) needed to the main microcontroller 32. Alternatively, the microcontroller 32 requests any required information from the expansion module. In accordance with several embodiments, the main microcontroller 32 then stores any configuration data for the expansion module in memory (Step 115). At this point, the controller (e.g., the main control unit/control panel 30 or the main microcontroller 32) knows what type of expansion module is connected. In preferred form, configuration data includes data or parameters that is user defined and is not specific to the characteristics of a given expansion module itself, but is data that is learned or programmed in the use of the expansion module. For example, in one form, configuration data for an input expansion module may include the types of sensor inputs that the input expansion module is coupled to. That is, the configuration data could include the fact that a given input expansion module is coupled to a moisture sensor (as opposed to a rain sensor or other type of input) or the number of inputs/outputs that are connected. These details are useful to the main microcontroller, but not evident in the characteristics or functional capabilities of the expansion module itself (such as how many inputs or outputs the expansion module has, which is evident in the characteristics of the expansion module). Thus, configuration data can be user defined in use of the expansion module at the installation.

In normal operation, the main microcontroller 32 continuously sends refreshing signals on a periodic basis to each connected module to confirm that the module is still connected. For its part, the expansion module 65, replies to these refresh signals to let the controller know that it is still connected. If during operation, a given expansion module 65 is unplugged from the backplane, the main microcontroller 32 will stop receiving responses to the refresh signaling sent by the main microcontroller (Step 117). The microcontroller 32 then increments it retry counter (Step 118), and sends additional refresh signals until a response has still not been received from the expansion module after a maximum number of retry attempts (Step 119). At this point, the main microcontroller assumes that the expansion module has been removed and de-enumerates the expansion module (Step 120). In other words, the expansion module is removed from the list of enumerated modules 65. In preferred embodiments, the configuration data (including user defined configuration data) stored in memory is retained until another expansion module is mounted into the location of the removed module. In the event the new module (following steps 111-114) is a replacement module identical in nature to the recently removed module, the same configuration data is used for the replacement module. Advantageously, a module replacing an expansion module does not need to be reconfigured. That is, it can use the already learned or programmed configuration data as the previous module it is replacing. In one embodiment, upon the enumeration of a replacement expansion module, a copy of the configuration data stored in the memory of the control unit is transmitted to the expansion module and stored in the expansion module as well, since some configuration data may relate to a programmed or user defined parameter of the control unit as it relates to its interaction with the expansion module.

In some implementations, the enumeration by one or more expansion modules 65 can be restricted or limited during a re-flash and/or while the bootloader is operating. Communication over the bus 39 from modules attempting to enumerate during a re-flash and/or while the bootloader is active are typically not recognized by the bootloader and the bootloader does not respond to these requests. As a result, if these enumerations are not restricted expansion modules added while the bootloader is active may continue to try and re-enumerate creating potentials for collisions on the bus. In some instances, an expansion module waits until the bus is silent before initiating an enumeration. This silence can further be a silence for a predefined period of time (e.g., 10 ms, 20 ms, 100 ms or other relevant time periods). When the expansion module determines that it should enumerate (e.g., upon being inserted into the controller 10) the module monitors the bus looking for a silence period. Once the silence period is detected the expansion module initiates the transmission of its enumeration communication. It is noted that in some implementations the expansion modules may wait for additional periods, for example based on mounting location, back off times, and/or other such factors in attempts to further avoid collisions on the bus.

Further, to implement communication between the main controller 32 and the re-flash expansion module 65g, some embodiments further employ a relatively simple secondary bootloader protocol for communication on the bus 39 between the bootloader code 33c and the re-flash modules 65g. Employing a relatively simple protocol allows the bootloader code to be relatively small and/or compact. This can be particularly advantageous when the flash memory 33 has a limited amount of memory capacity and/or when attempting to limit the amount of flash memory occupied by the bootloader 33c. For example, in some implementations, the flash memory 33 can be limited to 128 Kbytes (e.g., when utilizing a microcontroller chip, with only a portion of the limited memory (e.g., about 8 Kbytes) reserved for the bootloader 33c). As such, some embodiments employ two different communication protocols to communicate over the bus 39 depending on the state of operation. A first protocol can be used during normal irrigation control operation, with the second relatively simple protocol utilized at least by the bootloader 33c.

The bootloader protocol can limit the communications available over the bus 39. In some implementations, the bootloader protocol provides for four communications:

| Command/Message | ID | Description |
|---|---|---|
| Request Version | 1 | Sent by the controller's bootloader to request that the re-flash expansion module forward the controller firmware version stored within the module. |
| Request Version Response | 2 | Sent by the re-flash expansion module. It contains the version of the irrigation controller firmware image stored in the module. |
| Request Page | 3 | Sent by the bootloader to request that the re-flash expansion module send a specified page of the firmware stored in the module. |
| Request Page Response | 4 | Sent by the re-flash expansion module forwarding the requested firmware image page. |

In providing the second protocol, some embodiments further attempt to limit and/or prevent confusion and conflicts with modules on the bus 39 because of the two protocols. In some implementations, the bootloader when activated maintains control over the bus 39 by limiting which modules communicate over the bus while the bootloader is active. As described above and throughout the specification, some embodiments are configured such that the modules upon insertion into a mounting location (and/or upon a reset, a time out, or other such conditions) enumerate themselves to the main controller 32. This enumeration is postponed until a silent period is detected on the bus 39. Further, the modules re-enumerate if a reply is not received from the main controller in response to an enumeration. Often this re-enumeration occurs when the reply from the main controller is not received within a threshold time period. The bootloader 33c, in some implementations, can maintain control over the bus 39 by in part preventing sufficient silent periods from occurring on the bus. As such, the modules do not enumerate or re-enumerate because a sufficient silent period is not detected.

Those expansion modules that can communicate with the bootloader and/or can utilize the bootloader protocol comply with the bootloader protocol during bootloader operation and/or re-flashing. In some implementations, addressing is utilized to focus communications to intended devices. As introduced above, some communications can additionally or alternatively employ a 9-bit communication protocol. These embodiments can utilize the ninth bit in some implementations to indicate to receiving modules and/or the controller that a communication is to be evaluated. For example, a communication can be configured such that a first character, packet or byte of the communication includes an 8-bit address with a ninth bit set to a predefined level (e.g., set high). In the description below the character containing an address with the ninth bit set is referred to as address character.

A receiving module 65 (and/or controller 32), upon detection that the ninth bit is set, evaluates the 8-bit address of the address character to determine whether the communication is directed to the module and/or is to be further evaluated. Additionally in some instances, once a module determines that a communication is not directed to that module, the module can effectively disregard further communications on the bus 39, with the exception of identifying an address character, until a subsequent communication is detected that contains an address character where the module again evaluates the address of the address character. For example, the modules can be configured (e.g., using their UART) so that they are alerted when an address character is received, and disregard or ignore other communications with a character that has the ninth bit cleared when the previous address character was not directed to that module.

When an address character is received, the expansion module 65 and/or controller 32 checks the address byte of the address character (e.g., through firmware) to determine whether it matches the mounting location or slot number 45 in which the module is mounted or a controller address. When it does then the firmware sets one or more flags (e.g., a UART flag) so that it is alerted for subsequent communication packets and/or characters even when the ninth bit is cleared. This allows the modules to receive additional communications. When the address does not match the mounting location, the firmware disregards the data byte(s) and/or payload, and the module controller or CPU 66a will not be alerted until another address character is received.

Utilizing the address character allows modules to disregard communications until a communication is directed to that module. This can free up resources of the modules to perform other functions and/or allow the module to enter an idle or sleep state rather than having to continue to monitor communications on the bus. Additionally, this communication protocol can be implemented through relatively minimal code reducing memory resources.

The bootloader protocol can additionally or alternatively utilize addressing in distinguishing bootloader protocol communications. In some implementations, one or more addresses can be defined as special or bootloader protocol addresses. Re-flash modules 65g and/or other expansion modules 65 capable of communicating with the bootloader 33c can detect the one or more address characters identifying that these communications are to be further evaluated. For example, a first address (e.g., an address of 001 or substantially any other relevant predefined address) can be defined as a bootloader address. Expansion modules 65 capable of communicating with the bootloader 33c recognize the address and further evaluate the communication, and those devices that cannot communicate with the bootloader will disregard the communication.

Figure 74:
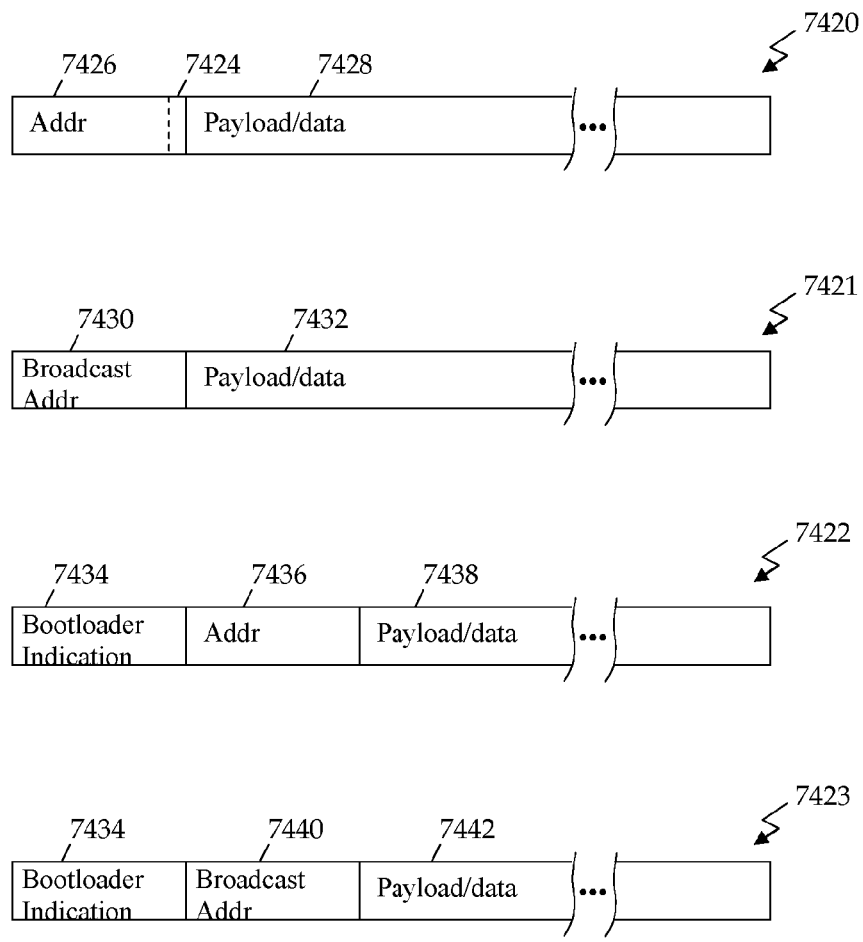
FIG. 74 depicts simplified block diagram representations of a series of communications.

FIG. 74 depicts simplified block diagram representations of a series of communications 7420-7423. The first representation shows a communication 7420 that includes a destination address character or byte 7426 (that can include a ninth bit 7424 that is set, in some implementations) along with a data or payload portion 7428. Expansion modules 65 and/or the main controller 32 (and potentially other devices coupled with the bus 39) detect the communication, detect the address character 7426, evaluate the address and take appropriate action should the communication be addressed to that module or the controller. This communication is commonly utilized in many embodiments to implement normal operation communications over the bus 39. The second representation shows a broadcast communication 7421 that similarly includes a destination address character 7430 (which can have the ninth bit set) and a data portion 7432. In this example, however, the destination address 7430 is a predefined address that is designated and/or recognized as a broadcast address. This predefined broadcast address is recognized by more than one module and/or devices on the bus (and in some instances all the modules and/or devices on the bus) as a communication that should be further evaluated and/or acted upon. When a broadcast communication 7421 is received, the modules 65 will accept it and the remainder of the communication as if the communication had been addressed to the receiving module. It is noted that in some implementations the modules and/or devices receiving the broadcast communication 7421 do not respond to the broadcast communication with an acknowledgement, which can reduce bus traffic and/or bandwidth usage.

The third representation of FIG. 74 shows an example of a bootloader communication 7422 that includes a predefined bootloader designation address 7434 (which in some instances has the ninth bit set), a secondary address 7436 and a bootloader data or payload portion 7438. Modules, the bootloader 33c and/or other devices coupled with the bus 39 that can communicate utilizing the bootloader protocol recognize the predefined bootloader designation address 7434 and continue to further evaluate the communication 7422. This predefined bootloader designation address 7434 can be substantially any relevant address that is predefined as the bootloader designation address (e.g., an address of 002 or substantially any other relevant address). Those devices that are unable to utilize the bootloader protocol and/or cannot communicate with the bootloader 33c disregard the communication (and in some instances continue to disregard further communications on the bus 39 until a subsequent communication is received that has an address character with its ninth bit set). Those modules and/or the controller that can utilize the bootloader protocol detect the predefined bootloader designation address 7434 and continue to evaluate the secondary address 7436 to determine whether the bootloader communication is directed to that module and is to be further acted upon. For example, when the secondary address matches the mounting location within which the module is positioned, the module can extract the payload and take appropriate action (e.g., identifying one of the predefined communication commands or messages, such as request version, request version reply, request page, request page reply, or other relevant commands or messages).

As described above, some embodiments further provide for a predefined broadcast address (e.g., an address of 001). The bootloader protocol can similarly utilize the broadcast address in transmitting communications. Still referring to FIG. 74, the fourth representation shown in FIG. 74 is an example of a bootloader communication 7423 that includes the predefined bootloader designation address 7434 (which in some instances has the ninth bit set), a secondary address 7440 that is the broadcast address and a bootloader data portion 7442. This communication configuration 7423 allows one device on the bus (e.g., the bootloader code 33c) to broadcast a single bootloader communication that the other devices on the bus 39 receiving the communication and capable of utilizing the bootloader protocol will further evaluate and/or take appropriate actions depending on the contents of the data portion 7442. In some instances, similar to the broadcast communications described above, modules 65 capable and/or configured to receive and process the bootloader broadcast communications 7423 do not issue acknowledgement to the broadcast communication. These communication configurations allow the modules, controller 32 and/or bootloader 33c to communicate over the bus and in part limit or avoid confusion on the bus.

The example communications 7420-7423 of FIG. 74 are shown with the addresses preceding the data portions. It is noted, however, that the communications do not have to be configured in this order, and instead, the addresses can be positioned in substantially any relevant order and/or location within the communication that can be extracted by the receiving device.

As with other smart modules, the re-flash modules 65g can be configured to monitor the bus 39 and initiate communicates in response to various conditions. For example, in some embodiments, the re-flash modules can initiate an enumeration as described above when the module detects that it is inserted into a mounting location 45, it is reset, the microcontroller 32 requests enumeration, the bus 39 is silent for a predefined amount of time and/or when other conditions occur. As a further example, when a re-flash module detects that the bus 39 has been silent for a predefined reset period of time (e.g., such as 500 ms, 100 ms, 50 ms or other such relevant periods) the re-flash module 65g can initiate reset code that starts operations as if the module had just been mounted or plugged into a mounting location, which can include the enumeration process.

Many re-flash modules 65g additionally provide functionality beyond the re-flashing of the firmware 33a of the irrigation controller 10, such as flow measure and/or control, ET monitoring, other types of sensor tracking, actuate irrigation valves, provide additional or alternative communication ports and/or modes of communication (e.g., providing wireless communication), enhanced communication security, provide a display, provide additional user interface (e.g., additional buttons, dials and the like), provide additional operating languages, irrigation initiation, additional communication ports to the irrigation controller 10 and/or substantially any other relevant functionality. In some instances, a current version of the firmware 33a of the main controller 32 may not be able to utilize the irrigation control functionality or other functionality provided by an expansion module 65. As a result, the expansion module may contain a new version of the controller firmware 33d that is to replace the current firmware of the controller to allow at least the utilization of the functionality provided by the module. Additionally or alternatively, the new version of the controller firmware 33d can provide additional functionality, enhancements, fixes to one or more problems with a prior version of firmware and the like.

In some embodiments, re-flash modules 65g, as well as other modules, can transition to an idle or sleep state. This can reduce power consumption, communication traffic over the bus and/or have other such beneficial effects. The transition to an idle state can be based on time thresholds, power consumption conditions and/or other such factors. For example, a re-flash module may transition to an idle state when a predefined idle time period expires without receiving a communication addressed to that module (or a broadcast communication in those embodiments that employ broadcast communications). Further, some modules that contain triac input/outputs that do not receive communications or packets addressed to them over a predefined idle threshold period (e.g., a period of 10 seconds, 5 seconds or substantially any other relevant time threshold) can effectively transition to an idle state turning off outputs. Further, expansion modules can be configured to recognize broadcast communications and/or the predefined broadcast address 7430. That way the control unit 30, main microcontroller 32 and/or other devices on the bus can at least send a communication to shut down or force one or more modules 65 to an idle state prior to the predefined idle threshold period by issuing an "all" sleep or idle command globally. In some implementations, the broadcast communication can be a fixed communication and/or packet and the controller can issue the string without a stack.

As described above and further below, the bootloader 33c can attempt to limit communication collisions on the bus 39 that can interfere with the bootloader operation. As such, in some embodiments, the bootloader 33c additionally monitors the communications over the bus and ensures that a communication is transmitted over the bus within at least the period of time that is less than the wait period to initiate an enumeration and/or the predefined re-enumeration threshold period that could trigger a re-enumeration. For example, in some implementations, the bootloader 33c initiates a communication at least once every prevention threshold period when other communications are not being transmitted and/or received. These additional prevention communications can be sent even while the bootloader is waiting for a flash page write cycle to complete. This prevention threshold period can be substantially any relevant period depending on the parameters of one or more expansion modules 65, such as 8 ms, 5 ms, 1 ms and/or other such relevant periods. These additional prevention communications can be dummy communications that do not include a valid address and/or payload, can be a broadcast communication (e.g., designating status information) and/or other such communications. The prevention communications can additionally address potential conflicts or collisions on the bus from modules 65 that are enumerated with the irrigation controller 10, modules that have not yet started to enumerate and/or modules that are still trying to enumerate (typically, these modules continue to wait for a sufficient silence period).

Additionally in some instances, the bootloader 33c following the completion of a re-flash of the flash memory 33a stops communicating over the bus in attempts to maintain the bus in a silent state for a predefined threshold period. By keeping the bus in a silent state at least those expansion modules that are in a bootloader state communicating using the secondary protocol will detect the silence on the bus and exit a bootloader state and/or activate a reset transitioning these modules from the bootloader state to a normal operating state. In some implementation, this silent state is initiated at a start up of the control unit and/or main microcontroller 32 as well as following a re-flash so that modules return to normal (or non-bootloader) operating states. Alternatively or additionally, the bootloader and/or controller can issue a command that directs modules to exit the bootloader state.

Figure 75:
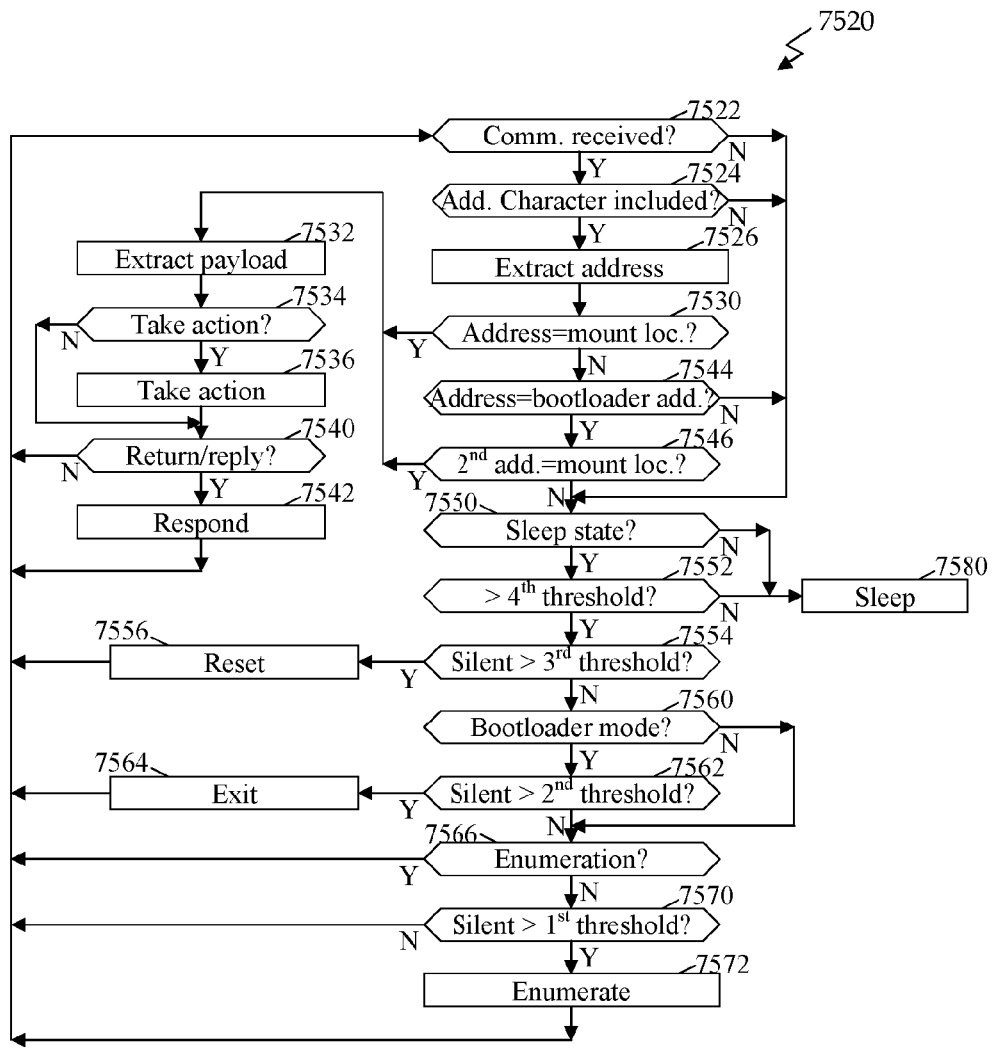
FIG. 75 depicts a simplified flow diagram of a process of an operation of a re-flash module according to some embodiments.

FIG. 75 depicts a simplified flow diagram of a process 7520 of an operation of a re-flash module 65g according to some embodiments. In step 7522 a determination is made whether a communication has been detected and/or received by the re-flash module 65g over the bus 39. When a communication has not been received the process skips to step 7550 to determine whether the module is in an idle or sleep state. Alternatively, when a communication has been received the communication is evaluated to determine whether a previous communication was received with an address character and an address associated with the module or the current communication includes an address character (e.g., a byte with the ninth bit set) or some other indicator that the module is to further evaluate the communication. When there is no address character and the module is not continuing to monitor communications based on a prior received address character the process skips to step 7550. In instances where an address character or other indication is identified step 7526 is entered and an address is extracted from the communication, for example, from the address character.

In step 7530 the address is evaluated to determine whether the address matches a mounting location into which the module 65g is mounted and/or whether the address is a broadcast communication (e.g., containing a predefined broadcast address recognized by the module), and thus, identifying the communication as a communication to be acted upon. When the communication is directed to the module 65g, the process 7520 continues to step 7532 to extract the payload and/or data from the communication. In step 7534, the extracted payload is assessed to determine whether an action is to be taken. In those instances where an action is to be taken step 7536 is entered where appropriate action is initiated. This action can be substantially any action that can be implemented by the module 65g such as, but not limited to, enter a bootloader state and/or utilize the bootloader protocol, implement flow monitoring, implement ET evaluation, activate one or more valves, monitor sensors, enumerating, shifting to an idle state (which may trigger step 7582), generating an acknowledgement, and/or substantially any other relevant action.

Following step 7536 and when it is determined in step 7534 that no action is to be taken (e.g., the communication is a status communication, an acknowledgement that does not trigger further action, a dummy communication, or other communication where no action is needed) the process continues to step 7540 where the action performed and/or communication is further evaluated to determine whether a response or reply is to be transmitted (e.g., sending an acknowledgement, forwarding status information, forwarding results detected by a sensor, returning an ET value and/or evaluation, returning a flow value and/or evaluation, and/or other such relevant responses). The process returns to step 7522 when a response is not to be sent. When a response or reply is to be transmitted, step 7542 is entered where the response or reply is configured and/or formatted, and transmitted. The process 7520 then returns to step 7522 to determine whether further communications are received.

In those instances where it is determined in step 7530 that the extracted address does not match the mounting location and/or is not a broadcast address, step 7544 is entered where the communication is further evaluated to determine whether it contains a predefined bootloader designation address 7434. As described above, some embodiments utilize one or more predefined bootloader designation addresses that can be recognized by those modules capable of communicating with the bootloader and/or can utilize the bootloader protocol. Step 7544 identifies those bootloader communications by detecting the predefined bootloader designation address 7434. When the address is the predefined bootloader designation address, step 7546 is entered where the communication is further evaluated to extract a secondary address 7436, 7440 to determine whether the secondary address matches the mounting location 7436 within which the module 65g is mounted and/or is a broadcast address 7440. In those instances where the secondary address matches the mounting location or is a broadcast address, the process 7520 continues to step 7532 to extract the payload, to step 7534 to determine whether action(s) is to be taken, to step 7536 to implement appropriate actions when actions are to be performed (e.g., identify a version of re-flash firmware 33d stored on the re-flash module 65g, retrieve a page or portion of the re-flash firmware 33d to be forwarded to the bootloader 33c, and the like), to step 7540 to determine whether a response/reply is to be generated, and to step 7542 to communicate a response (e.g., transmitting a version of the re-flash firmware 33c, transmitting a portion of the re-flash firmware 33c, acknowledgement, and/or other such response) when appropriate.

Alternatively, when it is determined in step 7544 that the communication is not a bootloader communication and/or when it is determined in step 7546 that the secondary address does not match the mounting location and/or is not a broadcast address, the process skips to step 7550. In step 7550, the module evaluates its current state of operation to determine whether it is in an idle or sleep state or mode. When the module is in an idle state, step 7580 is entered where the idle state is maintained. The process 7520 continues to step 7552 when the module is not in the idle state to determine whether a communication has been received that has been addressed to the module 65g within a predefined idle time threshold or period (or a broadcast communication has been received in those embodiments that employ broadcast communications). The process continues to step 7580 to enter the idle state when communications have not been received within the predefined idle time threshold.

Step 7554 is entered when the predefined idle time threshold has not been exceeded to determine whether the bus 39 has been silent for a predefined reset threshold or period. When the reset threshold has been exceeded the re-flash module 65g can initiate reset code and start operations as if it has just been plugged into a mounting location, which can include the enumeration process in step 7556. Alternatively, the process continues to step 7560 to determine whether the module 65g is in a bootloader mode (e.g., in a mode to communicate with the bootloader 33c and/or utilize the bootloader protocol). When it is determined that the module is not in the bootloader mode, the process skips to step 7566. Step 7562 is entered when the module 65g is in the bootloader mode to determine whether the bus 39 has been silent for a predefined exit bootloader mode threshold. The process enters step 7564 when the bus has been silent for the exit bootloader threshold where the re-flash modules 65g triggers firmware 33b to exit the bootloader mode or state and/or to activate a reset transitioning from the bootloader mode to a normal operating state (e.g., that can allow the module to provide other functionality when such additional functionality is provided by the re-flash module).

Still referring to FIG. 75, when the bus has not been silent for the exit bootloader threshold the process 7520 continues to step 7566 to determine whether the module has re-enumerated during this silent period on the bus 39. Step 7570 is entered when the module 65g has not re-enumerated to determine whether the bus 39 has been silent for a re-enumeration threshold period. In step 7572, the module 65g re-enumerates when it is determined in step 7570 that the bus has been silent for the re-enumeration threshold.

The process 7520 returns to step 7522 to continue monitoring for communications over the bus 39 following the reset in step 7556 or the transition from the bootloader mode to the normal mode of step 7564. Similarly, the process returns to step 7522 when it is determined in step 7566 that the module 65g has enumerated during the silent period on the bus or when it is determined in step 7570 that the bus has not been silent for the re-enumeration threshold.

The process 7520 is an example process that can be implemented by a re-flash module 65g or other module capable of operating in the bootloader mode and/or communicating using the bootloader protocol when employed. In some embodiments, one or more of steps 7552, 7554, and 7570 are not implemented and/or are optional steps. The module can operate without employing one or more of these steps (e.g., receiving commands to reset (step 7556) and/or exit the bootloader mode (step 7564)). Similarly, the threshold periods can be substantially any relevant threshold period. Further, the threshold periods identified in the process 7520 may vary depending on a state of operation of the module 65g, the main microcontroller 32 and/or the irrigation controller 10. Still further, in some embodiments, these thresholds can be adjusted and/or altered during operation, for example, depending on a state of operation of the module 65g, the main microcontroller 32, the irrigation controller 10, an irrigation system, and/or based on commands from the bootloader 33c, the main microcontroller 32 and/or a central controller in communication with the irrigation controller 10.

Figure 76:
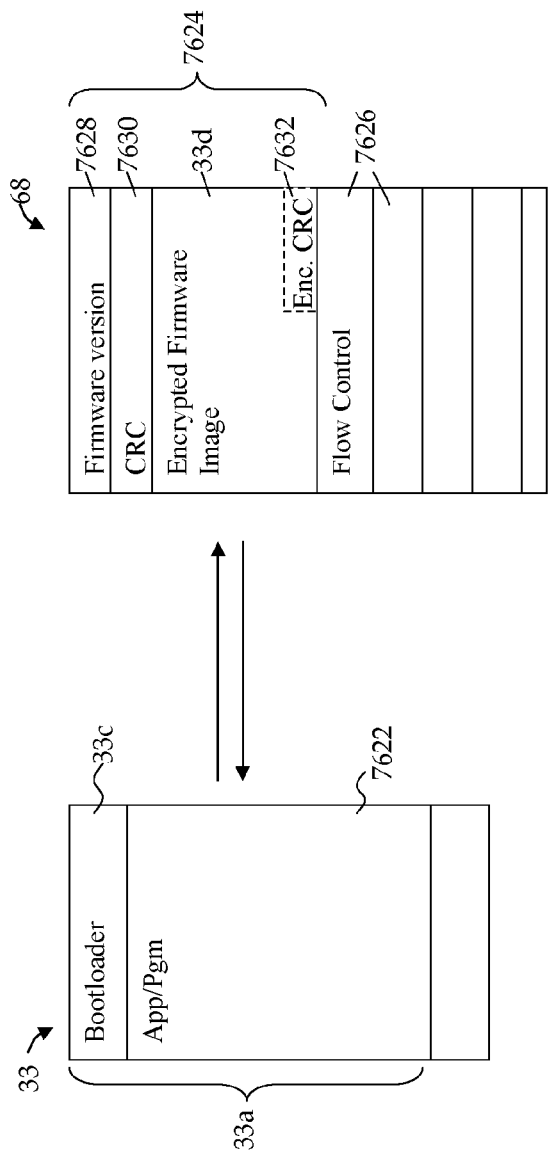
FIG. 76 depicts a simplified block diagram of memory structures of the flash memory of the control panel and the memory of a re-flash expansion module according to some embodiments.

FIG. 76 depicts a simplified block diagram of memory structures of the flash memory 33 of the control panel 30 and the memory 68 of a re-flash expansion module 65g according to some embodiments. As described above, flash memory 33 stores the firmware 33a that includes the bootloader code 33c that when implemented by the main microcontroller 32 (see FIG. 11) communicates with the expansion module 65g, and the application and/or programming code 7622 that when implemented controls the main microcontroller during operation to at least implement irrigation control functionality. The memory 68 of the re-flash module 65 includes a re-flash code 7624, and optionally can additionally include one or more function application codes 7626. The re-flash code 7624 provides for communication with the bootloader 33c and controls the transfer of the re-flash image 33d. The re-flash code 7624 further includes and/or accesses the re-flash image 33d and allows the module to communicate with the bootloader 33c and forward the re-flash image to the control panel 30. The version 7628 of the firmware image 33d can additionally be stored in memory 68, typically with and/or as part of the re-flash code. The application code 7626 when implemented can provide additional functionality such as flow control, ET functionality, language selection, valve activation and/or other such implementations.

In some embodiments, the firmware image 33d is stored in memory 68 on the re-flash module 65g in an encrypted form. Typically, the module does not decrypt the image and further typically does not have the capabilities and/or authorization to decrypt the firmware image. Instead, the firmware 33d is transferred (typically in portions or pages at a time) to the control unit 30 in the encrypted form. Maintaining the firmware image 33d in the module 65g in an encrypted form provides protection of the firmware image. Further, the firmware image is transferred to the control panel 30 in the encrypted form and the bootloader contains the key to decrypt the image to be stored in the flash memory 33a providing additional security and/or protection so that even if the image is intercepted during transfer it is still encrypted. Further, in some embodiments, prior to initiating a transfer of the firmware image 33d, the re-flash module 65g performs a verification and/or validation of the firmware image 33d. This validation is performed in an attempt to ensure that the image is complete and accurate before allowing the firmware image 33d to be supplied to the bootloader 33c. The validation can be substantially any validation. For example, the validation can include a CRC 7630 of the encrypted firmware image prior to initiating a transfer. In some embodiments, the firmware image 33d is validated prior to being encrypted and stored in the memory 68 on the module 65g. For example, a CRC can be performed on the unencrypted firmware image and this CRC value 7632 can be incorporated within the re-flash image 33d, which is then protected, such as by providing password protections, encrypting or otherwise protecting, for example by applying convolution (bit, byte, block or the like), applying exclusive OR (bit, byte, block level or the like), data encryption standard (DES), triple DES (3DES), substitution, RSA (Ron Rivest, Adi Shamir, and Leonard Adleman), digital signature standard (DSS), scrambling, digital signature algorithm (DSA), key encryption, public key encryption (PM), CipherSaber, Rivest Cipher 2 (RC2), Rivest Cipher 4 (RC4), rearranging, content scrambling system (CSS), transposition, a combination of substitution and transposition, advanced encryption standard (AES), Diffe-Hellman (DH), secure hash algorithm (SHA), message digest algorithm (MD5), pretty good protection (PGP), and/or other such protections and/or combinations of protections. The CRC value 7632 is then encrypted with the firmware so that the firmware upon copying to the flash memory 33 can be validated when the bootloader decrypts the copied image. Further, CRC value 7630 of the encrypted firmware image allows the re-flash module 65g to perform the validation of the encrypted firmware image without having to decrypt the firmware image prior to initiating communication of the image to the control panel 30. The microcontroller 66a of the re-flash module 65g further implements a portion of the firmware 7624 to allow the microcontroller to perform the validation of the firmware, forward the encrypted firmware image 33d to the control panel 30, communicate with the control panel, provide additional functionality and/or other such operations of the module.

Figure 77:
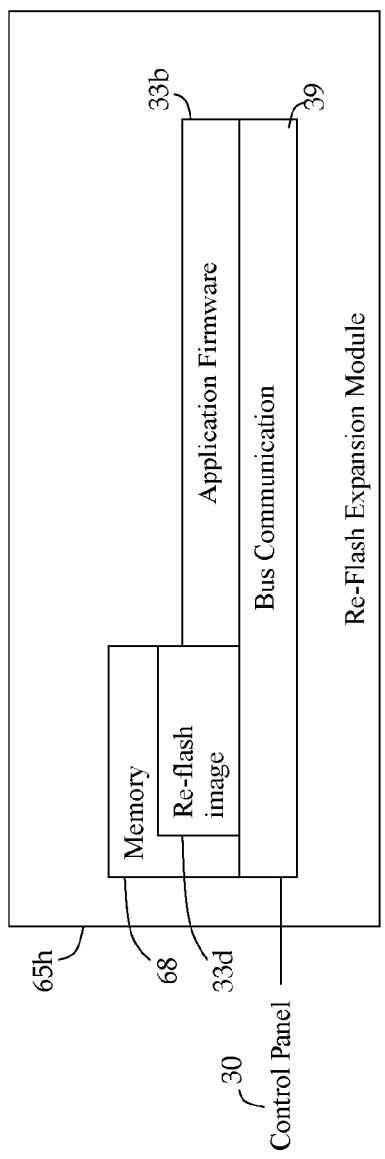
FIG. 77 depicts a simplified block diagram of a smart module according to some embodiments that is similar to the smart module illustrated in FIG. 70.

Additionally or alternatively, some embodiments provide modules that do not include a microcontroller 66a. FIG. 77 depicts a simplified block diagram of a smart module 65h according to some embodiments that is similar to the smart module 65g illustrated in FIG. 70, and stores a version of firmware 33d in the memory 68. The version of the firmware 33d can replace the firmware 33a of the control panel 30, which can provide the control panel with enhanced features, fix problems with a prior version of firmware, provide additional communication capabilities and the like. When this re-flash module 65h is mounted with the controller 10, the main microcontroller 32 detects its presence (e.g., through polling, power signal, and/or other such indication) that module is present. The microcontroller 32 can further detect the memory 65 and that the memory contains the new firmware 33d, which can be pulled by the bootloader to overwrite the portion of the current firmware.

Figure 29:
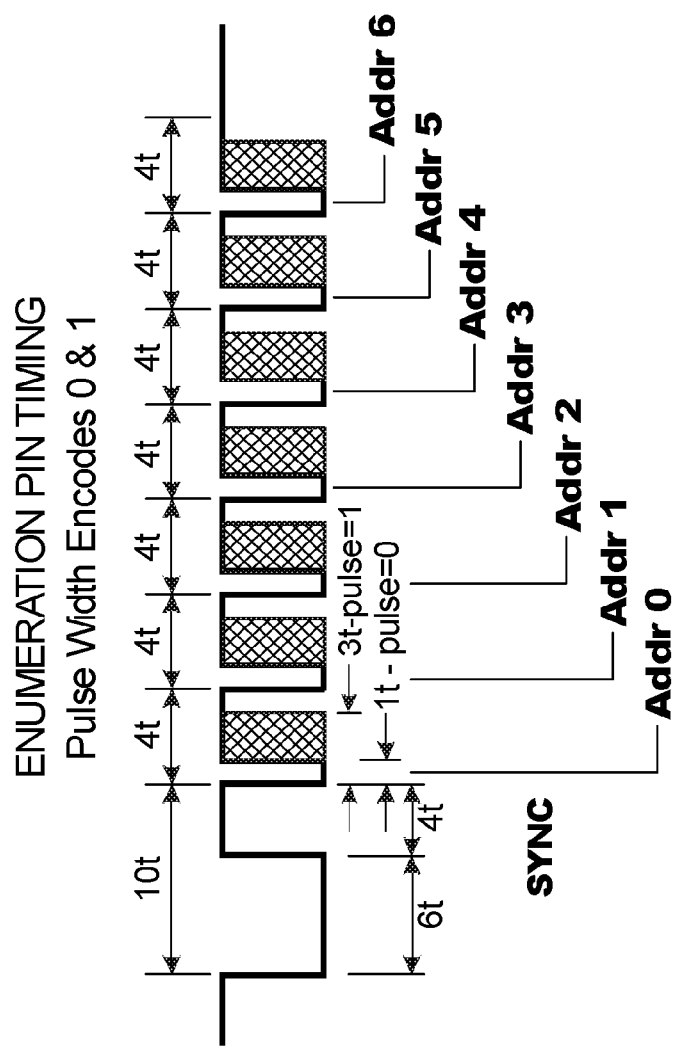
FIG. 29 is an illustration of one embodiment of the module enumeration pin timing.
Figure 30:
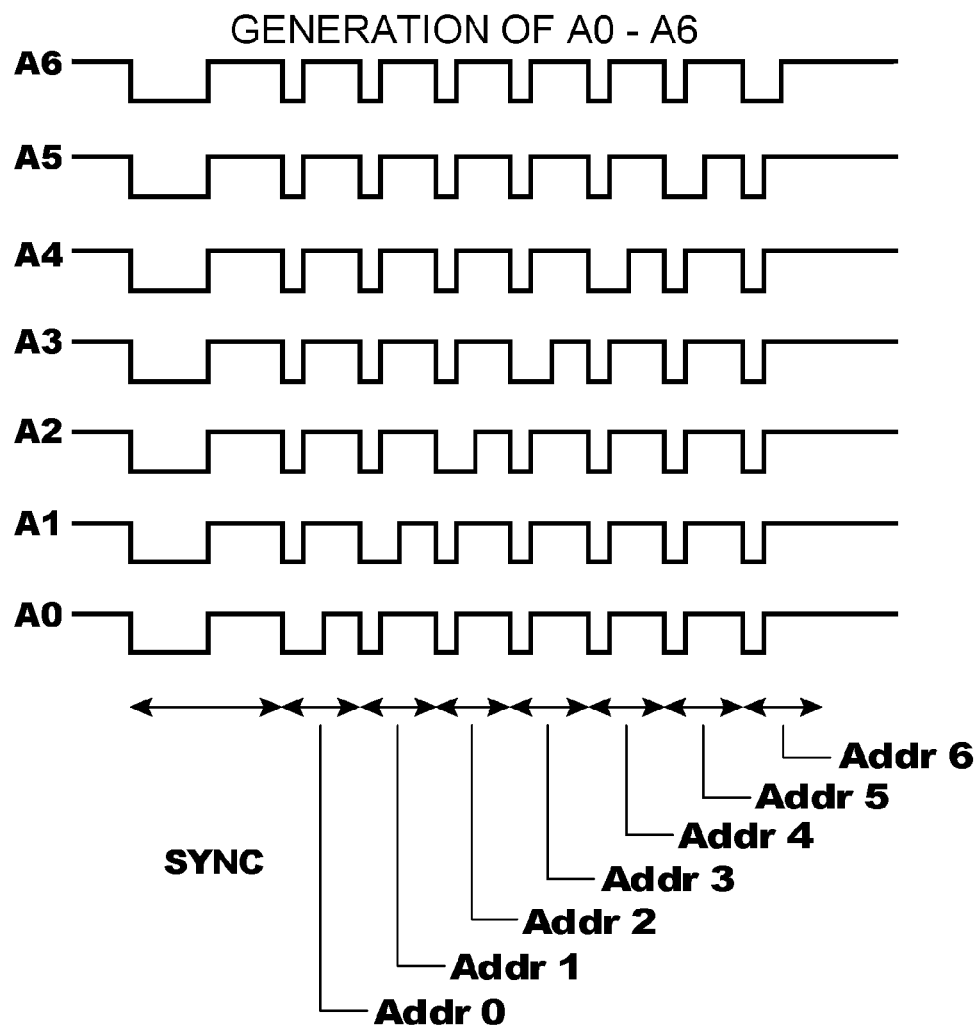
FIG. 30 is an illustration of generation of A0-A6 by a microcontroller in accordance with one embodiment of the invention.
Figure 31:
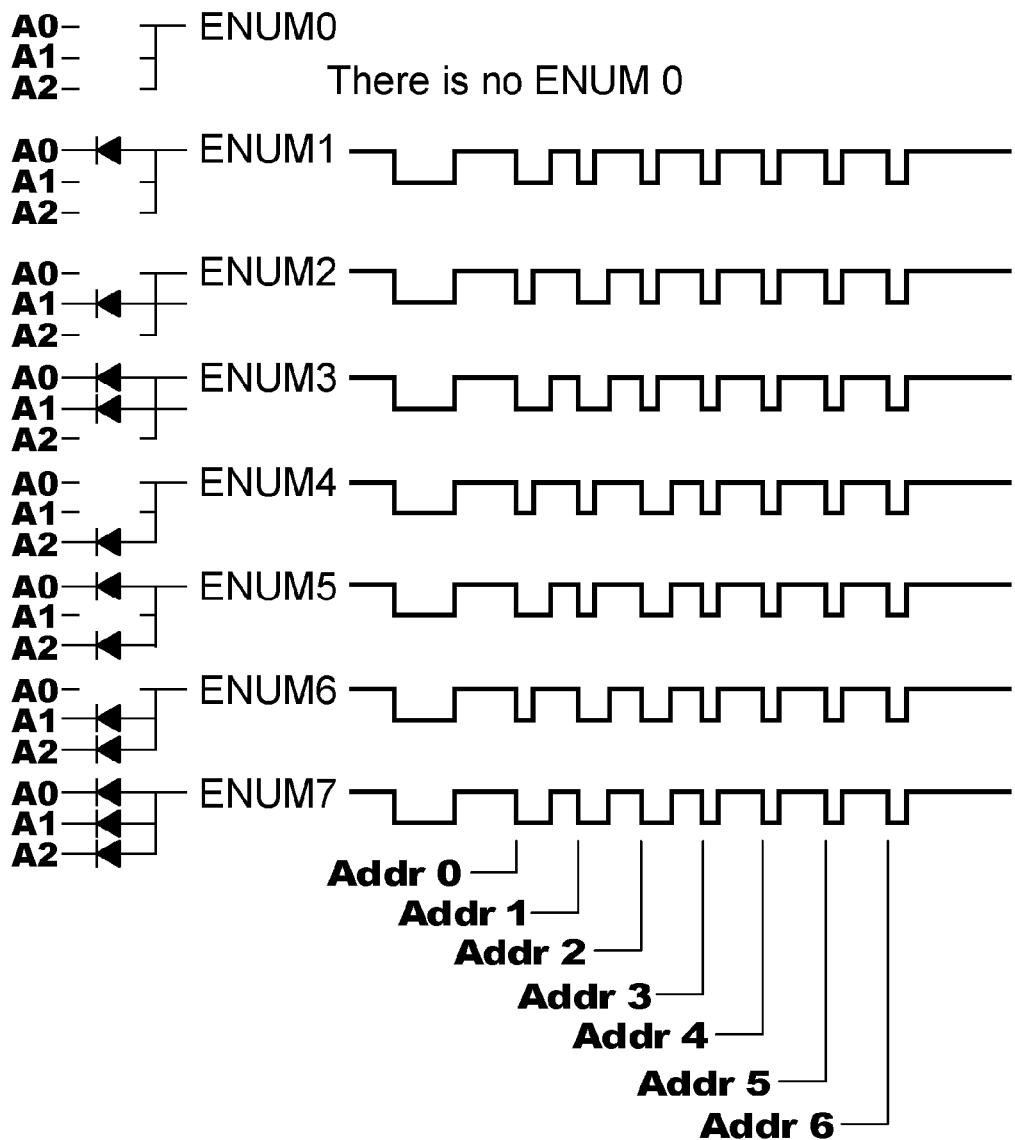
FIG. 31 is an illustration of enumeration pins—diode arrangement in accordance with one embodiment of the invention.

As described above, some embodiments provide for the modules 65 to enumerate. One embodiment for a module to determine its position within a plurality of expansion module mounting locations 45b is to have pulse code modulated (PCM) coded pulses sent to each connector 47. This ensures a robust digital signal for the expansion modules to use in determining which mounting location they are attached to and requires only a single signal pin at the module connector 57. The PCM pattern delivered is unique for each connector 47. The expansion module 65 sees this PCM pattern and determines which mounting location it is attached to since it knows what PCM coded signals match with which mounting location 45b. FIGS. 29-31 show the details of the PCM signal sent to the expansion modules 65. The PCM signal 85 has a frame SYNC marker to allow the module 65 to know that a PCM stream is about to arrive. In this embodiment, the SYNC marker consists of a pulsed duty cycle of 60% low ("6t" in FIG. 29) followed by a 40% high ("4t" in FIG. 29). The module microcontroller 66a can either use an interrupt to detect the falling edge of the SYNC marker, or use rapid polling to detect it. Each data bit in the PCM signal 85 is then sent using a duty cycle of 25% low followed by 75% high to represent a logic '0' or a duty cycle of 75% low followed by 25% high to represent a logic '1'. A total of 7 bits are sent allowing for a total of 2 to the power of 7=128 modules 65. This PCM technique requires only one data line versus the normal seven data lines required to represent 128 unique module addresses. Anyone skilled in the art will easily realize that changing the number of bits, the duty cycle of either the bits or SYNC marker, using an alternate style of SYNC marker, or eliminating the SYNC marker altogether, are obvious alternate embodiments. One embodiment of the technique for generating these PCM signals is using a digital device, such as a microcontroller (e.g., microcontroller 32) or other logic device that will generate a series of pulse streams as shown in FIG. 30. At each module connector 47, a combination of low-cost diodes, as shown in FIG. 31, is then used to mix these pulse streams to create a unique PCM slot identifier for each module. The diode arrangement technique is cost-effective when there are a large number of module mounting locations (e.g., more than four in the housing 20 or provided through expansion housings(s) 80) as it requires less pins from the pulse stream generator than the number of slots. If the digital device generating the PCM codes has sufficient pins, this device could directly generate the signal waveforms as shown in FIG. 31, eliminating the diodes. Other obvious embodiments, to anyone skilled in the art, will be to use a different form of serial data transmission other than PCM. The advantage of this embodiment is the use of a unique digitally encoded identifier signal for each module 65 consisting of fewer signal lines per module connector 47 than would normally be required to represent the total number of module connectors in a modular irrigation controller.

In another preferred embodiment for the expansion module to determine its location to report back the main microcontroller 32, each module mounting location 45b is identified by the combination of two input signals. One is an analog signal and the other is a frequency signal. The analog signal is used to identify the module mounting location of a single module within a group of expansion modules (GOM) and the frequency signal is used to identify what group of expansion modules such module belongs to, for example, the irrigation controller 10 is considered as the first group of modules (GOM1), whereas groups of expansion modules in additional expansion housing(s) 80 would be considered in another group of expansion modules. For example, the first external expansion housing 80 which is daisy-chained to the irrigation controller 10 is considered the second group of module (GOM2). And if there is another external expansion housing 80 which is coupled to the first external expansion housing, it is considered to be the third group of module (GOM3), and so on. When used in combination, the analog and frequency signals give a unique identifying address to each module in the system. The analog signal is a voltage divider network may be formed in the backplane circuitry 46 and is formed by 1% resistors that are connected in series. Each module mounting location 45b will be assigned to a pre-determined voltage signal which is between the logic ground and VCC. (For example: In this case, there are four different voltages for four different module mounting locations 45b. Module mounting location 1 will be assigned to 0.5V, module mounting location 2 will be assigned to 1V, module mounting location 3 will be assigned to 1.5V, and module mounting location 4 will be assigned to 2V). This same voltage divider network will also be applied to the backplane circuitry of any external expansion housing 80. In order to distinguish between groups of modules (which expansion housing), the frequency signal is initially generated by the main microcontroller 32 of the irrigation controller 10. This signal will be divided by 2n (n=1, 2, ... ) by a frequency divider circuit in the external expansion housing 80 that is daisy-chained to the irrigation controller 10. It will continuously be divided by another 2n by a subsequent frequency divider circuit in the second external expansion housing 80 if connected. In one embodiment, the frequency divider circuit is a simple flip-flop or frequency counter device that will be embedded in the external expansion housing 80. In operation, the expansion modules 65 store a table of what voltages and frequencies corresponds to what module mounting location of what housing (either the main controller housing 20 or an expansion housing 80).

A further preferred embodiment for the expansion module to determine its location to report back the main microcontroller 32 uses a low cost module microcontroller, a resistor and a capacitor to physically locate the expansion module to its physical module mounting location. In operation, each connector 47 has a single dedicated pin (e.g., ENUM-RCX) that has a single dedicated resistor (e.g., see resistor 86 in FIG. 16) connected to ground or circuit reference. The value of these resistors 86 is different on the backplane circuitry 46 for each module mounting location 45b. Typically, there might be from four to twelve module mounting locations in an enclosure (although only 4 are illustrated in FIGS. 3-6). However, this technique is not limited to that range. The resistor value might be assigned as powers of two, such as 1,000 Ohms, 2,000 Ohms, 4,000 Ohms, etc. or some other range and step size in value. On the circuitry 66 of the expansion module 65, there is a single capacitor (see capacitor 87 of FIG. 14) connected to the same corresponding pin (e.g., ENUM-RC) and this capacitor 87 is connected to a reference voltage, such as supply voltage, circuit reference or ground, or some other voltage. The junction of the capacitor 87 and the resistor 86 is also connected to the input pin (e.g., AIN0 of FIG. 14) of the module microcontroller 66a. When the expansion module is installed into a module mounting location 45b, a circuit is closed including the resistor 86 which charges the capacitor 87 to some voltage. This could be performed by configuring this processor pin as an output pin and driving it to the processor supply voltage. Upon charging the capacitor, the module microcontroller then configures the pin to be an input or sensing pin and allows the capacitor 87 to discharge through the resistor 86 that is located on the backplane circuitry 46 and then measure the time it takes to discharge the capacitor 87. The capacitor values are the same on all plug-in modules. Therefore, since the resistor values are different depending on which mounting location it is coupled to, the time constant is different for every mounting location 45b because the resistor located on the backplane circuitry 46 forms a resistive-capacitive (RC) time constant with the module capacitor 87. The microcontroller measures the amount of time required to discharge this RC circuit, and based on the values measured compared to a stored table of known values corresponding to each mounting location 46b, determines which module mounting location 45b that expansion module 65 has been installed into. This measurement could be made by a general purpose timer/counter, or program cycle-counter in the software of the microcontroller, and could use an analog comparator input such as is found on many microcontrollers to increase the accuracy of the measurement. The module mounting location, once detected, is reported by the expansion module 65 to the main microcontroller 32. As a result, the user can see and know which station numbers, valves or other devices are associated with the expansion module. In alternative embodiments, rather than measuring the time to discharge, the time to charge is instead measured and will achieve the same result.

In preferred embodiments, since the main microcontroller 32 has an open architecture adapted to work with and share data with expansion modules 65, the main microcontroller 32 can make sure the expansion module 65 or the external expansion housing 80 to which it is communicating is "legitimate". Before establishing a normal communication activity, the main microcontroller 32 and the module microcontroller 66a conduct an authentication scheme. In one embodiment, this is accomplished by exchanging challenge codes and response codes. For example, as described above with reference to FIG. 28, this "mutual authentication" scheme can be initiated by either the main microcontroller 32 or the expansion module microcontroller 66a. In the preferred embodiment, the main microcontroller 32 sends a random value (challenge) to the module microcontroller 66a. The module microcontroller 66a, then processes this value by passing it through its secret authentication algorithm. The resulting value (response) is sent back to the main microcontroller 32. The main microcontroller 32 processes the challenge value through the identical secret authentication algorithm. The response value coming from the module microcontroller 66a is compared to the value expected by the main microcontroller 32. If these values match, the module is recognized to be "legitimate" by the microcontroller 32 and the irrigation controller 10 resumes its normal operation. If the values do not match, the main microcontroller 32 displays a "rogue device" alert on LCD 24.

Historically, dealing with a large number of heavy gauge wires extending from the irrigation controller to each station on the site has been an issue of intense labor, rising cost and wire mapping complexity especially in large sites such as golf courses and cemeteries. In one embodiment, this problem is solved by introducing a special type of expansion output module, namely a 'decoder module', plugged into an expansion module mounting location 45b of the irrigation controller 10 which will require just a single wire pair to connect to plurality of decoder enabled station valves on the site. This greatly minimizes the wiring requirements by having just a single pair of wires be connected to the controller. Stand-alone specialty controllers that work with decoder valves exist in the irrigation industry. However, one embodiment of the invention provides this decoder functionality in an expansion module to a modular controller that can also operate with other types of regular station expansion modules 65, input expansion modules 65a, and smart expansion modules 65b, 65c, 65d, 65e, 65f, 65g that co-exist with the decoder type outputs. In addition, the use of smart expansion modules in combination with a decoder output module allows the smart expansion modules 65b and 65c to control the decoder outputs of a decoder module in a powerful manner not possible with any other controllers in the industry. The components of the decoder module are similar to the components found in FIG. 18; however, they may not include any inputs 67. The decoder module includes at least one output signal 83 (a decoder output) that sends signaling to actuate selectable ones of a plurality of decoder-based valves each coupled to the single wire pair coupled to the output signal 83. Additionally, the decoder module may have multiple decoder outputs to independently control multiple sets of decoder-based irrigation valves. In accordance with the execution of an irrigation program, the microcontroller indicates to the microcontroller 66a of the decoder module which irrigation valves are to be actuated, and the microcontroller 66a of the decoder module sends the appropriate signaling to its output terminals to address and actuate the desired valve(s).

Each expansion module 65 (and likewise modules 65a, 65b, 65c, 65d, 65e, 65f) contains an independent microcontroller 66a and communicates with the main irrigation microcontroller 32 to report its capability to the controller 10. In the presently preferred embodiment, the microcontroller 66a of the expansion module 65 is an ATMEGA8L-8AC microcontroller. The controller 10 then adjusts its operation accordingly based on the module capability. For example, if a new expansion module is detected with a 4-station capacity, then the controller 10 will add only an increment of 4 stations to the 'total available' in the programming menus. This flexibility of employing a plurality of expansion modules 65 provides operational and economic advantages to the contractor who no longer has to stock, install and learn to operate completely different controllers for different types of applications. By allowing different expansion module types to be mixed on a single controller, modular controllers in accordance with several embodiments of the invention provide the contractor with virtually infinite flexibility to tailor controller outputs to the unique set of needs of each individual site. For example, a site may have two or three valve locations that are difficult to access. The contractor could add wireless output module(s) to the controller and install wireless valves in these locations, while using lower cost AC output modules and standard solenoids for the other valves in the system.

It is common for prior art irrigation controllers to detect a short circuit caused by a mis-wired or a malfunctioning valve and suspend the watering. Those controllers typically assigned the responsibility of reading the short condition and alleviating the problem to the main microcontroller which is typically housed within the control panel. However, this responsibility of the main microcontroller introduces additional burden on the communication path, causing a delay in corrective action before undesirable effects take place. It is an object of another embodiment of the invention to move the short circuit and over-current detection (mis-wired or malfunctioning valve might have short circuit preventing the normal operation) out of the control panel 30 and into the expansion modules 65, thus bypassing the bottleneck of the bus 39 and the main circuitry 31 (shown in FIG. 15), and having the ability to detect and take action within milliseconds. This is made possible due to the fact that the module microcontroller 66a has enough processing power and it is connected directly with the valve actuator (not shown). The module 65 takes immediate action, and then at its leisure, notifies the main circuitry 31. The main circuitry 31 does its traditional job of sorting out the error conditions and displaying the status to the user. When the module 65 detects this short or over-current condition, it turns the valve off before any damage is done. The user will also be notified of the problem. In one embodiment, the short circuit and over current detection is implemented in the form of a current sensor circuit in the modules 65. For example, the current sensor circuit 75 (illustrated in FIG. 14) detects changes in the current from the AC-FUSE-S signal from the backplane circuitry and provides inputs to the microcontroller 66a so that the microcontroller 66a in the expansion module 65 can determine if there is a short circuit or over current condition. Again, since this determination occurs within the expansion module, irrigation may be immediately stopped in the event of a short circuit or over current condition without having to wait for the control panel 30 to make such termination.

As best seen in embodiment illustrated in FIGS. 7 and 8, the terminals 58 of the base module 55 and the expansion modules 65 comprise snap-in wire terminals that are known in the art of electrical connection. These terminals 58 provide the necessary connection points 58a to the valve outputs. In preferred form, there are two connection points 58a for each terminal 58 on expansion modules 65 and one connection point 58a for each terminal 58 on base module 55 with wire sizes up to 12 AWG. For each connection point 58a (or pair of connection points 58a) a wire release feature 58*b* is provided which when pushed, allows the wires to be released from the corresponding connection point 58*a*.

Seen clearly in FIG. 4, the module mounting locations 45*a* and 45*b* accommodate docking and the electrical coupling of the modules 55 and 65 to the backplane 45. The base module mounting location 45*a* is reserved for the base module 55 and the expansion module mounting locations 45*b* are for the expansion modules 65. The backplane connectors 44 and 47 include pins that carry power and data signals. In one embodiment, these connectors 44 are reverse polarized from contacts 47 through the physical contact housing in order to prevent module 55 and modules 65 from being interchangeable. In preferred form, the connection of these pins from the modules 65 to the backplane 45 is designed to function in accordance with the industry standard term "hotswappable". In addition to this 'hotswapping' feature, any expansion module 65 can be installed in any receptacle, allowing maximum flexibility for the user. This provided in part by the common bus structure (all expansion modules communicate using the same bus structure) and communication protocol as well as that the microcontroller 32 is configured to not expect modules 65 to be inserted in any particular mounting location or order. This is in contrast to known modular controllers in which the data line structure through the modules requires that modules be inserted in a specific order. Additionally, this is further allowed in that the main microcontroller 32 is configured to expect that a new module can appear and disappear at any time. For example, the main microcontroller automatically receives an announce message when a new module appears and constantly checks to verify that attached modules remain attached. Furthermore, the communication protocol can be asynchronous so that the main microcontroller 32 and the modules 65 can asynchronously communicate. As a result, several embodiments of the invention allow the user to remove or install modules without the need to power down and restart the controller 10. This feature is novel in the irrigation industry as other modular irrigation controllers must first have their power removed before any module can be removed or inserted. To accomplish "hotswapping", the contacts in the connector 47 are arranged in a manner whereby the power signals establish a circuit connection at either end of the row of contact pins in FIG. 21 (e.g., AC-COM and AC-FUSE are located at either end of the pin configuration) at the same time or before the connection of the data lines (e.g., SMB-DO and SMB-DI) in the center of the connector 47, which are contacted into the mating connector 57 of module 65. This is done to prevent the possible non-orthogonal insertion of the modules from damaging module circuitry. In this manner, the module's microcontroller power will have contacted before any voltage appears on the data lines. This "hotswapping" feature also allows the module to detect and indicate to the user that the module is not fully engaged mechanically. This condition could be caused by the user not fully applying pressure to the module to engage latch mechanism 59*c*, or by some other reason which prevented the module from fully engaging. The module, having gotten power from one set of pins at either end of the contacts 47, would be able to detect if the data pins in the center of receptacle were fully engaged and able to communicate with control panel 30. In the case where pin engagement was not made, the module 65 would communicate the problem through the use of the status indicator 56*a*, (e.g., an LED) so that the user could then reseat the module 65 to provide for full insertion.

The prior art irrigation controllers have certain disadvantages in regards to the placement of the modules. One such controller by a competitor requires modules to be installed in a specific order. In contrast, modular controllers in accordance with several embodiments of the invention eliminate the need to move an existing module, renumber irrigation zones or disconnect and reconnect valve wires when adding a module to the irrigation controller 10. It is a further object of several embodiments of the invention to allow expansion modules 65 of any output station size capacity to be placed on any receptacle 45*b* in any order. This is allowed in many embodiments because the modules 65 report their station output capability to the main microcontroller 32, which is configured to accept any number of station outputs, including decoder station outputs. The microcontroller 32 is also configured not to be confused if there is a gap in sequential modules as installed.

A latching mechanism between the modules 55 or 65 and the backplane cover 43 facilitates the secure, firm and reliable connection of modules 55 or 65 to the backplane circuitry 46. The module 55 or 65 is placed perpendicularly onto the module mounting location 45*a* or 45*b*, seen in FIG. 4, on the backplane cover 43. To install the module, the four guideposts 59*a* in the form of tapered posts on the bottom of the module 55 or 65 are matched into the guide holes 59*b* located on the backplane cover 43 and the module is pressed into the module mounting location 45*a*/45*b* (FIG. 4). The mating guideposts 59*a* provide alignment to prevent improper insertion of the modules 55 or 65 as well as provide initial alignment for the interconnect between the module 55 or 65 and the backplane circuitry 46 and also allows for "flat on table" storage of modules, preventing damage to the connectors 44 and 47. Releasing the module latching buttons 59 accessible through an opening in the side of the module allows the button latch mechanism 59*c* (also referred to as a latch having a ledge formed at one end) to expand underneath the backplane cover 43 through the holes 59*d* causing the module 55 or 65 to be held firmly in place. A "snap" or "click" sound is heard from the module latching buttons 59 when the module 55/65 is fully installed. The module 55 or 65 is released by pressing the two module latching buttons 59 on opposing sides of the module 55 or 65 and pulling the module perpendicularly away from the backplane cover 43.

Each module 55 and 65 has a status indicator 56*a*, e.g., a light emitting diode (LED), that illuminates to indicate correct installation of the module 55 or 65, or that the module 55 or 65 is active during valve or other operation. In some embodiments, the status indicator 56*a* is a sound emitting device.

To facilitate power consumption reduction, the microcontroller in modules 65 can go to sleep and be awakened by a command or signal from the control panel microcontroller 32. In some embodiments, the controller 10 also incorporates a power supply feature that enhances the component reliability while providing higher power output through a new method based on a modified form of pass regulator topology. The pass regulator transistor, instead of always being on, is switched to on and off modes using available line frequency. The advantage yielded with this approach is the increased system efficiency at no additional cost.

The backplane circuitry 46 holds the remote connector 63 and the ground terminal blocks 60*b*, the power terminals blocks 60*a*, base module connector 44 for the base module mounting location 45*a* and the connectors 47 for four additional expansion module mounting locations for expansion modules 65. In the illustrated embodiment, no station outputs are found on the backplane circuitry 46, although it is understood that in some embodiments, station outputs may be implemented in the backplane circuitry 46.

In one embodiment, the remote connector 63, indicated in FIG. 4, provides the means to connect a wireless receiver to the irrigation controller 10. A person equipped with the wireless control has now the means to manually activate irrigation valves, modify the irrigation schedule or the behavior of any additional tasks that the irrigation controller 10 is capable of performing. The remote connection ports found on prior art irrigation controllers are typically placed on the back of the front panel. This type of installation requires cumbersome wiring and wire routing, often times causing the tangling of wires behind the front panel hinge, making the unit difficult to close. The preferred embodiment keeps the remote connection port 63 and the wire (not shown) on the backplane 45 contained within the rear housing 40 only, eliminating any complicated wiring and wire routing.

Figure 27:
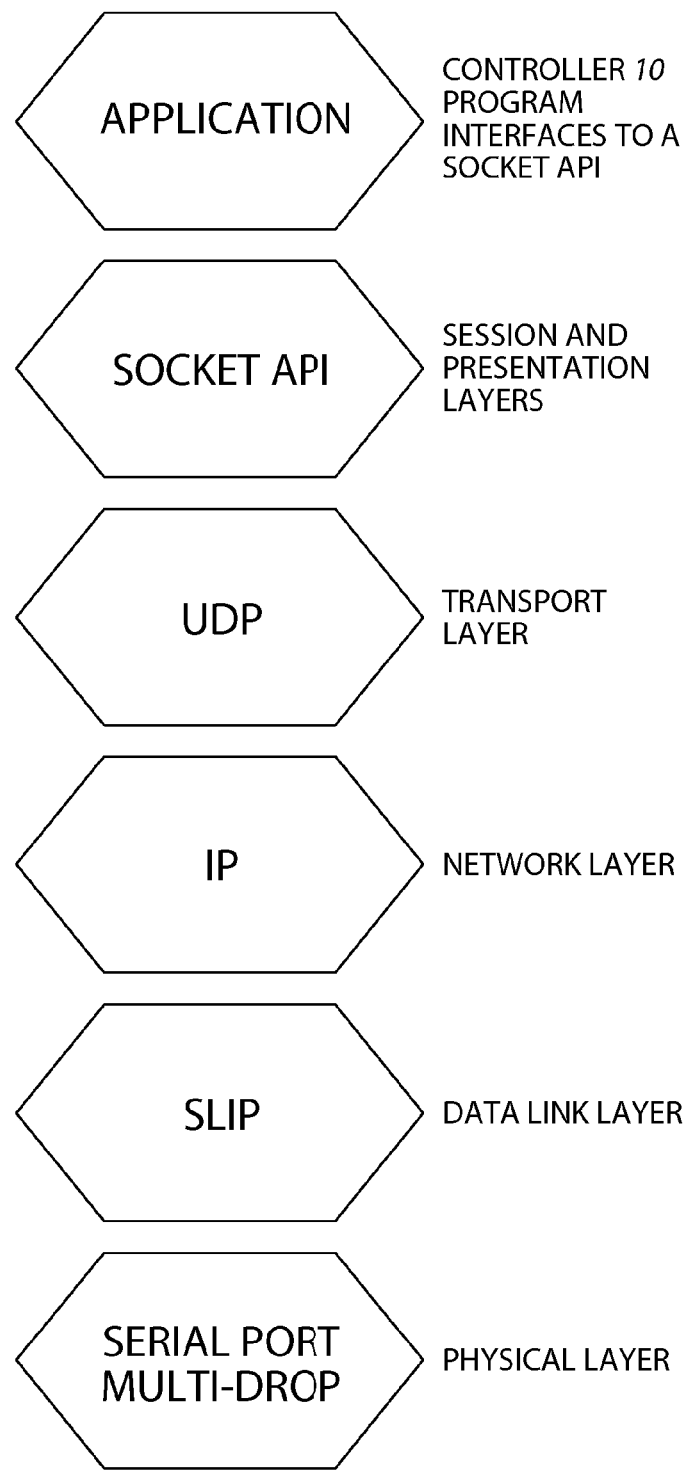
FIG. 27 is an illustration of the socket application programming interface in accordance with one embodiment of the invention.

The prior art irrigation controllers have invented ad hoc or proprietary bus methodologies to solve communication problems. However, the software and firmware used for communications in such prior controllers is often not extensively tested, documented, or reliable, and is often inflexible thus offering few expandability options. Modular controllers in accordance with several embodiments of the invention incorporate, in a unique manner, the time-proven robust Transmission Control Protocol/Internet Protocol (TCP/IP) computer communication protocol for use on the controller's internal communication bus 39. The use of such a powerful protocol in a modular irrigation controller has never been undertaken in the industry. This preferred method, using TCP/IP, allows for superior flexibility for internal communications between the main microcontroller 32 and other microcontrollers 66a located in the irrigation controller 10. It also offers easier and greater communication with external control networks and larger networks. As illustrated in FIG. 27, a Socket Application Programming Interface allows the main program of the main microcontroller 32, which operates the irrigation controller, to pass data from the main microprocessor 32 to expansion modules 65 via a User Datagram Protocol (UDP). The physical layer of this TCP/IP-driven communication protocol is a 9-bit serial port and takes advantage of the Serial Line Internet Protocol (SLIP). While the preferred embodiment utilizes the aforementioned physical layer means, the networking software is not hardware specific and can be adapted to many other physical layer methods such as RS232, RS485, or a parallel bus to move data.

One embodiment incorporates a very compact and efficient TCP/IP protocol stack so that it may fit in the small memory space of the module's microcontroller 66a thus keeping the cost of the module's microcontroller 66a as low as possible to create a cost-effective product. Traditionally, the use of a TCP/IP protocol would not be considered viable in a product of this nature. To keep the memory requirements as low as possible, the invention utilizes the UDP flavor of the TCP/IP protocol. The use of TCP/IP protocols within the modular controller allows utilizing the powerful addressing and routing features inherent in the TCP/IP protocol. The control panel 30 and each expansion module 65 are treated as separate internal network devices, each with a uniquely assigned IP address (Internet Protocol address).

To communicate within a larger network of a centralized system, this embodiment has an external communication interface 34a. In preferred form, this communication interface also uses a TCP/IP protocol to communicate with the main microprocessor 32. Thus, the controller 10 has the ability to be connected to an external network and assigned a unique IP address (dynamic or static) and be fully controlled over the Internet or other network. By using the TCP/IP protocol, each expansion module 65 (including input modules 65a, smart expansion modules 65a, 65b, 65c, 65d, 65e, 65f) can communicate with either the main microprocessor 32 or an external computer located on a private or public network. In return, the external computer can interact directly with every expansion module 65 as the main microprocessor 32 will act as a TCP/IP router directing the data to the correct module. In the preferred embodiment, the external communication interface 34a incorporates a phone line modem using Point-to-Point Protocol (PPP). It will be obvious to those skilled in the art, that the communication interface could alternately be an Ethernet interface, wireless interface, etc. Optionally, Internet email may be used to send messages back to the main microcontroller. In addition, a Hypertext Markup Language (HTML) web server can be optionally installed to make communications easier. This way, the irrigation controller can be updated with the latest input data, such as weather and environmental conditions, by email or by direct sending of UDP packets to the controller.

The following description provides more details regarding many of the pinout configurations of various electrical components of the modular controller 10 in accordance with several embodiments of the invention. Each pinout configuration comprises a plurality of pins of an electrical connector interface designed to couple to a corresponding interface having the same pin assignments. In one embodiment, the pinout assignments for the ribbon cable 49 interface between the control panel 30 and the backplane circuitry 36 as illustrated in FIG. 12 is as follows:

| | |
|---|---|
| NOT CONNECTED | there is no electrical connection to this pin |
| ENUM-FREQ | a frequency timing signal used by the enumeration process in the expansion modules to determine in which mounting location the expansion module is located |
| 12V-UNREG-RTN | current return connection for 12 volt unregulated power source for the remote control |
| 12V-UNREG-RTN | current return connection for 12 volt unregulated power source for the remote control |
| REMOTE-DO | data output signal for remote control |
| MVn | output for primary master valve solenoid |
| BM-LEDn-OUT | base module LED driver signal |
| BM-STATUS | installed status indicator for base module |
| NOT CONNECTED | there is no electrical connection to this pin |
| AC-FUSE | 24 vac power source, fuse protected |
| AC-FUSE-S | 24 vac power source with current sensing |
| AC-COM | 24 vac power common line |
| NOT CONNECTED | there is no electrical connection to this pin |
| SMB-DO | data output for serial module bus |
| SMB-DI | data input for serial module bus |
| REMOTE-DI | data input signal for remote control |
| I-SENSE-OUT | current sensing signal |
| MV2n | output for secondary master valve solenoid |
| SENSOR-FTR | filtered input for external sensor #1 |
| SENSOR2-FTR | filtered input for external sensor #2 |
| NOT CONNECTED | there is no electrical connection to this pin |
| AC-FUSE | 24 vac power source, fuse protected |
| NOT CONNECTED | there is no electrical connection to this pin |
| AC-COM | 24 vac power common line |

In one embodiment, the pinout assignments 69 for the base module connector interface between the connector 57 of the base module 55 and the connector 44 of the backplane circuitry 36 as illustrated in FIG. 20 is as follows:

| | |
|---|---|
| MVn | output for primary master valve solenoid |
| BM-LEDn | base module LED driver signal |
| BM-STATUS | installed status indicator for base module |
| AC-FUSE | 24 vac power source, fuse protected |
| AC-COM | 24 vac power common line |

-continued

| | |
|---|---|
| MV2n | output for secondary master valve solenoid |
| SENSOR-FTR | filtered input for external sensor #1 |
| SENSOR2-FTR | filtered input for external sensor #2 |
| AC-FUSE-S | 24 vac power source with current sensing |
| AC-COM | 24 vac power common line |

In one embodiment, the pinout assignments 78 for the expansion module connector interface between the connector 57 of the expansion module 65 and the connector 47 of the backplane circuitry 36 as illustrated in FIG. 21 is as follows:

| | |
|---|---|
| AC-COM | 24 vac power common line |
| ENUM-FREQ | a frequency timing signal used by the enumeration process in the expansion module to determine in which mounting location the expansion module is located |
| AC-FUSE-S | 24 vac power source with current sensing |
| SMB-DI | data input for serial module bus |
| AC-FUSE | 24 vac power source, fuse protected |
| AC-FUSE (alternatively, I-SENSE-OUT) | 24 vac power source, fuse protected (alternatively, current sensing signal) |
| SMB-DO | data output for serial module bus |
| AC-FUSE-S | 24 vac power source with current sensing |
| ENUM-RC | a resistor connection from the backplane used by the enumeration process in the expansion module to determine in which mounting location the expansion module is located |
| AC-COM | 24 vac power common line |

In one embodiment, the pinout assignments for the external expansion port 62 connector interface to an expansion housing 80 as illustrated in FIG. 22 is as follows:

| | |
|---|---|
| ENUM-FREQ | a frequency timing signal used by the enumeration process in the expansion module to determine in which mounting location the expansion module is located |
| SMB-DO | data output for serial module bus |
| SMB-DI | data input for serial module bus |
| I-SENSE-OUT | current sensing signal |
| AC-FUSE | 24 vac power source, fuse protected |
| AC-FUSE | 24 vac power source, fuse protected |
| AC-FUSE-S | 24 vac power source with current sensing |
| AC-FUSE-S | 24 vac power source with current sensing |
| AC-COM | 24 vac power common line |
| AC-COM | 24 vac power common line |

In one embodiment, the pinout assignments for the interface to the LCD 24 of the user interface 21 as illustrated in FIG. 25 is as follows:

| | |
|---|---|
| V5 | voltage #5 for the LCD display |
| V4 | voltage #4 for the LCD display |
| V3 | voltage #3 for the LCD display |
| V2 | voltage #2 for the LCD display |
| V1 | voltage #1 for the LCD display |
| C2− | external capacitor connection |
| C2+ | external capacitor connection |
| C1+ | external capacitor connection |
| C1− | external capacitor connection |
| C3+ | external capacitor connection |
| VOUT | voltage for the LCD display |
| VSS | power source for the LCD display |
| VDD | power common for the LCD display |
| D7 | data bit 7 - most significant bit |
| D6 | data bit 6 |
| D5 | data bit 5 |
| D4 | data bit 4 |
| D3 | data bit 3 |
| D2 | data bit 2 |
| D1 | data bit 1 |
| D0 | data bit 0 - least significant bit |
| RDn | read strobe signal |
| WRn | write strobe signal |
| A0 | low order address signal |
| RESn | display reset signal |
| CS1n | chip select, enable signal |
| VSS | power source for the LCD display |
| VDD | power common for the LCD display |

Figure 26:
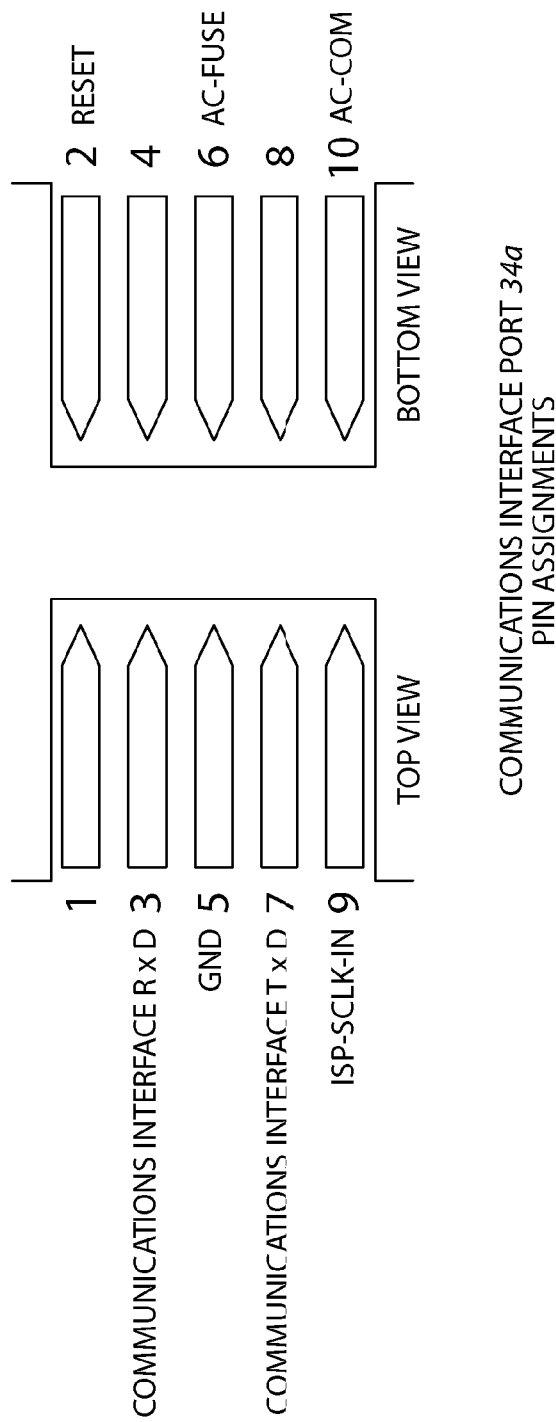
FIG. 26 is an illustration of one embodiment of the pinout assignments for the external communications interface port.

In one embodiment, the pinout assignments for the communications interface port 34*a* as illustrated in FIG. 26 is as follows:

| | |
|---|---|
| 1- | there is no electrical connection to this pin |
| 2-RESET | reset signal to the main processor |
| 3-RxD | communication interface serial data input signal |
| 4- | there is no electrical connection to this pin |
| 5-GND | circuit common for data, clock, and reset signals |
| 6-AC-FUSE | 24 vac power source, fuse protected |
| 7-TxD | communication interface serial data output signal |
| 8- | there is no electrical connection to this pin |
| 9-ISP-CLK-IN | timing clock for programming of processor flash memory |
| 10-AC-COM | 24 vac power common line |

Figure 52:
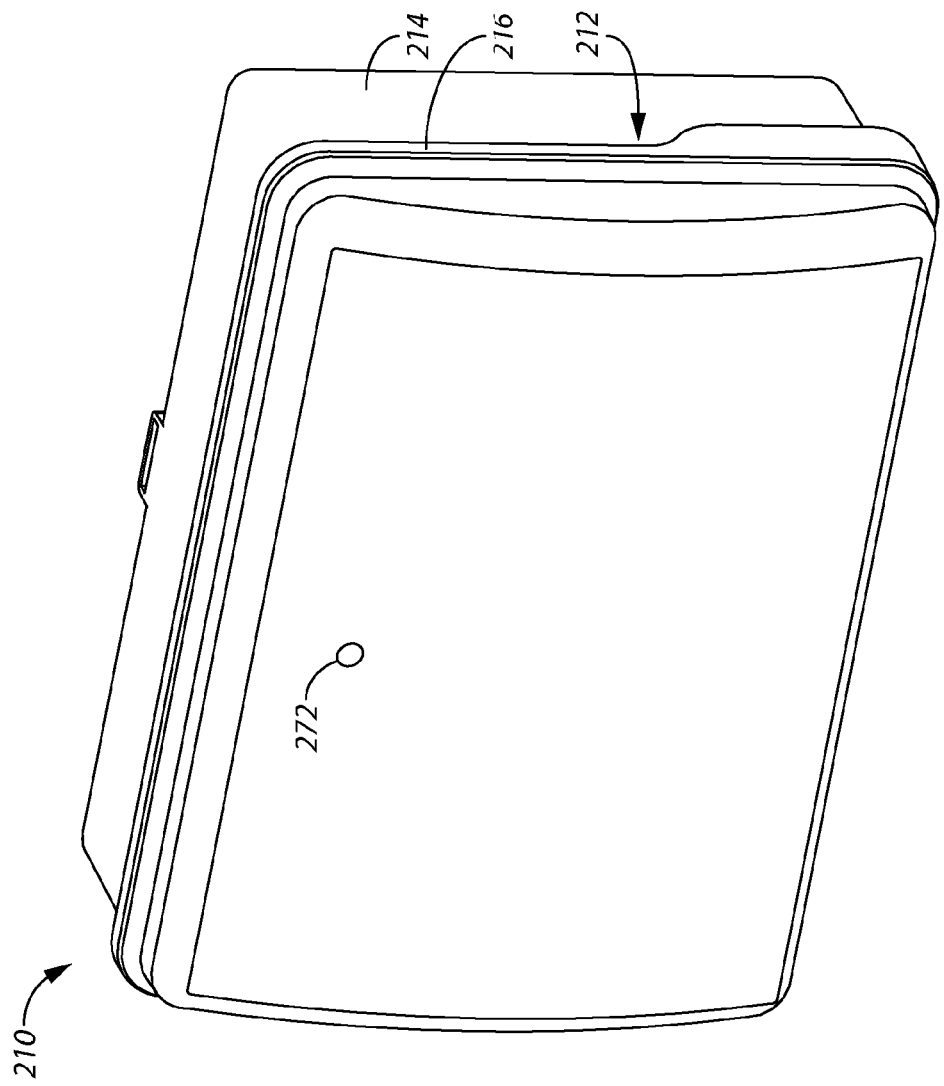
FIG. 52 is a perspective view of an enclosed housing or cabinet within which the new and improved irrigation controller according to another embodiment of the invention is contained.
Figure 53:
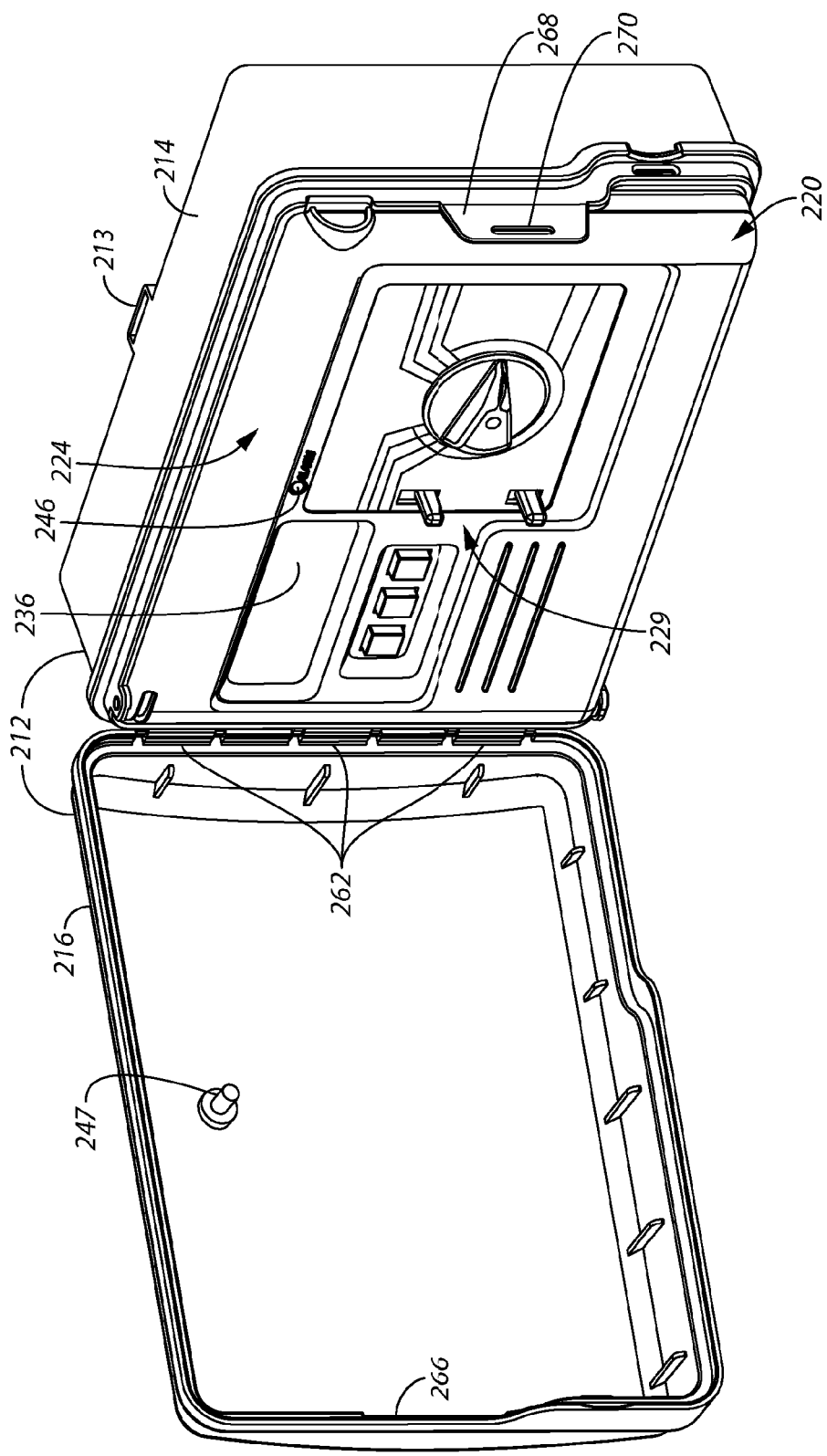
FIG. 53 is a perspective view of the irrigation controller housing of FIG. 52, showing the housing door in an open position to reveal the control panel of the controller base unit.
Figure 54:
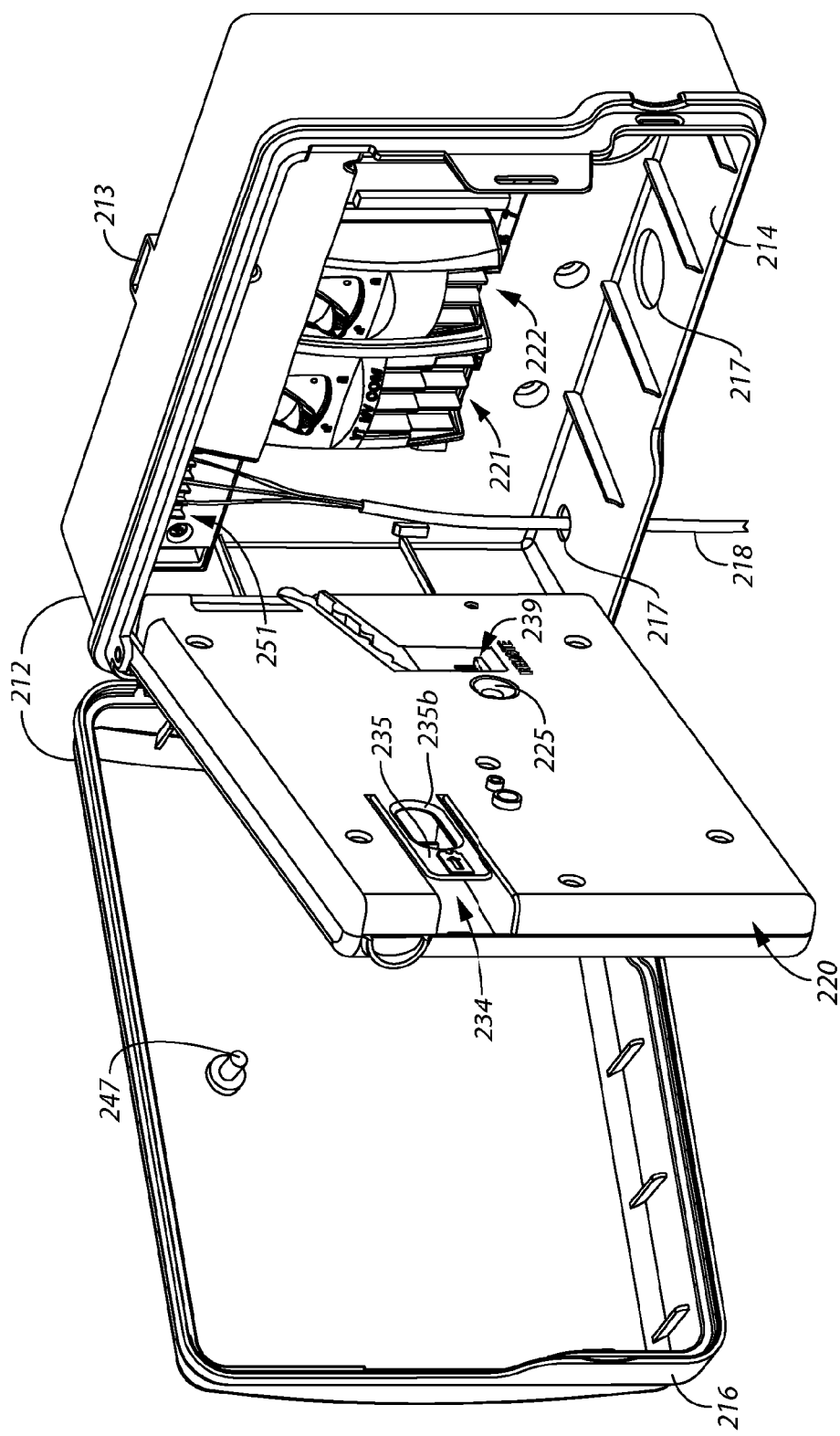
FIG. 54 is a perspective view of the irrigation controller housing of FIG. 52 showing the base unit control panel in an open position and showing a base module and an expansion module mounted within the housing.

Next, while referring to FIGS. 52-69, a modular controller in accordance with several other embodiments of the invention, generally designated at 210, is illustrated in FIG. 52. As shown, the expandable architecture modular irrigation controller 210 of this embodiment is installed in a water-resistant controller housing or cabinet 212 having a generally box-shaped appearance with a front cover door 216 and a rear main cabinet portion 214, the front cover door being attached to the rear cabinet portion by a hinge 262 that permits the front cover door to be opened for access to the inside of the rear cabinet, as best seen in FIG. 53. When the unit is installed on site, typically on a wall or the like through a key hole mount 213, power wires 218 and valve control wires (not shown here) run though wiring access holes 217 in the bottom of the controller housing 212, as seen in FIG. 54. The new and improved irrigation controller 210 having an expandable architecture modular design allows for easy and economical expansion of the controller capabilities not found in other controllers.

The controller housing 212, preferably formed of plastic or other suitable material, is designed to withstand various environmental conditions, and houses a base unit 224, a base module 221, expansion modules 222 and smart modules 226 (also referred to as smart expansion modules). To releasably retain the cabinet door 16 in the closed position, the door edge opposite the hinge 262 includes a laterally inwardly projecting lip 266 that releasably mates with an opening 270 formed in a tab 268 projecting forwardly from the front edge of the rear cabinet portion 214. Upon release of the lip 266 from the opening 270, the cabinet door 216 pivotally swings open about the hinge 262 to reveal a removable and programmable control panel 220 that includes a user interface to enter and maintain an irrigation schedule. The cabinet door 216 contains a window 272 to which is mounted a light pipe 247. The light pipe 247 is positioned on the cabinet door 216 to provide direct viewing of a light emitting diode (led) alarm indicator 246 when the cabinet door 216 is closed.

The base unit 224 carries out basic irrigation functions and also performs other advanced functions, and comprises the control panel 220 that is removably attached to the front of the rear cabinet portion 214, and a back plane circuit board 251 (see FIGS. 54 and 56) permanently housed in the rear cabinet portion and having circuitry for connection to the base module 221, expansion modules 222 and smart modules 226. The control panel 220 is pivotally coupled to the rear cabinet 214 and swings open to provide access to the interior within which various electronic components, including the backplane circuit board 251 are located. Terminal blocks on the back plane circuit board 251, designated 231a-231e in FIG. 57, provide an interface to the power supply line 218, an earth ground line and various sensor input lines (not shown here).

It is an object of one embodiment of the present invention to have an easy and intuitive user interface to enter and modify a plurality of irrigation schedules for an irrigation system. As seen in FIG. 53, the front surface of the control panel 220 includes various operational controls and indicators 229 that assist a user in interfacing with and programming the controller and the irrigation system. In this instance, a liquid crystal display (LCD) 236 provides a visual output of information to the user such as when operating the programming functions, among other tasks. An LED Alarm Indicator 246 seen in FIG. 53 illuminates when a faulty condition is detected, for example, at a station output in a standard expansion module 222, or a programming error in the control panel microcontroller 220c. Illumination of the LCD is visible through the window 272 in the cabinet door 216 when it is closed.

Figure 62:
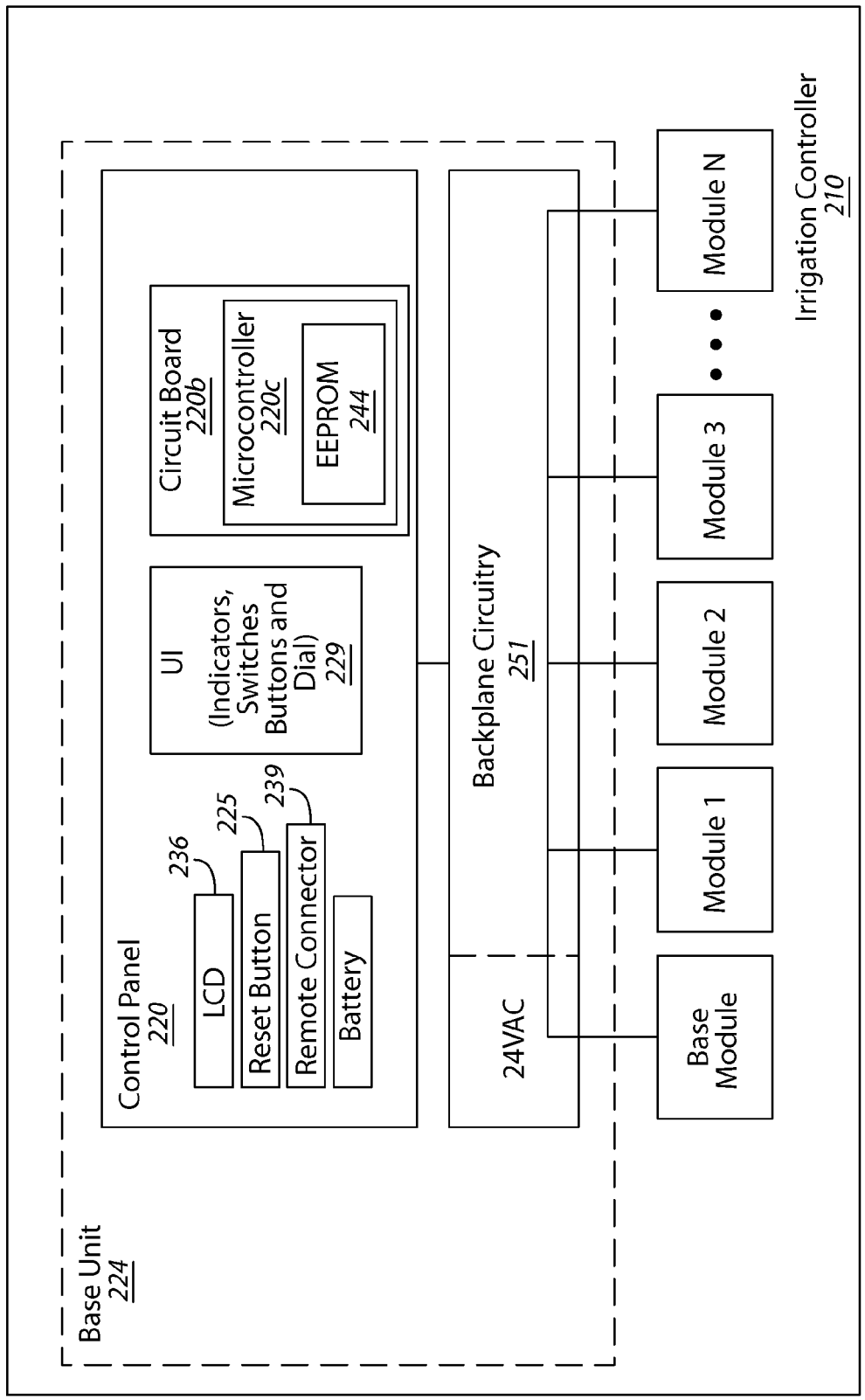
FIG. 62 is a block diagram of the irrigation controller of the invention.
Figure 69:
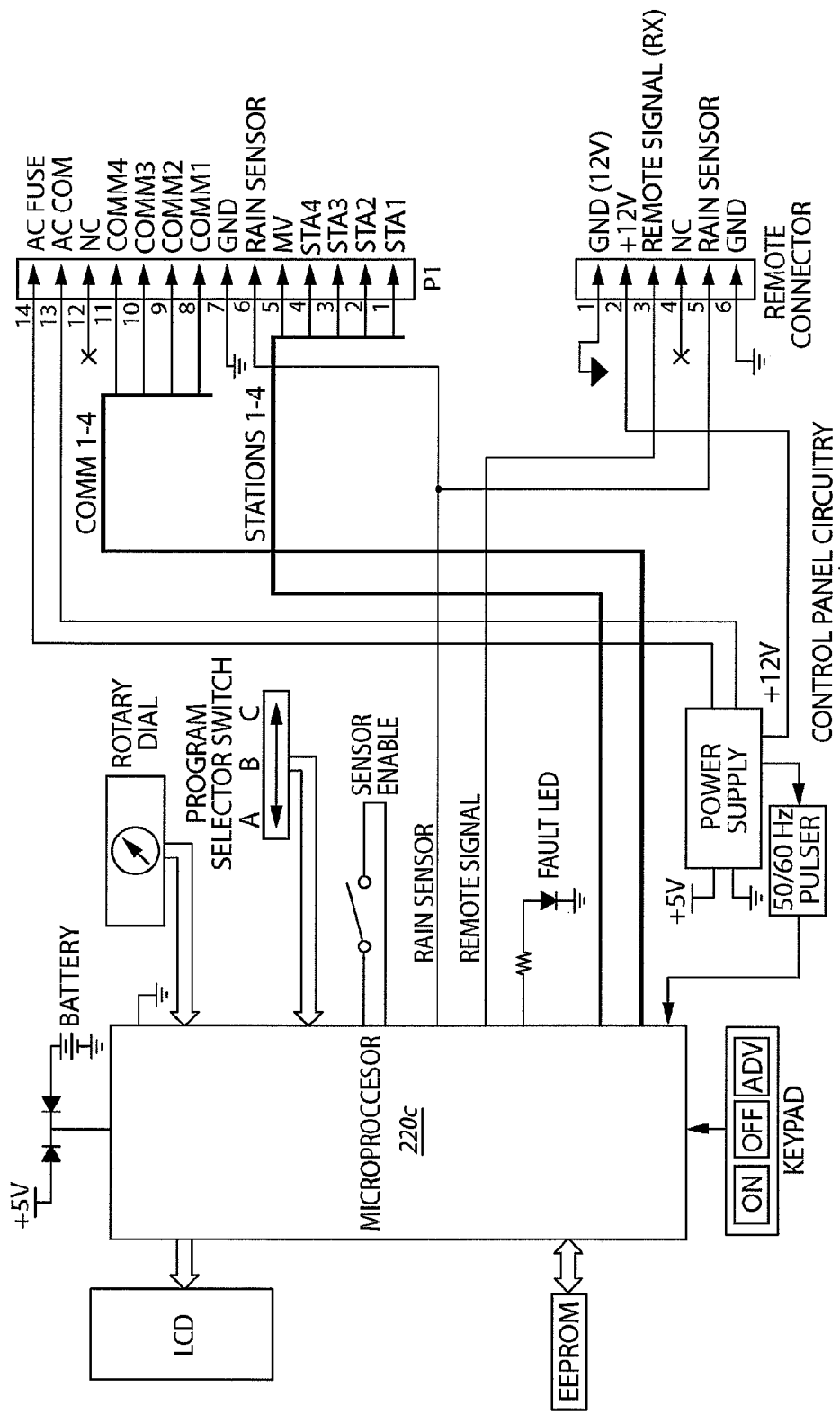
FIG. 69 is a schematic diagram of the control panel circuit.

With reference to FIGS. 62 and 69, the control panel 220 has circuitry 220b (shown in FIG. 69) that includes a control panel microcontroller 220c that communicates with the backplane circuitry 251 to activate the irrigation functions as defined in an irrigation program as well as other functions as may be contained in the smart modules 226. The microcontroller 220c sends commands via the back plane circuitry 251 to the base module 221 and/or the expansion modules 222 to activate irrigation valves according to a pre-programmed schedule or via a manually initiated irrigation cycle. In the presently preferred embodiment, the microcontroller 220c of the control panel circuitry 220b employs a TMP87CM20F microcontroller manufactured by Toshiba, and is powered by a 5 VDC power supply. A non-volatile memory backup (EEPROM) 44 maintains the watering schedule upon line power outages.

Figure 68:
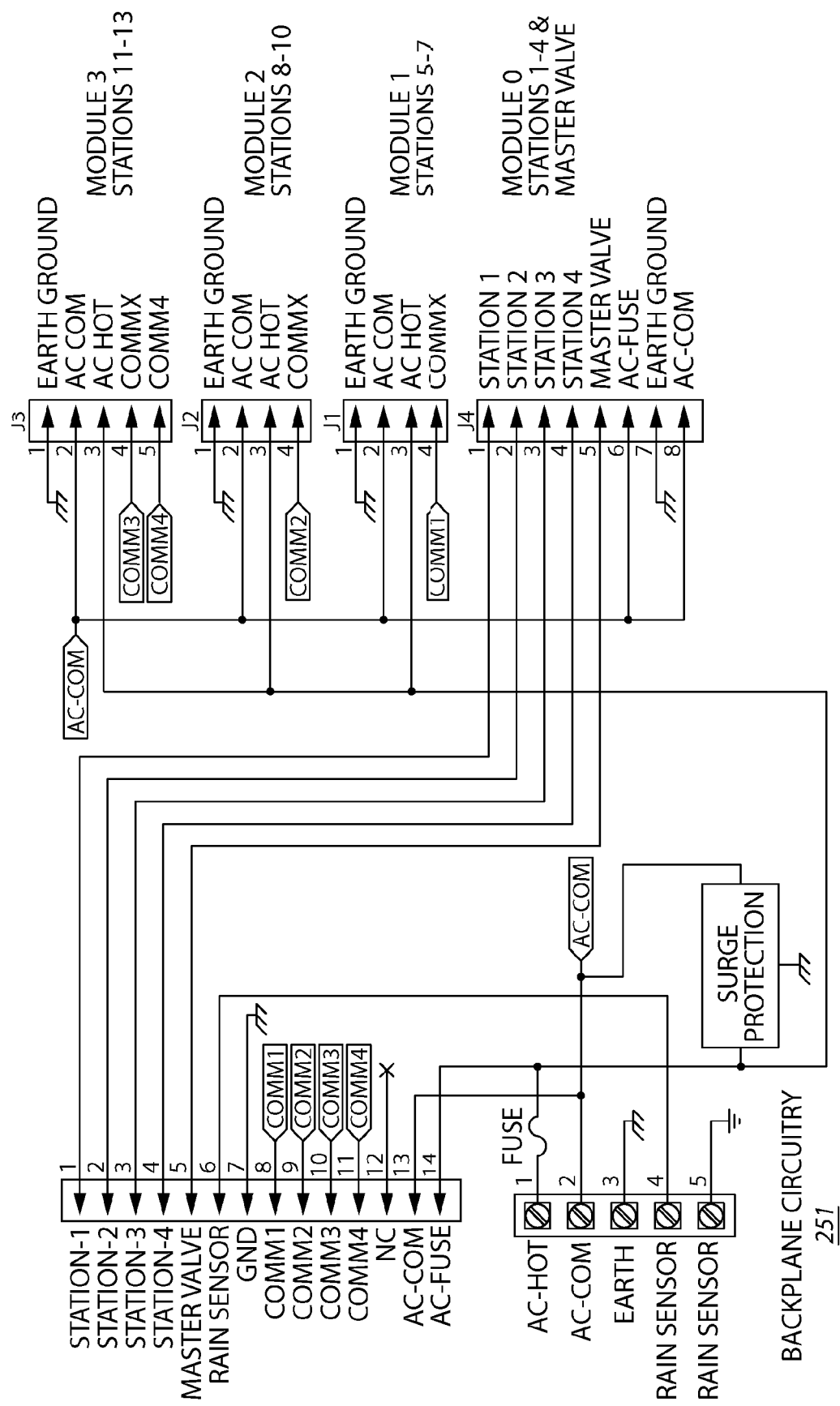
FIG. 68 is a schematic diagram of the backplane circuit board circuit.

As best seen in FIG. 68, the back plane circuitry 251 herein includes 13 active input stations (station 12 is not active) that communicate with the microcontroller 220c of the control panel 220. In this instance, the stations include four station inputs for actuating valves, a master valve station, a rain sensor station, a ground line station, four communications stations, an AC-com station, and an AC-fuse station. The information conveyed from the control panel 220 to the back plane circuitry 251 is then distributed to individual output bays 219 (see FIG. 56) into which one or more irrigation function control modules 221, 222, and 226 have been inserted. As shown in FIG. 68, the base plane circuitry 251 includes an output connection, "module 0", that communicates information to the base module 221; two output connections, "module 1" and "module 2", for bays 219 that can receive expansion modules 222; and an output connection for a smart module 226, "module 3." As will become more apparent hereinafter, not only can an expansion module 222 be used in place of a smart module 226 in the station designated "module 3," but expansion modules can be used in any of the bays 219, with the sole exception of "module 0" which is reserved for the base module 221.

Figure 55:
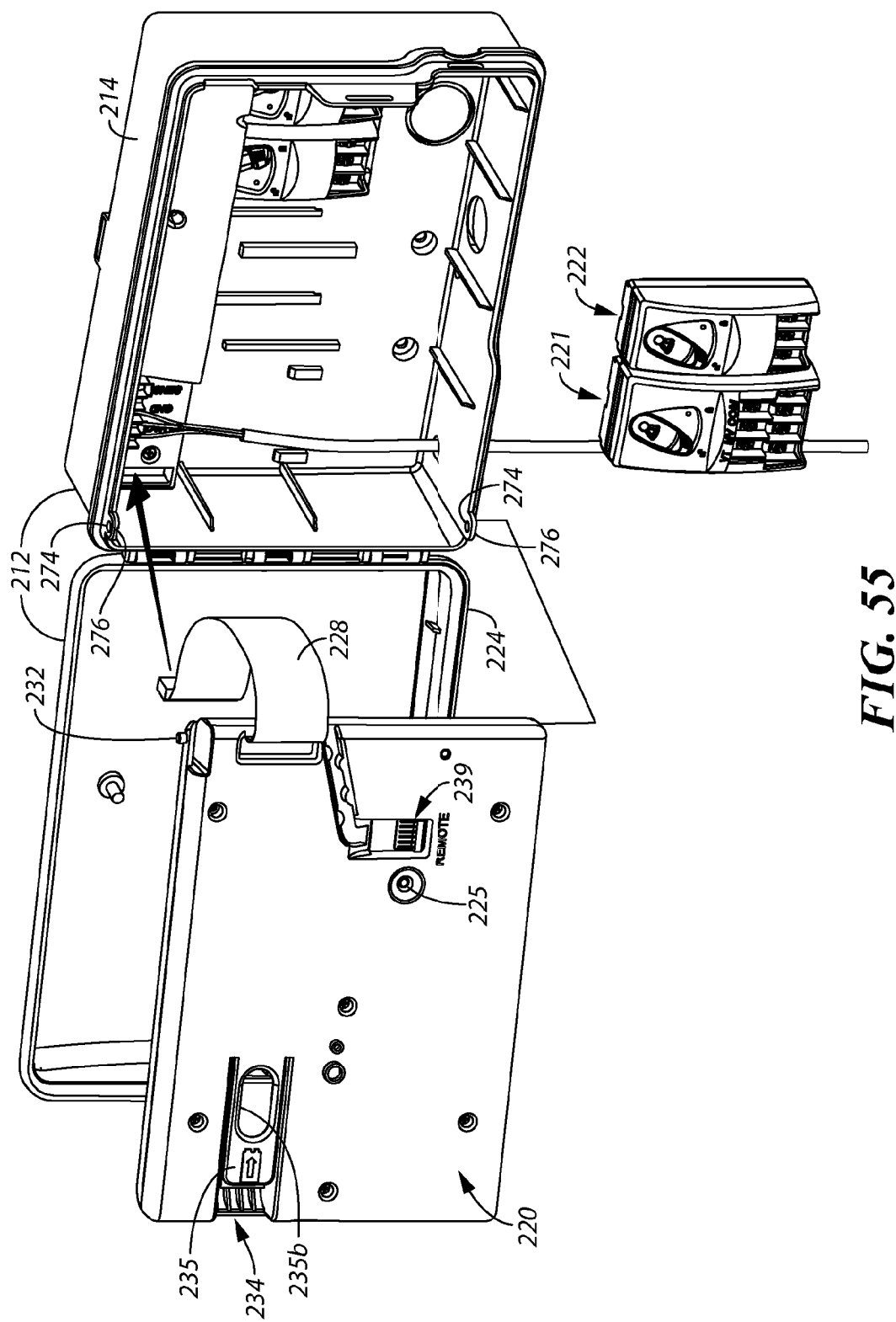
FIG. 55 is an expanded perspective view somewhat similar to FIG. 54, but showing the base module and the expansion module removed from the housing and having one additional expansion module and a smart module installed therein, and showing the control panel detached from the housing.

The control panel 220 can be removed from the controller 210, as seen in FIG. 55, for remote stand-alone programming by the user. In this connection, the control panel 220 is pivotally attached to the front edge of the rear housing portion 214 through a pair of hinge pins 232 that are releasably received in holes 274 formed in tabs 276 projecting forwardly from the rear housing portion. The tabs 276 are sufficiently flexible to permit the pins to be released for removal of the control panel 220, but are sufficiently rigid to retain and support the control panel on the rear housing.

A detachable ribbon cable 228 removably connects the control panel 220 to the backplane circuitry 251 so as to permit the control panel 220 to be completely removed from the base unit 224. To provide power so that the control panel 220 can be removed and programmed independent of an outside power source, a battery (not shown) is provided in a recess 234 in the control panel 220. This further provides additional flexibility in that, for example, a damaged control panel can quickly be changed and replaced with a new control panel without the need to replace the entire base unit 224. This feature also lets the user enter program information before installing the controller at a job site. In this instance, the battery is retained by a cantilever-type spring biasing element 235 that frictionally presses against the side of the battery to hold it in position. The battery is easily removed via a finger access hole 235b located in the spring biasing element 235 which allows the user to simply insert a finger, pull up on the spring element slightly to release the frictional contact, and remove the battery from the recess 234 shown in FIG. 55. The spring biasing element 235 allows the battery to be retained and/or replaced without the use of any tools, such as screws, and retains the battery without additional parts, such as a latch or a swinging door. This results in less cost for manufacturing due to lack of additional parts (screws, doors, etc.), this also results in an easy, single-handed removal and insertion of the battery.

Figure 56:
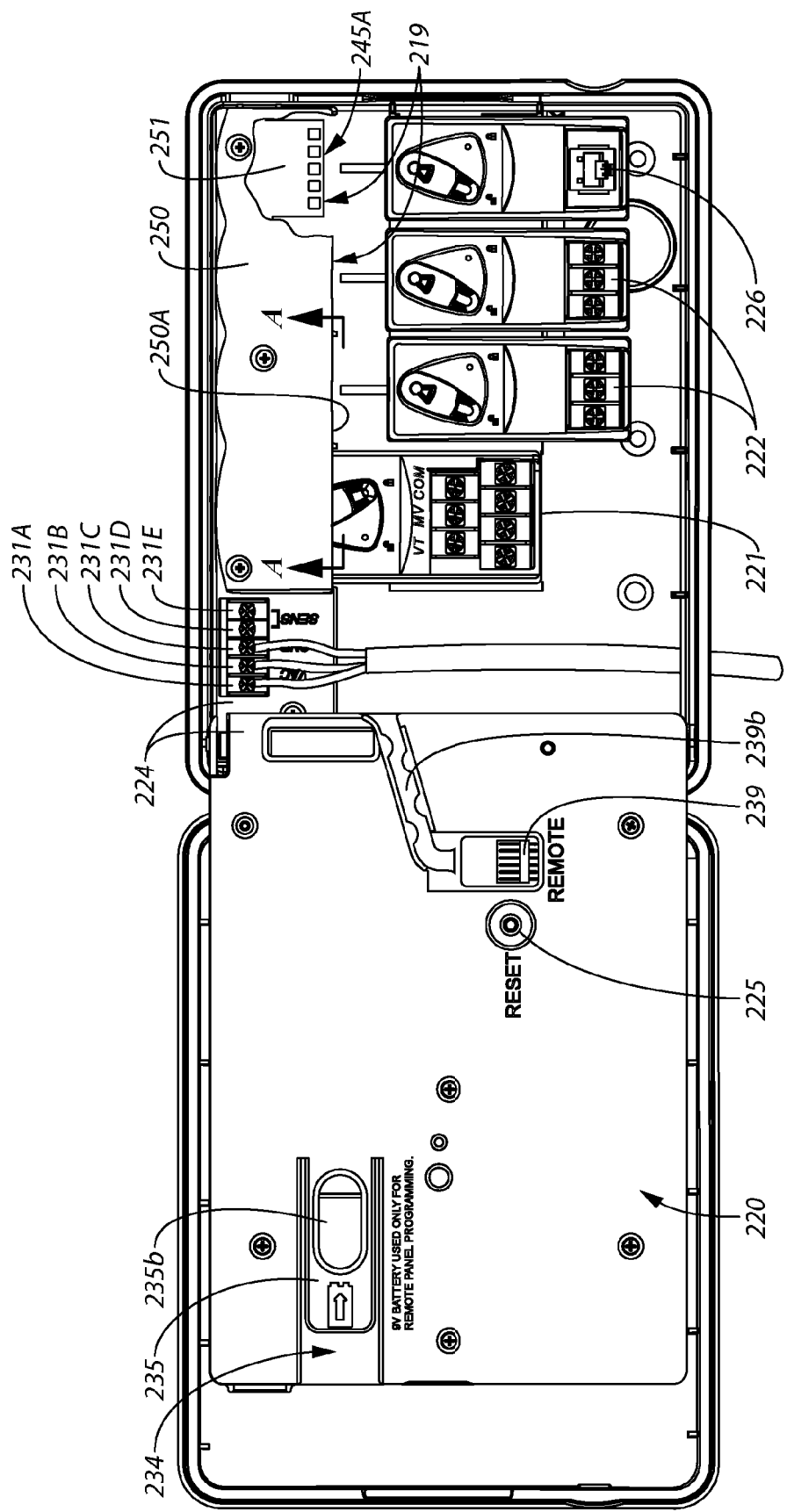
FIG. 56 is a front plan view of the controller housing with the door open and the with the base module locked in and two expansion modules and the Smart module placed on the insertion rail guides and with a portion of the backplane cover cut away to show the bay and the backplane circuitry underneath the backplane cover.
Figure 57:
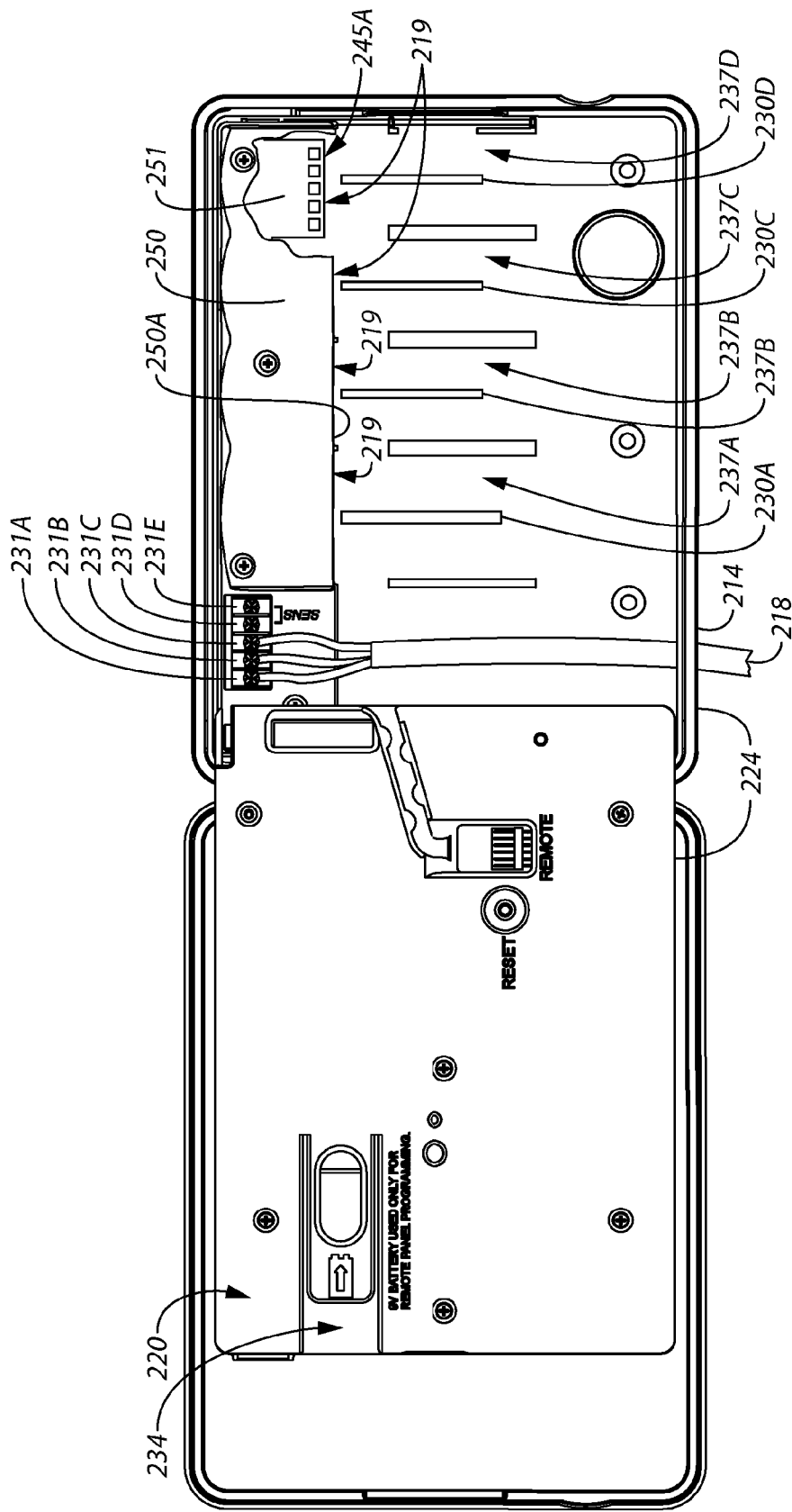
FIG. 57 is a front view of the open controller with the control panel opened to 180 degrees showing its back and revealing the interior of the base unit with all modules removed and with a portion of the backplane cover cut away to show the backplane circuit board underneath the backplane cover.
Figure 60:
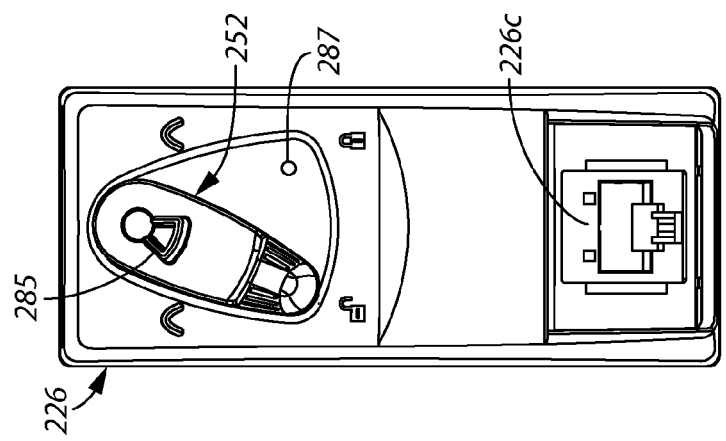
FIG. 60 is an enlarged plan view of the smart module.

A reset button 225 is located at the back of the control panel 220 as seen in FIG. 56. The reset button 225 serves to restart the control panel microcontroller 220c from a potential lock-up condition possibly caused by electrical disturbances. A "remote" connector 239, also indicated in FIG. 56, provides the means to connect a wireless receiver to the irrigation controller 210, and a wire retention channel 239b is provided to direct and restrain the remote connection cables (not shown). An authorized person equipped with the wireless control now has the means to manually activate irrigation valves, modify the irrigation schedule or the behavior of any additional tasks the irrigation controller is capable of performing.

The base unit 224 relies on the insertion of the base module 221 to be capable of activating any irrigation stations. The base unit 224 does not have sufficient capability by itself to control an irrigation station, as there are no driver or output switches for irrigation stations within the base unit 224. Instead, drivers and switching means are located in the base module 221 and the expansion modules 222. It is an object of several embodiments of the present invention to achieve flexibility and cost savings. For example, a damaged component such as a microcontroller or station switch in a prior art base unit would require that the entire base unit be replaced. In one embodiment, a damaged component in the base module 221, the expansion module 222 or the smart module 226 requires only that the damaged module be swapped out and replaced on-site by a new module in much less time than is needed to install a new base unit and at significant cost savings. The expandable architecture allows the user to choose from a variety of expansion modules 222 that can include standard irrigation modules for carrying out watering schedules or smart modules 226 for carrying out additional functions.

Figure 56A:
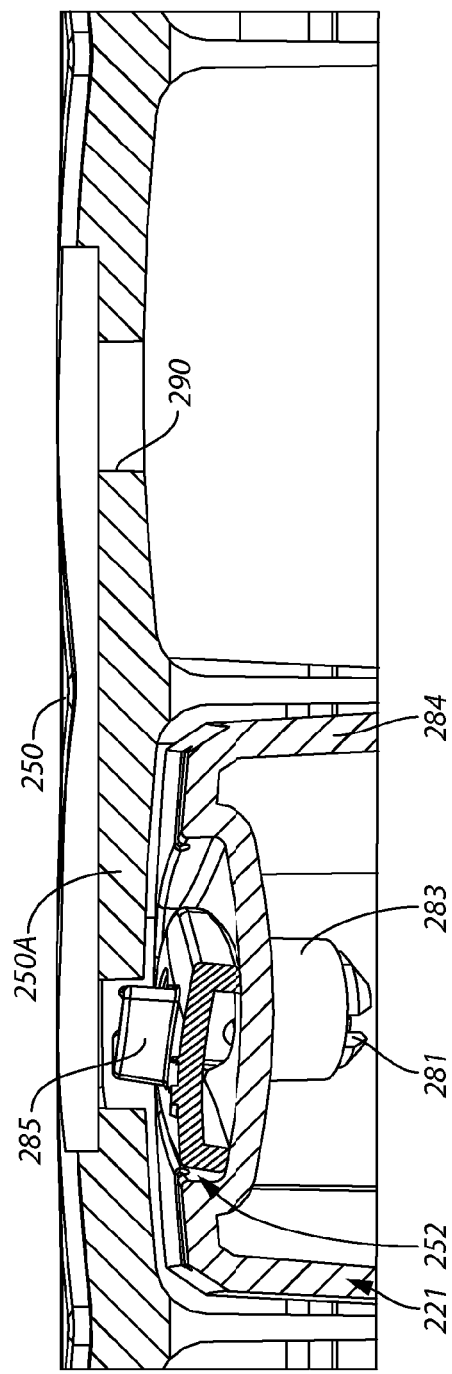
FIG. 56A is a fragmentary sectional view taken substantially along the line A-A of FIG. 5.
Figure 61:
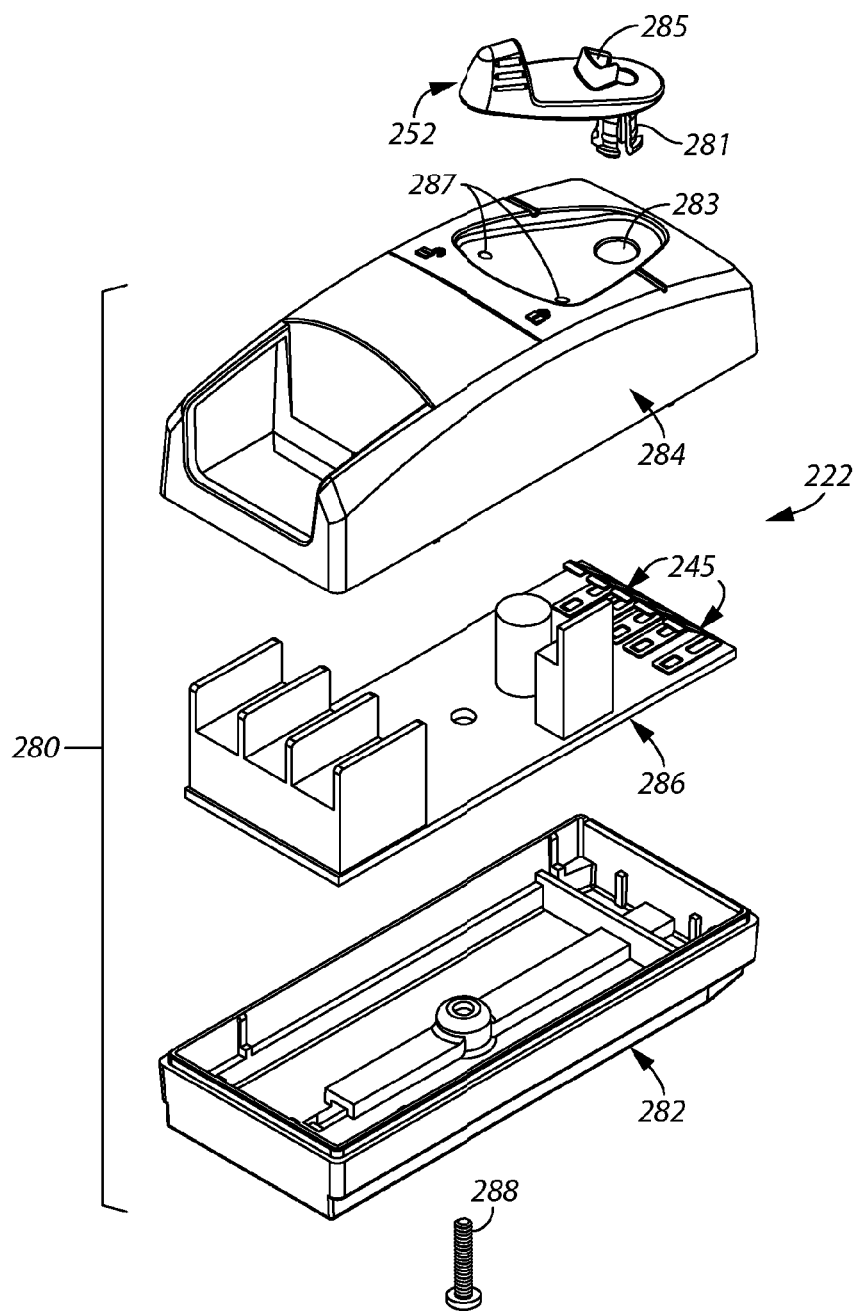
FIG. 61 is an exploded perspective view of a module, herein an expansion module, showing the module basic component parts.

Moreover, as shown in FIGS. 58-61, each module 221, 222, and 226 is relatively simple in construction and incorporates similar basic components. As seen in FIG. 61 which depicts the structure of an expansion module 222, but which is also representative of the structures of each of the base and smart modules 221 and 226, the module includes a housing 280 comprising a lower portion 282 and an upper portion 284 which mate together to encase and protect the module circuit board 286, and herein are held together by a screw 288. Rotatably attached to the top of the upper module housing 284 is a rotary locking lever 252 that function to securely hold and retain the module in position when installed into the controller 210. The locking lever 252 has a downwardly projecting pin 281 that is snap fit through a cylindrical sleeve 283 formed in the upper module housing 284 to pivotally attach the locking lever to the upper module housing, and includes an upwardly projecting locking tab 285 that functions to lock the module in its operative position. As best seen from the expansion modules 222 and the smart module 226 in FIG. 56, when the locking lever 252 is in one rotary position, herein the left rotary position, the locking lever is "unlocked" while when the lever is in the counterclockwise rotary position to the right such as shown for the base module 221, the lever is in the "locked" position as shown in FIG. 56A in detail. To frictionally retain the locking lever 252 in the "locked" and "unlocked" rotary positions, the underside of the locking lever has a small downwardly projecting nipple (not shown) that snap fits into corresponding recesses or dimples 287 in the upper module housing 284.

As shown in FIG. 57, module insertion paths 237A-237D lead to individual bays 219 that accommodate docking and electrically coupling of the expansion modules 222 and smart module 226 with the back plane circuit board 251. In this instance, path 237A is reserved for the base module 221 and paths 237B and 237C are for expansion modules 222 and path 237D is for either another expansion module, or the smart module 226. Each of the modules, 221, 222, and 226 electrically couples and interconnects with the backplane circuitry 251 via sets of conventional spring finger contacts 245 indicated in FIGS. 59 and 61 that electrically couple with complementary sets of conventional electrical contact pins 245A of the backplane circuitry 51 (see FIG. 56). Each module also includes output terminals 223, 227, and 226, herein in the form of conductive screws, to which output wires to irrigation components such as valves and solenoids can be attached in a conventional manner.

In this connection, the electrical contact pins 245A of the back plane circuitry 251 are grouped in sets corresponding to the location of each bay 219 into which a module can be positioned. Herein, as seen in FIGS. 56 and 57, the electrical contact pin sets 245A for each bay 219 are carried on generally rectangular shaped tongues 251A formed as part of the back plain circuit board 251, and slide into complementary slots 245B (see FIG. 56A) in the front end of the housing 280 to make electrical contact with the corresponding set of spring finger contacts 245. It should be apparent that additional modules could be accommodated by the addition of an expanded base unit 224 and its back plane 251 and number of bays 219. To secure and retain the Base module 221, the expansion module(s) 222 and the smart module(s) 226 to the base unit 224, and to releasably retain the modules in position, the module insertion paths 237A-237D are partially covered by the backplane cover 250 as seen in FIG. 57, such that the modules can be slid into the module insertion paths 237A-237D and into the bays 219 to be coupled to the backplane circuit board 251, as best shown in FIG. 56.

To properly position and guide the modules 221, 222, and 226 into the bays 219, each module includes longitudinal recesses (not shown) formed along the bottom of the lower module housing 282 that can mate with upstanding guide rails 230 formed on the bottom wall of the rear cabinet portion as seen in FIG. 57. Once the module is inserted into the bay 219, the user indexes the locking lever 252 from the unlocked to the locked position. In this instance, as best seen in FIG. 56A, the backplane cover 250 has a downwardly projecting wall 250A extending along the length of the forward edge, and which has openings 290 corresponding to the locations of the insertion paths 237A-237D, and through which the locking tabs 285 of the modules can move when the module locking lever 252 is in the "unlocked" position. When a module is fully inserted into one of the insertion paths 237A-237D, the locking lever 252 is then rotated counterclockwise which causes the locking tab 285 to move out of alignment with the opening 290 and into abutting engagement with the rear side of the wall 250A adjacent the opening. With the tab 285 abutting the wall 250A, the module is securely locked in position, and cannot be pulled out of the controller unless the locking lever 252 is first rotated to align the locking tab with the opening 290.

Figure 58:
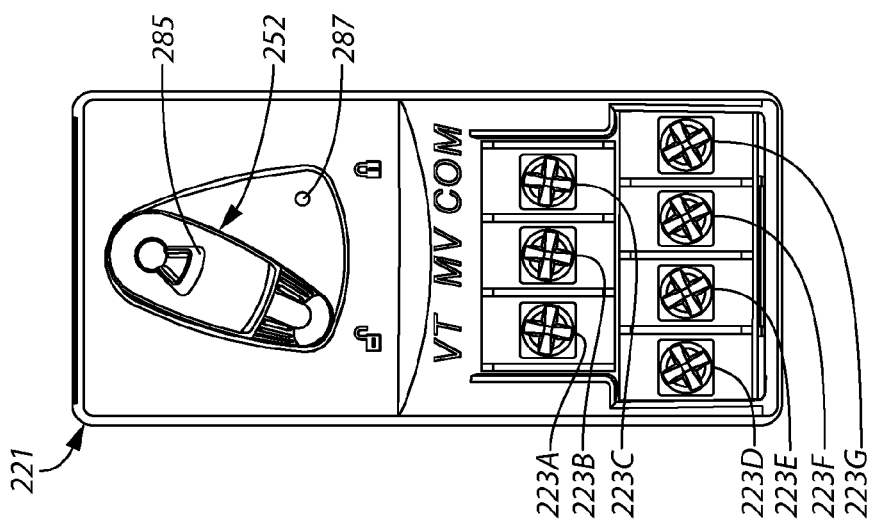
FIG. 58 is an enlarged plan view of the base module.
Figure 63:
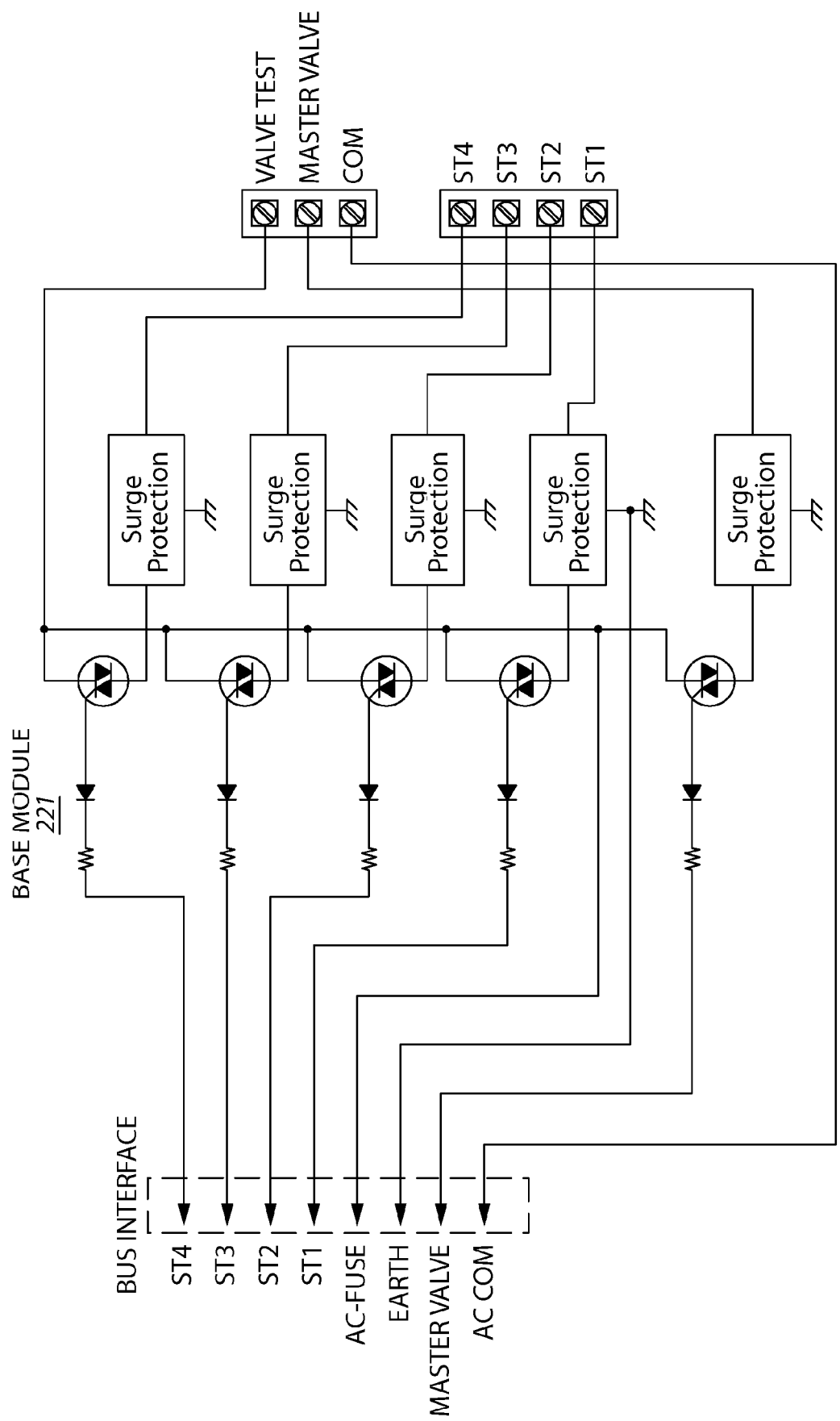
FIG. 63 is a schematic diagram of the base module circuit.

The base module 221 is responsible for the carrying out basic irrigation functions, such as turning on or off irrigation system valves (not shown here) which control the flow of water to the irrigation stations for the preset programmed duration. The presently preferred circuitry for the base module 221 is illustrated in FIG. 63. As can be seen, the base module circuit 221 includes a bus interface having input connections from the back plane circuit board 251 for controlling a master valve and four individual station valves, and incorporates surge protection circuitry for lightning protection. Valve test circuitry is also provided to allow the user to assess the condition of the system. As best seen in FIG. 58, the base module 221 includes a number of conductive screws that serve as output terminals 223 for connecting the module to irrigation station valves. Herein, the base module 221 includes a plurality of station output terminals 223D-223G (preferably four station output terminals), a 'hot post' terminal 223A (VT) to test the valves during installation, a terminal 223B for a master valve (MV) and a terminal 223C for a common wire terminal (COM).

Figure 59:
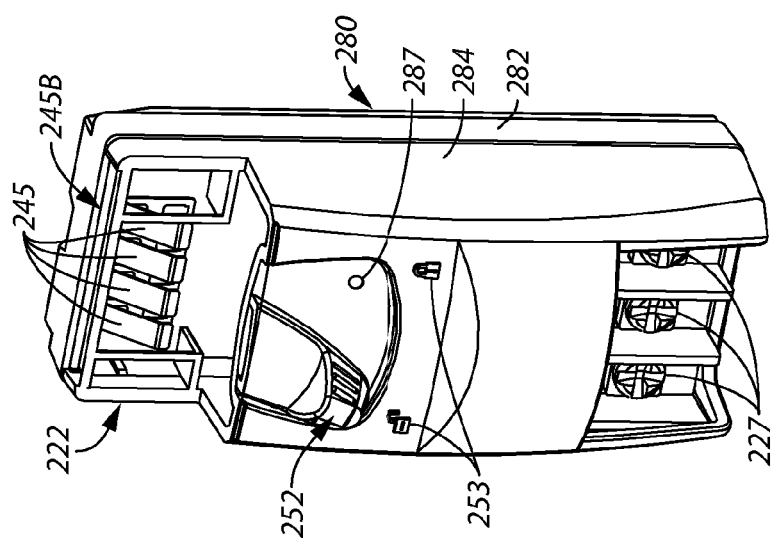
FIG. 59 is a perspective view, partially in cut-away section, of the expansion module, and showing the locking lever and the terminal blocks, and having a portion of the expansion module cut away to show the finger contacts connector.

The expansion modules 222, which are generally identical to each other, enable a user to quickly and easily expand the capabilities of the controller 210 functions without requiring the purchase of a new base unit 224. Each of the expansion modules 222 includes three station output terminals 227, herein in the form of conductive screws, as seen in FIG. 59, to which output wires to irrigation components such as valves and solenoids can be attached.

Each expansion module 222 includes a microcontroller 222b (see FIG. 64) capable of communicating with the microcontroller 220c of the base unit 224. By using a micro-controller in the expansion module 222, the number of connections required is reduced, as well as space and cost. As illustrated in the circuit diagram of FIG. 64, the microcontroller 222b is capable of communicating with the control panel microcontroller 220c and controls the drivers and switches for the output stations. In the presently preferred embodiment, the microcontroller 222 b employed in the expansion module is an Atmel AT-TINY12L-4 microcontroller that provides communication to the base unit 224, thereby substantially reducing the number of connections between the module and the base unit 224 while at the same time handling the 'drivers' to the output stations. The basic irrigation controller 210 in accordance with one embodiment of the invention has no irrigation stations, but separate modules can be added later for a determined location, and to provide possible upgrade for a future improvement to the initial installation.

The microcontroller 222b in the expansion module 222 and the microcontroller 220c in the base unit 224 are mutually dependent upon each other in order to operate. The communication between the control panel microcontroller 220c and the expansion modules 222 takes place through an asynchronous serial communication line, namely, COMMX. During the communication, data bits are transmitted in 100 microsecond intervals. In order to obtain a consistent time reference for data reception, bit marks are set at 100 microseconds. Due to the fact that the control panel microcontroller 220c and the modules 221 and 222 are running asynchronously, each running on a separate clock, a bit jitter of 8.4 microseconds, worst-case, could be realized. To guarantee the bit jitter not exceeding 8.4 microseconds, it is necessary that the control panel microcontroller 220c disables any interrupts associated with any other interrupt functions, such as key actuation by a user, and only service the communication task at hand. Other functions and operations should not be affected adversely since the communication sequence lasts only for approximately half a millisecond per module.

Preferably, the communication protocol consists of a negative start bit, 3 data bits, and an active low acknowledge. The recognition of the start bit by the module prompts the module to read the station status bits near the center of each 100 us bit mark. Upon completion of the status bits by the control panel microcontroller 220c, the control panel microcontroller releases the serial communication line and allows the module to acknowledge data reception by pulling down the serial communication line.

The microcontroller 222b in the expansion module 222 looks at the received data which contains information about which irrigation stations attached to this module should be activated or deactivated. In preferred form, he microcontroller 222b receives three consecutive messages with identical information before it actually makes a change to the irrigation station outputs. This provides a robust communication implementation whereby the irrigation stations do not erratically turn on or off under noisy data conditions.

The control panel microcontroller 220c sends irrigation station data to every expansion module 222 through the backplane circuitry 251 on a one second interval, thereby ensuring that each microcontroller 222b in each expansion module 222 is refreshed with irrigation station data every one second. The microcontroller 222b in the expansion module 222 also includes a timeout mechanism. A timer inside the microcontroller 222b and an interrupt service routine in the microcontroller firmware is used to create a repetitive internal clock tick every few hundred microseconds, which in turn, increments a counter to keep track of seconds. This clock tick and counter is used to measure the interval time gap since the last valid communication packet received by the module microcontroller 222b from the control panel microcontroller 220c. If this time interval gap exceeds five seconds, the microcontroller 222b in the expansion module decides that a fatal communication failure has occurred and the microcontroller 222b deactivates all irrigation station outputs connected to itself.

Each time that the control panel microcontroller 220c sends irrigation station data to an expansion module 222, the microcontroller 222b in the expansion module 222 will respond with an acknowledge bit. This acknowledge bit is transmitted by the microcontroller 222b immediately after the receipt of the station status bits in the serial communication. If the control panel microcontroller 220c does not receive an acknowledge bit, this is an indication that a module is not installed in that specific path 237A-237D of the bay 219. After communicating with each connector in the bay 219, the control panel microcontroller 220c will know which paths have modules installed and which do not. The firmware of the control panel microcontroller 220c will correlate this information to determine which irrigation stations are effectively available to the irrigation program. If a user attempts to program an irrigation station that is not present, the firmware will alert the user by displaying a message such as "No Module".

The spring finger contacts 245 of the expansion modules 222 mate with complementary contact pin sets 245a formed in the backplane circuitry 251, for example as is shown in FIG. 59. The backplane contact pins 245a carry power and data signals, and are arranged as sets in a manner whereby the power signals establish a circuit connection prior to the data lines when the module is inserted into the bay. In this manner, the module's microcontroller power will have stabilized before any voltage appears on the data lines. Stabilizing the power of the module's microcontroller before voltage is applied to the data lines prevents the microcontroller in the module from latching up or overloading its current ratings on its input/output pins. This allows the module to be removed from and inserted into the bay 219 without the need to first remove power from the remainder of the controller 210. Many embodiments of the modular controller 210 are novel in the industry as other modular irrigation controllers using microprocessors in their modules must first have their power removed before any modules can be removed or inserted. In addition, the firmware in the control panel microcontroller 220c is able to handle the dynamic appearance and disappearance of irrigation stations without the need to restart or reboot the firmware. This is made possible by having the firmware continuously verify if a module that corresponds to each irrigation station is installed. For stations that are detected as being not available, the firmware prohibits the user from enabling that station. In addition, it alerts the user that the station is unavailable by displaying a message such as "No Module".

Figure 64:
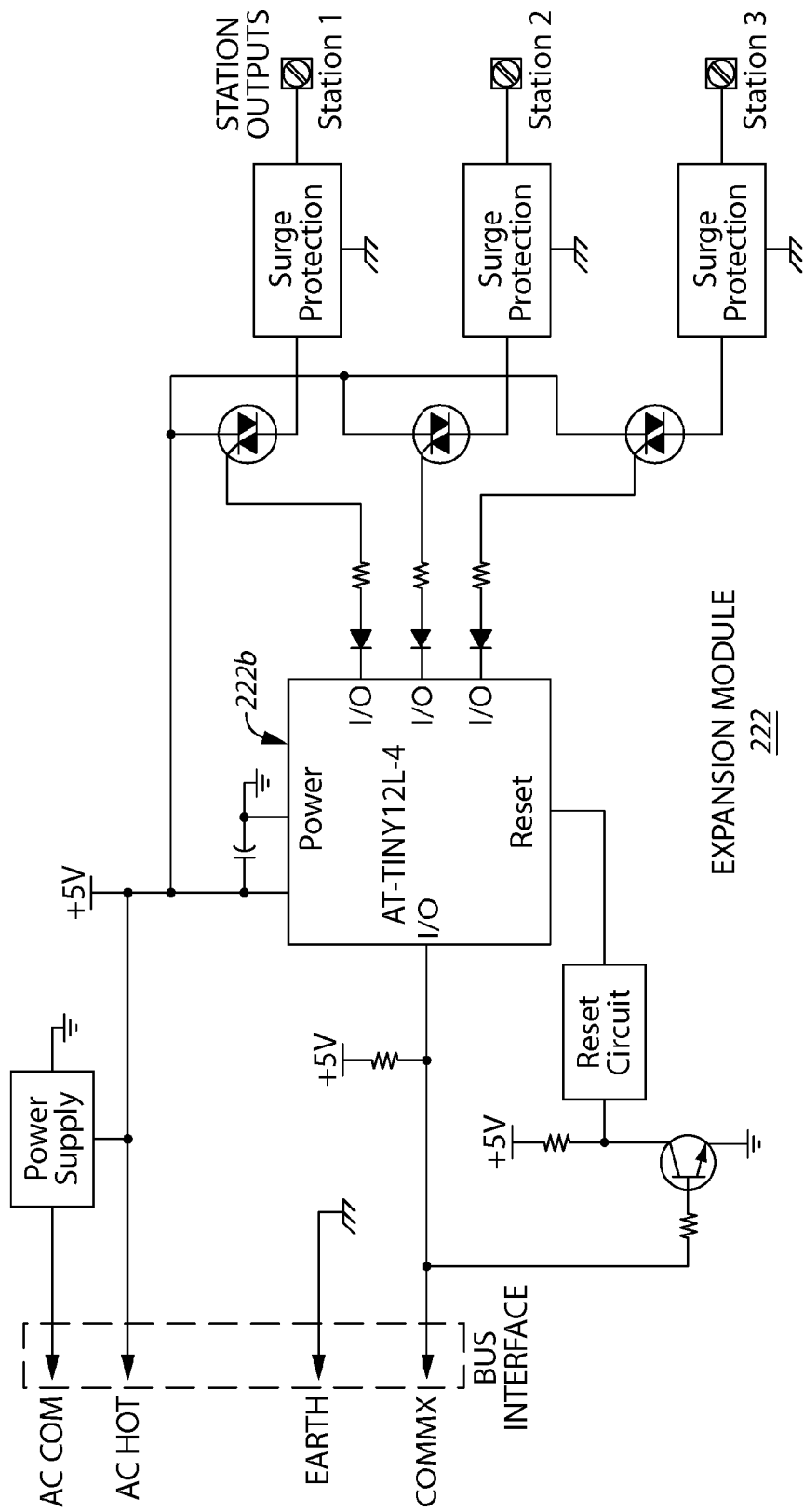
FIG. 64 is a schematic diagram of the expansion module circuit.

As shown in FIGS. 64 and 66, the set of spring finger contacts 245 for coupling the expansion modules 222 to the corresponding set of connector pins 245A of the back plane 251 herein include two AC power line connections, an earth ground line connection, and a data communication signal line connection. The corresponding pinout of the back plane circuit 251 is illustrated in FIGS. 66 and 68 and the corresponding signals are as follows: 1—EARTH GROUND, 2—AC COM, 3—AC HOT, and 4—COMM-1 (or 2 or 3 depending on which bay 19 the module is positioned in and indicated in FIG. 64 as "COMM X").

The communication between the control panel microcontroller 220c and each of the expansion modules 222 and the smart modules 226 takes place through a serial communication line so that the particular module insertion path 237A-237D into which an expansion or smart module is inserted makes no difference. Thus, if an expansion module in insertion path 237B malfunctions and needs to be replaced, the removal of that module will have no effect on the operation of the remaining modules in insertion paths 237C and/or 237D.

If the control panel circuit 220b, illustrated in FIG. 69, detects the presence of one or more expansion modules 222, the control panel microcontroller 220c assigns a default identity to each module and queries the module to identify its functionality. Once in communication, the expansion modules 222 work in concert with the control panel microcontroller 220c to carry out the programmed functions. For example, the expansion modules 222 can inform the base unit 224 of various conditions, such as temperature, humidity, rain gauge readings, moisture of the ground, etc. the base unit 224 also contains the basic irrigation schedules and is programmed to adjust irrigation schedules based on data received from the expansion modules 222. Although the expansion modules 222 enable the base unit 224 to change to permit advanced functions such as adjusting for weather conditions, neither the expansion modules 222 nor the base Unit 224 can adjust or change themselves.

Various smart modules 226 may be used to perform a variety of functions that expand the capabilities of the irrigation controller 210 beyond its basic irrigation functions. In this instance the smart module circuit shown in FIG. 65 includes a microcontroller 222c that is of the same type as that employed in the expansion modules 222. This and other types of microcontrollers can be employed in the smart modules 222, and which could be used, for example, to perform such functions as being a latching solenoid module sending a DC pulse along a wire to a solenoid, a wireless module sending a signal to a valve, a decoder module interpreting a command from the controller 210 that indicates when a valve should turn on/off, an input module accepting inputs from sensors and providing information to the controller 210 about environmental condition, weather, etc., a feature module containing an extra feature such as cycle and soak, etc., an alarming module communicating fault conditions to a homeowner, an alarm company or alike, a fertigation module connecting an automatic fertilization system and allowing the irrigation controller 210 to automate fertilization, an evapotranspiration module receiving evapotranspiration data or weather conditions and allowing the controller 210 to adjust irrigation accordingly, a communication module connecting the controller 210 to other communication channels and/or networks including the internet, etc.

Figure 65:
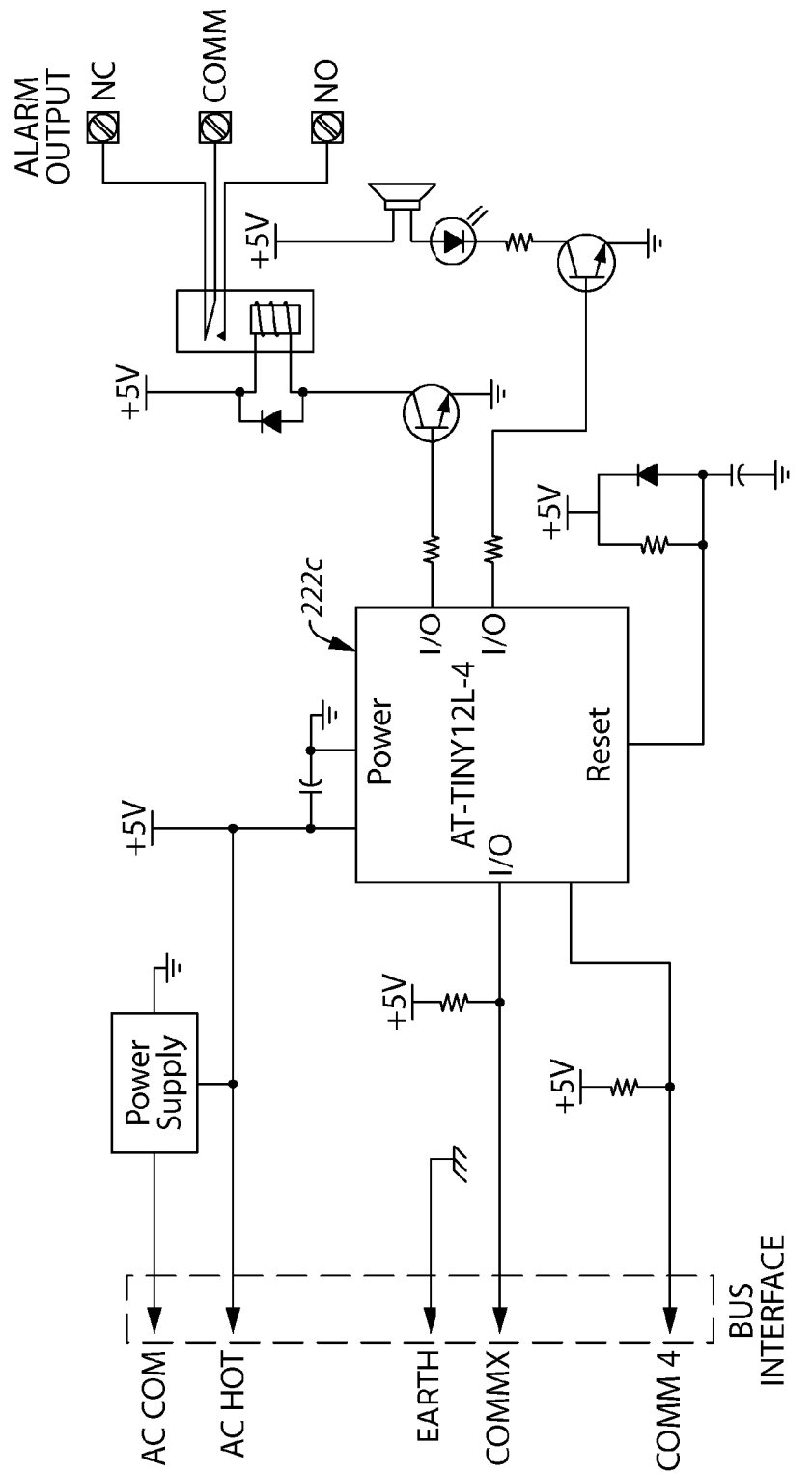
FIG. 65 is a schematic diagram of one form of the smart module circuit.

Like the expansion modules 222, the smart modules 226 have a set of conventional spring finger contacts 245 that mate with a corresponding set of conventional connector pins 245A of the backplane circuitry 251. In this instance, as best seen in FIGS. 65 and 67, each smart module 226 includes an earth ground connection, two AC power line connections, and two data communication signal connections. As shown in FIGS. 67 and 68, the complementary set of connector pins 245A of the back plane circuit 251 for the smart module 226 (referred to as "Module 3" in FIG. 68) have pin-outs for the corresponding signals are as follows: 1—EARTH GROUND, 2—AC COM, 3—AC HOT, 4—COMM-X, and 5—COMM-4

The smart modules 226 use a dedicated line, herein designated COMM4, to communicate their presence and identity to the control panel microcontroller 220c. This COMM4 connection is provided in the right-most slot 230D of the base unit 224, so that a module inserted therein has access to this additional communication signal. Smart modules 226 can also utilize the asynchronous serial communication line, COMMX, in a similar manner to the expansion modules 222. In addition, if a Smart module 226 requires extended two-way communications with the base unit 224, it can achieve that through a software-based communications protocol programmed into the microprocessor of the smart module 226 and that of the base unit 224. Moreover, if desired, the backplane circuit board 251 can be modified to include additional bays 219 for receiving additional smart modules 226 simply by adding bays with a COMM—4 communication line for two-way communication with the control panel microcontroller 220c and/or by adding COMM—4 lines to one or more of the bays 219 in which expansion modules 222 are mounted.

Notably, the expandable architecture modular design allows the communication between the smart modules 226 and the base unit 224 such that all smart functions are carried out in the smart modules 226 rather than the base unit 224. The smart modules 226, herein having circuitry as shown in FIG. 65, allow the abilities of the base unit 224 to be upgraded to include new and different functions without requiring the replacement of the base unit 224. For example, the smart modules 226 provide flexibility by allowing the base unit 224 to interface with an outside user, such as a home security company, to alert the outside user if a sprinkler is not working. The smart modules 226 may be programmed so as to provide an alert that there is a bad solenoid because a valve did not activate. In the case of automatic fertilization, the smart modules 226 could interface with a homeowner, gardener, etc. to provide an update on conditions.

To guard against the failure of the control panel microcontroller 220c, a mechanism is in place that allows both the expansion modules 222 and the smart modules 226 to be aware of such failures. The control panel microcontroller 220c communicates with the modules on a frequent basis. This allows a module to detect the loss of communication. In effect, this action is similar to that of a watchdog timer. While the control panel microcontroller 220c is active, the expansion modules 222 execute the commands as received in real time from the control panel microcontroller 220c. However, should there be a communication gap greater than expected, the expansion modules' microcontrollers 222b interpret this as a control panel microcontroller 220c failure and immediately shut down any watering activities or other functions until the watchdog conditions have been properly restored. For each command sent to the expansion modules 222, the expansion modules 222 respond with an acknowledgment. Absence of this acknowledgment informs the control panel microcontroller 220c that the module has suffered a hardware or software failure. Notably, it makes no difference into which bay 219 an expansion module 222 is positioned, nor to which of the output terminals 227 irrigation station wires are connected. The microcontroller 220c of the control panel 220 monitors the bays 219 for the presence or absence of expansion modules 222, and cooperates with the microcontrollers 222b of the expansion modules to send control signals only to those irrigation stations detected. In this manner, there is no requirement that any particular bay 219 include an expansion module 226, thus allowing the user to add or remove modules in random order, even while the controller 210 is on and active.

In addition to the normal irrigation program set, labeled A, B & C and stored in non-volatile EEPROM 44, the Controller 210 also contains a contractor's default program set. This contractor's default program set is stored at a separate location in non-volatile EEPROM 44 than the active program set. Irrigation programs for A, B & C are entered through the User Interface 229. A menu choice is available to store this set of irrigation programs into the EEPROM 44 as a contractor's default program set. Thereafter, the user may make changes to the programs A, B & C without concern about making irrigation program mistakes since there is a backup copy. In addition, a knowledgeable irrigation expert can enter a set of programs and store them as the contractor's default program set. A menu choice is available to recall the contractor's default program set from the EEPROM 44 and replace the normal irrigation program set A, B & C. This allows the user to quickly and easily restore a known working irrigation schedule. Other irrigation controllers in the industry have a set of factory defaults with fixed program settings that a user may recall, but do not have the ability to store and recall a set of irrigation programs customized for each individual site.

Generally, the contractor default program set is a program set that has been modified relative to the factory default, typically by a contractor during installation and is preferably site specific. In one embodiment, the contractor saves this customized program as a set recallable default program. Thus, if a user modifies the program that was input by the contractor, the user has the ability to recall the contractor default if the user is not happy with the changes made. In a prior art controller, the user could recall only the factory default and would have to re-program the controller just to get it back to the customized state the contractor had set up. By having the ability to recall this customized contractor default program, the user can easily go back to the customized state of the program, which was set up for the installation. Generically, the contractor default program may be referred to as modified default program, which is specifically not a factory default. Additional memory space is provided to be able to store both the factory default and the contractor's default in addition to the active program set.

In other embodiments, a contractor/user may set a contractor default program, save it, then make further changes to the contractor default so that the active program is the modified contractor default program. Then, the user instructs the controller to recall the stored contractor default program after a set period of time (days, hours, etc.). In operation, the controller executes the active program for a set period of time (e.g., 30 days), then the controller automatically stops using the active program and reverts back to the stored contractor default program. This feature may be useful in situations where the new grass is being planted and this new grass has initial watering needs until the grass takes root and becomes established in the soil. At this later point in time, the watering needs of the grass will have changed. In this example, the contractor will modify the factory default to generate a set of programs that will match the watering needs of the grass after 30 days once the grass has fully grown in. The contractor saves this program set as the contractor default, then modifies these programs further to generate an active program that will meet the current watering needs of the grass and sets the expiration of the active program for 30 days. After 30 days, the controller stops using the active program and recalls the contractor default to use as the active program (while continuing to save the contractor default to be recalled in the event a user modifies the active program and is not satisfied with the modified program). Advantageously, this embodiment allows more flexibility in the programming of the controller and greater ease to a user, who knows that a set of programs customized to the installation may be recalled, as opposed to being able to only recall a factory default which is not site specific.

While the invention herein disclosed has been described by means of specific embodiments, examples and applications thereof, numerous modifications and variations could be made thereto by those skilled in the art without departing from the scope of the invention set forth in the claims.

What is claimed is:

1. An irrigation controller comprising:
a control device including a first microcontroller configured to execute stored irrigation functions using a first set of code; and
a removable plug-in device configured to removably mate with a portion of the irrigation controller such that the removable plug-in device is communicationally coupled to the first microcontroller, wherein the removable plug-in device comprises a memory storing a second set of code to be utilized in a re-flash to replace at least a portion of the first set of code, wherein the removable plug-in device is configured to enable a re-flash of at least the portion of the first set of code allowing a copy of the second set of code to be transferred to the control device to be used in the re-flash as at least part of an overwrite of the at least the portion of the first set of code of the control device;
wherein the removable plug-in device is assigned an address and comprises a wireless transceiver configured to wirelessly communicate with remote devices, wherein the second set of code is received from a remote device via the wireless transceiver; and
wherein, the removable plug-in device is configured to remain mated with the portion of the irrigation controller and comprises a second microcontroller configured to send and receive data communications to and from the first microcontroller, wherein the first microcontroller is configured to operate in accordance with the second set of code, and wherein the first microcontroller and the second microcontroller are configured to function together during use of the control device.

2. The irrigation controller of claim 1, wherein the removable plug-in device in enabling the re-flash is configured to overwrite less than all of the first set of code of the control device.

3. The irrigation controller of claim 1, wherein the address assigned to the removable plug-in device comprises an Internet Protocol (IP) address.

4. The irrigation controller of claim 1, wherein the second microcontroller is configured to forward at least the copy of the second set of code to implement the transfer of the copy of the second set of code when a version of the second set of code is newer than a version of the first set of code.

5. The irrigation controller of claim 1, wherein the memory of the removable plug-in device further stores additional functionality code that when implemented provides additional functionality usable by the control device; and
the second set of code includes operating code that when the copied second set of code is utilized by the control device allows the control device to utilize the additional functionality of the removable plug-in device that could not be utilized by the control device without the copy of the second set of code.

6. The irrigation controller of claim 1, wherein the removable plug-in device is configured to wirelessly communicate with a remote, external computer to receive the second set of code.

7. The irrigation controller of claim 1, wherein the copy of the second set of code is transferred and is stored overwriting the at least the portion of the first set of code of the control device without user interaction.

8. The irrigation controller of claim 1, wherein the first set of code comprises first firmware and the second set of code comprises second firmware, wherein the second firmware is configured to replace at least a portion of the first firmware.

9. The irrigation controller of claim 8, wherein the first firmware of the control device comprises a bootloader code that when implemented by the control device causes the control device to implement the re-flash to replace at least the portion of the first firmware with the second firmware.

10. The irrigation controller of claim 9, wherein the bootloader code is protected and configured to be activated even when a version of the first firmware of the control device becomes corrupt or is incompletely replaced, and the bootloader code is further configured to control a replacing of the portion of the first firmware of the control device, which does not include the bootloader code, with the second firmware.

11. The irrigation controller of claim 9, wherein the second set of code comprises an alternate bootloader code configured to be copied to a memory and accessible by the control device such that the control device is reactivated to access the alternate bootloader code instead of the bootloader code, and wherein the alternate bootloader code is configured to initiate the re-flash of the first firmware with the second firmware.

12. The irrigation controller of claim 1, wherein the second microcontroller is configured to wait, following the communicationally coupling with the first microcontroller, for a first silent period over a communication coupling with the first microcontroller before enumerating itself to the control device following the first silent period.

13. The irrigation controller of claim 12, wherein the second microcontroller is configured to assume a collision on the communication coupling when a reply to the enumeration is not received within a predefined reply period of time; apply a back off period; and re-attempt the enumeration to the control device following the back off period.

14. The irrigation controller of claim 1, wherein the control device comprises a display; and
wherein the second microcontroller is configured to communicate a control signal causing the first microcontroller to display information on the display.

15. The irrigation controller of claim 14, wherein the first microcontroller is configured to communicate a signal to the second microcontroller indicating a user response following the displaying of the information on the display.

16. The irrigation controller of claim 1, wherein the second microcontroller is configured to transmit a request to the first microcontroller requesting data relating to an irrigation program implemented by the first microcontroller.

17. The irrigation controller of claim 16, wherein the second microcontroller is configured to alter received data relating to the irrigation program received from the first microcontroller and transmit the altered data back to the first microcontroller.

18. The irrigation controller of claim 1, wherein the first microcontroller is configured to transmit an authentication request to the second microcontroller, receive a response to the authentication request from the second microcontroller, and determine, based on the response, when the removable plug-in device is authorized to operate with the first microcontroller.

19. The irrigation controller of claim 1, wherein the second microcontroller is configured to: transmit an authentication request to the first microcontroller; receive a response to the authentication request from the first microcontroller; and confirm, based on the response, that the removable plug-in device is authorized to operate with the first microcontroller.

20. A method of controlling irrigation, comprising:
executing, through a first microcontroller of a control device stored irrigation functions using a first set of code; and
utilizing, by a removable plug-in device comprising a wireless transceiver that is removably mated with a portion of an irrigation controller such that the removable plug-in device is communicationally coupled to the first microcontroller of the irrigation controller, a second set of code stored in a memory of the removable plug-in device, wherein the second set of code is received from a remote device via the wireless transceiver;
re-flashing, by the removable plug-in device utilizing the second set of code, at least the portion of the first set of code replacing at least a portion of the first set of code comprising allowing a copy of the second set of code to be transferred to the control device to be used in the re-flash as at least part of an overwrite of the at least the portion of the first set of code of the control device; and
sending and receiving, by a second microcontroller of the removable plug-in device, communications to and from the first microcontroller of the control device, wherein the removable plug-in device is configured to remain mated with the portion of the irrigation controller and wherein the first microcontroller and the second microcontroller are configured to function together during use of the control device.

* * * * *